(12) United States Patent
Poghosyan et al.

(10) Patent No.: US 10,997,009 B2
(45) Date of Patent: May 4, 2021

(54) METHODS AND SYSTEMS THAT DETECT AND CLASSIFY INCIDENTS AND ANOMALOUS BEHAVIOR USING METRIC-DATA OBSERVATIONS

(71) Applicant: VMware, Inc, Palo Alto, CA (US)

(72) Inventors: Arnak Poghosyan, Yerevan (AM); Ashot Nshan Harutyunyan, Yerevan (AM); Naira Movses Grigoryan, Yerevan (AM); Nicholas Kushmerick, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 45 days.

(21) Appl. No.: 16/214,272

(22) Filed: Dec. 10, 2018

(65) Prior Publication Data

US 2020/0183769 A1    Jun. 11, 2020

(51) Int. Cl.
*G06F 11/00* (2006.01)
*G06F 11/07* (2006.01)
*G06N 20/00* (2019.01)

(52) U.S. Cl.
CPC ........ *G06F 11/079* (2013.01); *G06F 11/0709* (2013.01); *G06F 11/0751* (2013.01); *G06N 20/00* (2019.01)

(58) Field of Classification Search
CPC .... G06F 11/079; G06F 11/34; G06F 11/3447; G06F 11/3452
See application file for complete search history.

(56) References Cited

U.S. PATENT DOCUMENTS

| 7,484,132 B2 * | 1/2009 | Garbow | G06F 11/008 |
| | | | 714/26 |
| 7,930,593 B2 * | 4/2011 | Ozonat | G06F 11/0751 |
| | | | 714/33 |
| 8,811,156 B1 * | 8/2014 | Jiang | H03M 7/3082 |
| | | | 370/225 |

(Continued)

OTHER PUBLICATIONS

Muniyandi et al., Network Anomaly Detection by Cascading K-Means Clustering and C4.5 Decision Tree algorithm, 2011 (Year: 2011).*

*Primary Examiner* — Elmira Mehrmanesh

(57) ABSTRACT

The current document is directed to methods and systems for detecting the occurrences of abnormal events and operational behaviors within the distributed computer system. The currently described methods and systems continuously collect metric data from various metric-data sources, generate a sequence of metric-data observations, each metric-data observation comprising a set of temporally aligned metric data, and employ principle-component analysis to transform the metric-data observations to facilitate reduction of the dimensionality of the metric-data observations. The currently described methods and systems then employ clustering methods to identify outlying transformed-metric-data observations, accordingly label the transformed metric-data observations to generate a training dataset, and then apply one or more of various types of machine-learning techniques to the training dataset in order to generate an abnormal-observation detector that can be used to detect, in real time, abnormal metric-data observations as they are generated within the distributed computing system.

23 Claims, 51 Drawing Sheets

(56) References Cited

U.S. PATENT DOCUMENTS

| | | | | |
|---|---|---|---|---|
| 8,886,574 B2* | 11/2014 | Yuan | ............... | G05B 23/0229 |
| | | | | 706/12 |
| 9,355,007 B1* | 5/2016 | Eicher | ............... | G06F 11/3428 |
| 9,911,083 B2* | 3/2018 | Chamness | ............... | G06N 20/00 |
| 10,108,296 B2* | 10/2018 | Katsuki | ............... | G06K 9/6269 |
| 10,558,543 B2* | 2/2020 | Harutyunyan | ............... | G06F 11/301 |
| 2012/0041575 A1* | 2/2012 | Maeda | ............... | G05B 23/024 |
| | | | | 700/80 |
| 2015/0379167 A1* | 12/2015 | Griffith | ............... | G06F 11/3442 |
| | | | | 703/22 |
| 2016/0203036 A1* | 7/2016 | Mezic | ............... | G06N 20/00 |
| | | | | 714/819 |
| 2017/0097980 A1* | 4/2017 | Ishii | ............... | G06F 16/285 |
| 2018/0024875 A1* | 1/2018 | Della Corte | ............... | G06F 11/079 |
| | | | | 714/37 |
| 2018/0060150 A1* | 3/2018 | Cunico | ............... | G06F 3/033 |
| 2018/0137224 A1* | 5/2018 | Hemmer | ............... | H03M 7/405 |
| 2018/0150547 A1* | 5/2018 | Pallath | ............... | G06N 20/00 |
| 2019/0294524 A1* | 9/2019 | Gupta | ............... | G06F 11/364 |
| 2019/0294933 A1* | 9/2019 | Gupta | ............... | E06B 7/32 |
| 2019/0334802 A1* | 10/2019 | Dutta | ............... | H04L 43/16 |

\* cited by examiner

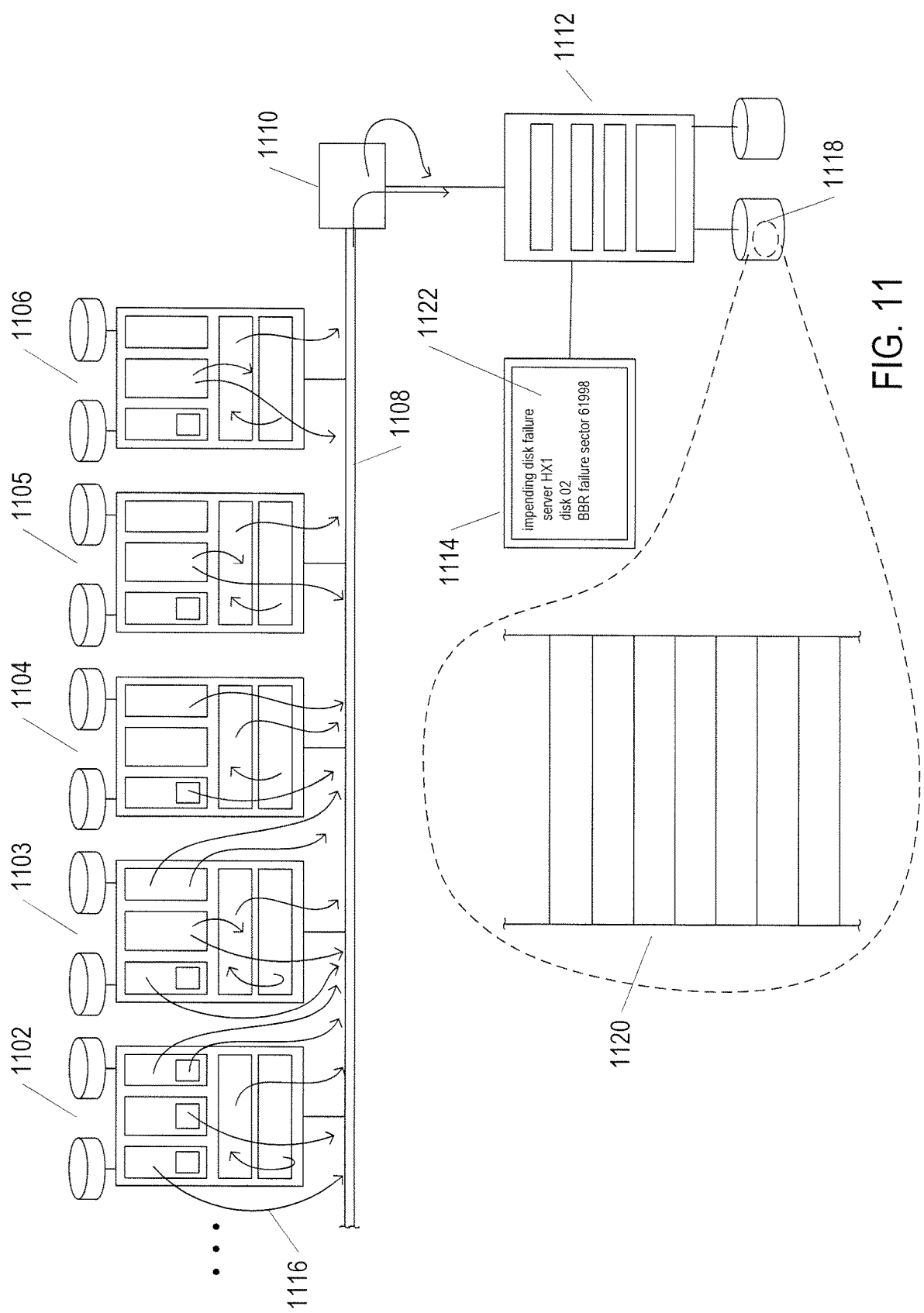

```
     1208   1210
1202
   ┌──────────────────────────────────────────────────────┐
   │ 2013-12-02T10:44:24.095Z li-qe-esx5.vmware.com Rhttpproxy: │
   │ [28959B90 verbose 'Proxy Req 46691'] Connected to    │
   │ localhost:8307 ──── 1212              ── 1206        │
   ├──────────────────────────────────────────────────────┤
   │ 2013-12-02T10:44:24.094Z li-qe-esx5.vmware.com Rhttpproxy: │
   │ [FFFC2B90 verbose 'Proxy Req 46691'] new proxy client│
   │ TCP (local=127.0.0.1:80, peer=127.0.0.1:50155)       │
   ├──────────────────────────────────────────────────────┤
   │ 2013-12-02T10:44:24.093Z li-qe-esx5.vmware.com Rhttpproxy: │
   │ [2889B90 verbose 'Proxy Req 46685'] The client closed the │
   │ stream, not unexpectedly.                            │
   ├──────────────────────────────────────────────────────┤
   │ Dec  2 18:48:29 strata-vc 2013-12-02T18:48:30.273Z   │
   │ [7FA39448B700 info 'commonvpxLro' opID=1947d6f9] [VpxLRO] - │
   │ FINISH task-internal-2163522 -- -- vim.SessionManager.logout - │
   ├──────────────────────────────────────────────────────┤
   │ 2013-12-02T18:48:51.396Z strata-esx1.eng.vmware.com Vpxa: │
   │ [65B5AB90 verbose 'VpxaHalCnxHostagent' opID=WFU-ed393333] │
   │ [WaitForUpdatesDone] Completed callback              │
   ├──────────────────────────────────────────────────────┤
   │ 2013-12-02T18:48:51.395Z strata-esx1.eng.vmware.com Vpxa: │
   │ [65B5AB90 verbose 'VpxaHalCnxHostagent' opID=WFU-ed393333] │
   │ [WaitForUpdatesDone] Starting next WaitForUpdates() call to │
   │ hostd                                                │
   ├──────────────────────────────────────────────────────┤   1204
   │ 2013-12-02T18:48:51.395Z strata-esx1.eng.vmware.com Vpxa: │
   │ [65B5AB90 verbose 'vpxavpxaInvtVm' opID=WFU-ed393333]│
   │ [VpxaInvtVmChangeListener] Guest DiskInfo Changed    │
   ├──────────────────────────────────────────────────────┤
   │ 2013-12-02T18:48:51.395Z strata-esx1.eng.vmware.com Vpxa: │
   │ [65B5AB90 verbose 'halservices' opID=WFU-ed393333]   │
   │ [VpxaHalServices] VMGuestDiskChange Event for vm(6) 59 │
   ├──────────────────────────────────────────────────────┤
   │ 2013-12-02T18:48:51.395Z strata-esx1.eng.vmware.com Vpxa: │
   │ [65B5AB90 verbose 'hostdvm' opID=WFU-ed393333]       │
   │ [VpxaHalVmHostagent] 59: GuestInfo changed 'guest.disk' │
   ├──────────────────────────────────────────────────────┤
   │ 2013-12-02T18:48:51.395Z strata-esx1.eng.vmware.com Vpxa: │
   │ [65B5AB90 verbose 'VpxaHalCnxHostagent' opID=WFU-ed393333] │
   │ [VpxaHalCnxHostagent::ProcessUpdate] Applying updates from │
   │ 123718 to 123719 (at 123718)                         │
   ├──────────────────────────────────────────────────────┤
   │ 2013-12-02T18:48:51.395Z strata-esx1.eng.vmware.com Vpxa: │
   │ [65B5AB90 verbose 'VpxaHalCnxHostagent' opID=WFU-ed393333] │
   │ [WaitForUpdatesDone] Received callback               │
   │ 2013-12-02T18:48:51.360Z li-dev-esx6.eng.vmware.com Hostd: │
   │ [617C1B90 error 'SoapAdapter.HTTPService'] HTTP Transaction │
   └──────────────────────────────────────────────────────┘
```

FIG. 12

$$\tilde{X} = \begin{bmatrix} \tilde{x}_{1,1} & \tilde{x}_{1,2} & \tilde{x}_{1,3} & \cdots & \tilde{x}_{1,p} \\ \tilde{x}_{2,1} & \tilde{x}_{2,2} & \tilde{x}_{2,3} & \cdots & \tilde{x}_{2,p} \\ \vdots & & & & \vdots \\ \tilde{x}_{N,1} & \tilde{x}_{N,2} & \tilde{x}_{N,3} & \cdots & \tilde{x}_{N,p} \end{bmatrix}$$

1702, j = 2

$$\xrightarrow{}\ \dfrac{\sum_{i=1}^{N} \tilde{x}_{i,j}}{N} \longrightarrow \mu_j = \text{mean of column } j \quad \text{—1706}$$

$$\dfrac{\sum_{i=1}^{N} (\tilde{x}_{i,j} - \mu_j)^2}{N} \longrightarrow \sigma_j^2 = \text{measure of column } j \quad \text{—1708}$$

$$\sqrt{\sigma_j^2} = \sigma_j = \text{standard division of column } j \quad \text{—1710}$$

1704

$$x_{i,j} = \dfrac{\tilde{x}_{i,j} - \mu_j}{\sigma_j}$$

1712

$$X = \begin{bmatrix} x_{1,1} & x_{1,2} & x_{1,3} & \cdots & x_{1,p} \\ x_{2,1} & x_{2,2} & x_{2,3} & \cdots & x_{2,p} \\ \vdots & & & & \vdots \\ x_{N,1} & x_{N,2} & x_{N,3} & \cdots & x_{N,p} \end{bmatrix} = X$$

$$A = \begin{bmatrix} a_{11} & a_{12} & a_{13} \\ a_{21} & a_{22} & a_{23} \\ a_{31} & a_{32} & a_{33} \end{bmatrix} \quad \text{—1802}$$

$$u = \begin{bmatrix} u_1 \\ u_2 \\ u_3 \end{bmatrix} \quad \text{—1804}$$

$$Au = \lambda u \quad \text{—1806}$$

$$\begin{bmatrix} a_{11} & a_{12} & a_{13} \\ a_{21} & a_{22} & a_{23} \\ a_{31} & a_{32} & a_{33} \end{bmatrix} \begin{bmatrix} u_1 \\ u_2 \\ u_3 \end{bmatrix} = \begin{bmatrix} a_{11}u_1 + a_{12}u_2 + a_{13}u_3 \\ a_{21}u_1 + a_{22}u_2 + a_{23}u_3 \\ a_{31}u_1 + a_{32}u_2 + a_{33}u_3 \end{bmatrix} = \begin{bmatrix} \lambda u_1 \\ \lambda u_2 \\ \lambda u_3 \end{bmatrix} \quad \text{—1808}$$

$Au - \lambda u = 0$ —1810

$(A - \lambda I)u = 0$ —1812

$u = (A - \lambda I)^{-1}0$ —1814

$|A - \lambda I| = 0$ —1816

FIG. 18

$$\begin{vmatrix} a_{11}-\lambda & a_{12} & a_{13} \\ a_{21} & a_{22}-\lambda & a_{23} \\ a_{31} & a_{32} & a_{33}-\lambda \end{vmatrix} = a_{11}-\lambda \begin{vmatrix} a_{22}-\lambda & a_{23} \\ a_{32} & a_{33}-\lambda \end{vmatrix} + a_{12} \begin{vmatrix} a_{23} & a_{21} \\ a_{33}-\lambda & a_{31} \end{vmatrix} + a_{13} \begin{vmatrix} a_{21} & a_{22}-\lambda \\ a_{31} & a_{32} \end{vmatrix}$$   — 1902

$$0 = a\lambda^3 + b\lambda^2 + c\lambda + d$$   — 1904

$$AU = \Lambda U, \text{ where } \mathbf{U} = \begin{bmatrix} u_1 & u_2 & u_3 \end{bmatrix} \text{ and } \Lambda = \begin{bmatrix} \lambda_1 & 0 & 0 \\ 0 & \lambda_2 & 0 \\ 0 & 0 & \lambda_3 \end{bmatrix}$$   — 1906

$$A = U\Lambda U^{-1}$$   — 1908

$$A = X^T X \Rightarrow \lambda_i \geq 0; \quad U_i \cdot U_j = 0 \text{ when } \lambda_i \neq \lambda_j; \quad U^{-1} = U^T$$   — 1910, 1912

$$A = U\Lambda U^T$$   — 1911, 1913

FIG. 19

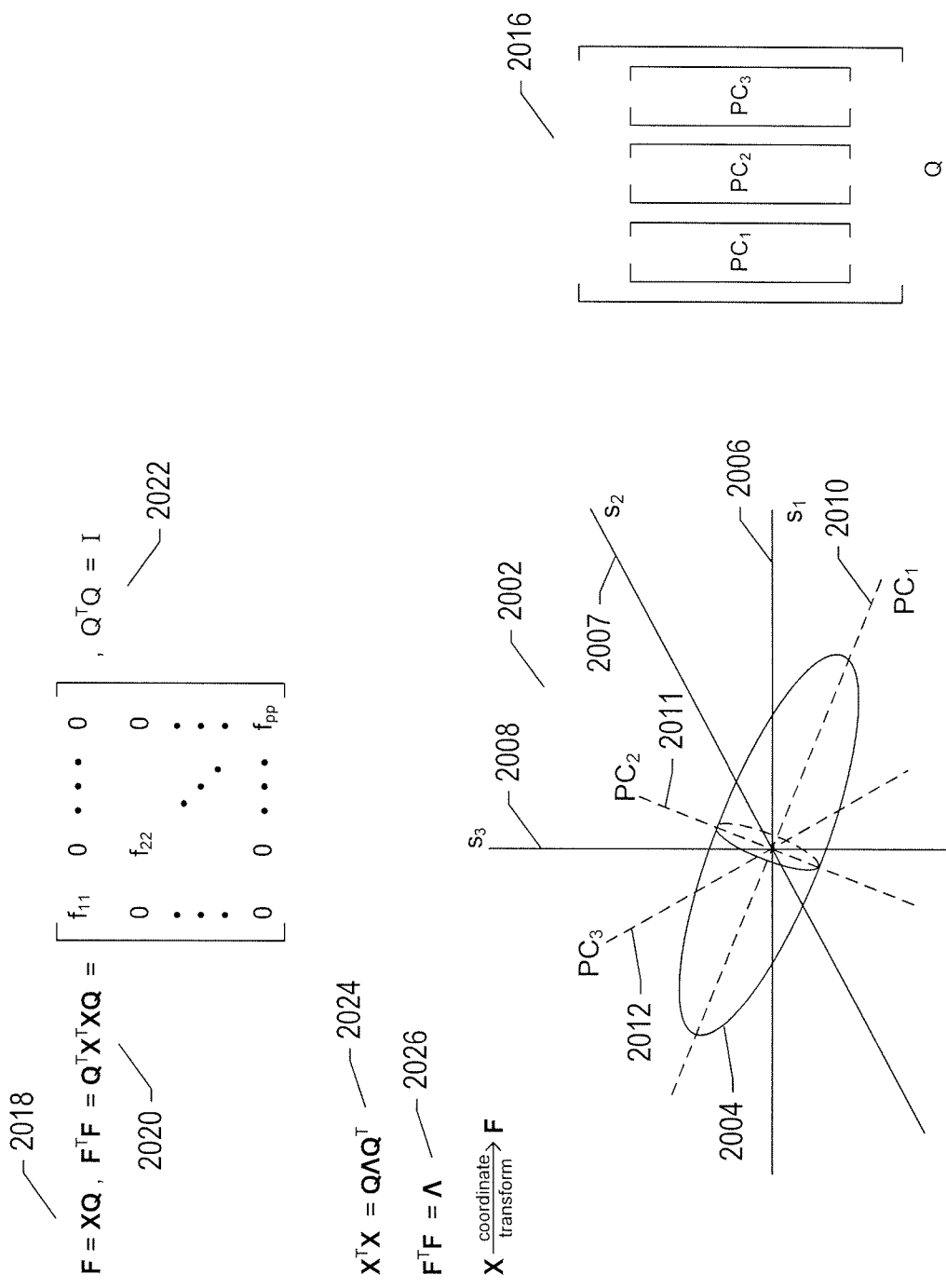

```
const int MaxDim = 4;
const int MaxClusters = 20;     ⎫
const int MaxOutliers = 50;     ⎬ 2302
const int MaxData = 200;        ⎭
const double Threshold = 0.5;  ─── 2303
const int BigNumber = 0xFFFFFFF;

typedef struct
{                                 ⎫
        double coordinates[MaxDim];  ⎬ 2304
} Point;                          ⎭ typedef struct
{
        double distance;          ⎬ 2305
        int index;
} DistIndex;
                                  ─── 2306
typedef double(*Dist)(Point x, Point y, int dim);
```

FIG. 23A

```
class clusteredData
{
        private:
                Point* dataPoints;        —— 2307
                int numDataPoints;        —— 2308
                Dist dist;                —— 2309
                int k;                    —— 2310
                int l;                    —— 2311
                int numD;                 —— 2312
                Point* clusters;          —— 2313
                Point* newClusters;       —— 2314
                int split;                —— 2315

Point clusters1[MaxClusters];      —— 2316
                Point clusters2[MaxClusters];      —— 2317
                double minOutlierDistance;         —— 2318
                bool already[MaxData];             —— 2319
                DistIndex distances[MaxData];      —— 2320
                double indexedDistances[MaxData];  —— 2321
                int clusterAssignments[MaxData];   —— 2322 void init();                       —— 2323
                void randomInitialClusters();      —— 2324
                void clusterDataPoints();          —— 2325
                void recluster();                  —— 2326
                bool convergence();                —— 2327 public:                                                     —— 2328
                void cluster (Point* data, int num, int numDimensions, Dist d, int K, int L);

```
int compare(const void * a, const void * b)
{
        DistIndex* A;
        DistIndex* B;
        A = (DistIndex*)a;                                                    ⎫
        B = (DistIndex*)b;                                                    ⎬ 2330 if (A->distance < B->distance) return 1;
        if (A->distance == B->distance) return 0;
        return -1;                                                            ⎭
}
                                  ┌ 2332  ┌ 2333      ┌ 2334   ┌ 2335  ┌ 2336
                                                                       ┌ 2337
void clusteredData::cluster(Point* data, int num, int numDimensions, Dist d, int K, int L)
{
        dataPoints = data;          ⎫
        numDataPoints = num;        ⎪
        dist = d;                   ⎬ 2338
        k = K;                      ⎪
        l = L;                      ⎪
        numD = numDimensions;       ⎭
        clusters = clusters1;       ⎫ 2339
        newClusters = clusters2;    ⎭
        init();     ── 2340
        randomInitialClusters();  ── 2341
        clusterDataPoints();  ── 2342
        while (true)
        {
                recluster();  ── 2344
                if (convergence()) break;  ── 2345

┌  if (clusters == clusters1)
                │  {
                │          clusters = clusters2;
                │          newClusters = clusters1;
         2346 ⎨  }
                │  else
                │  {
                │          clusters = clusters1;
                │          newClusters = clusters2;
                └  }
                clusterDataPoints();  ── 2347
        }
}
```

FIG. 23C

```
void clusteredData::init()
{
    int i;
                                                                    ⎫
    for (i = 0; i < numDataPoints; i++) already[i] = false;         ⎬ 2350
                                                                    ⎭
} void clusteredData::randomInitialClusters()
{
    int i = 0;
    int j, nxt;
    int multiplier;

multiplier = (numDataPoints / RAND_MAX) + 1;
    while (i < k)
    {
        nxt = (rand() % numDataPoints) * multiplier;  ⎯ 2352
        while (nxt > numDataPoints) nxt -= rand() % (numDataPoints / 2);
        if (already[nxt]) continue;
        else                            ⎯ 2353
        {
            already[nxt] = true;
            for (j = 0; j < numD; j++)
            {
                clusters[i].coordinates[j] = dataPoints[nxt].coordinates[j];   ⎬ 2354
            }
            i++;
        }
    }
}
```

FIG. 23D

```
void clusteredData::clusterDataPoints()
{
        int i, j;
        double nxtD;
        double minD;
        int minK;

for (i = 0; i < numDataPoints; i++)
        {
                minD = BigNumber;
                for (j = 0; j < k; j++)
                {
                        nxtD = dist(dataPoints[i], clusters[j], numD);
                        if (nxtD < minD)
                        {
                                minD = nxtD;
                                minK = j;
                        }
                }
                distances[i].distance = minD;
                distances[i].index = i;
                indexedDistances[i] = minD;
                clusterAssignments[i] = minK;
        }
        qsort(&(distances[0]), numDataPoints, sizeof(DistIndex), compare);
        minOutlierDistance = distances[l - 1].distance;
        split = 0;
        for (i = l; i < numDataPoints; i++)
        {
                if (distances[i].distance == minOutlierDistance) split++;
                else break;
        }
}
```

- 2356 { for loop (outer)
- 2357 { inner for loop
- 2358 } distances assignment block
- 2359 qsort line
- 2360 minOutlierDistance line
- 2361 { split loop

FIG. 23E

```
void clusteredData::recluster()
{
    bool valid;
    int i, j;
    double sum[MaxClusters][MaxDim];
    int kCount[MaxClusters];

2363 {
    for (i = 0; i < k; i++)
    {
        for (j = 0; j < numD; j++) sum[i][j] = 0;
        kCount[i] = 0;
    }
}

2364 {
    for (i = 0; i < numDataPoints; i++)
    {
        2365 {
            valid = false;
            if (indexedDistances[i] == minOutlierDistance)
            {
                for (j = 0; j < split; j++)
                {
                    if (distances[i].index == i) valid = true;
                }
            }
            else if (indexedDistances[i] < minOutlierDistance) valid = true;
        }
        if (valid)
        {
            2366 {
                for (j = 0; j < numD; j++) sum[clusterAssignments[i]][j] +=
                    dataPoints[i].coordinates[j];
                kCount[clusterAssignments[i]]++;
            }
        }
    }
    2367 {
        for (i = 0; i < k; i++)
            for (j = 0; j < numD; j++)
                newClusters[i].coordinates[j] = sum[i][j] /= kCount[i];
    }
}
}
```

FIG. 23F

```
bool clusteredData::convergence()
{
        int i;

for (i = 0; i < k; i++)
        {
                if (dist(clusters[i], newClusters[i], numD) > Threshold) return false;
        }
        return true;
}
```
⎬ 2370

```
double distance(Point x, Point y, int dim)
{
        int i;
        double sum = 0;

for (i = 0; i < dim; i++)
        {
                sum += pow(x.coordinates[i] - y.coordinates[i], 2);
        }
        return (sqrt(sum));

}
```
⎬ 2371

```
        clusteredData C;                    ← 2372
        C.cluster(data, num, 2, distance, 2, 20);    ← 2373

```
char Trule[5] = { 't', 'r', 'u', 'e', '\0' };
char* T = Trule;
char Frule[6] = { 'f', 'a', 'l', 's', 'e', '\0' };
char* F = Frule;
const int MAX_RULE = 1000;    — 2504
                                                                } 2502 typedef enum label {NORMAL, ABNORMAL, UNKNOWN} Label;  — 2506
class node;
node* null = 0;  — 2507 class rule
{
   public:
      void setRule(char* r);
      void applyRule(data* in, data* T, data* F);  — 2509
      bool applyRule(datum* d);
      rule& operator = (rule& r);   — 2510
      rule(char* r);
                                      — 2511
};                                                      } 2508 class attributes
{
   public:
      int num();
      int getDataIndex(int a_index);   — 2513
      void remove(int a_index);
      attributes& operator = (attributes& a);
      attributes();
};                                                      } 2512 class datum
{ public:
      double getElement(int index);
};                                                      } 2514
```

FIG. 25A

```
class data
{
    public:
        int getNum();
        datum getDatum(int index);
        Label getLabel(int index);
        double getEntropy();
        data();
};
```
— 2516
— 2517
— 2518
— 2519

2522 — $N = \{d \in D | \text{label}(d) = \text{normal}\}$
2523 — $A = \{d \in D | \text{label}(d) = \text{abnormal}\}$
2521 — $D = \text{a set of observations}$
2524 — $H(d) = \text{entropy of } D = -\frac{|N|}{|D|}\log_2\left(\frac{|N|}{|D|}\right) - \frac{|A|}{|D|}\log_2\left(\frac{|A|}{|D|}\right)$
2525 — $T = \{D_1, D_2\}$ where $D = D_1 + D_2$
2526 — $\text{gain } (D \rightarrow D_1, D_2) = H(D) - \sum_{i+1}^{z}\frac{|D_i|}{|D|}H(D_i)$

2520
— 2527

```
class node
{
    private:
        node* Tptr;         — 2531
        node* Fptr;         — 2532
        Label Tlabel;       — 2533
        Label Flabel;       — 2534
        rule r;             — 2535
    public:
        node* getTptr();
        void setTptr(node* p);
        node* getFptr();
        void setFptr(node* p);
        Label getTlabel();      — 2536
        void setTlabel(Label l);
        Label getFlabel();
        void setFlabel(Label l);
        void setRule(rule r);
        void applyRule(data* in, data* T, data* F) {r.applyRule(in, T, F);};  — 2537
        bool applyRule(datum* d) {r.applyRule(d);};                            — 2538
        node(rule r);       — 2539
};
```
2530

FIG. 25B

```
void copyRule(char* r1, char* r2)
{
}                                                    } 2540 double determine_rule(data& d, int a_index, char* r)
{
}                                                    } 2541 node* grow_decision_tree(data& d, attributes& a)
{
        int i;                    2543         2544
        rule r(T);
        node* n = new node(r);
        char r1[MAX_RULE];            2545
        char maxR[MAX_RULE];
        double gain;
        double maxGain = -1;
        int maxAtt;
        data dT, dF;
        attributes a1;

if (a.num() > 0)  ———— 2546
        {
                for (i = 0; i < a.num(); i++)
                {
                        gain = determine_rule(d, a.getDataIndex(i), r1);
                        if (gain > maxGain)
2547                    {
                                maxGain = gain;
                                maxAtt = i;
                                copyRule(maxR, r1);
                        }
                }
        }
        if (a.num() == 0 || maxGain <= 0)  ———— 2548
        {
                n->setTptr(null);
                n->setTlabel(UNKNOWN);   } 2549
                return n;
        }
        r.setRule(maxR);   } 2550
        n->setRule(r);
        n->applyRule(&d, &dT, &dF);  ———— 2552
        a1 = a;
        a1.remove(i);  ———— 2553 n->setTptr(grow_decision_tree(dT, a1));  } 2554
        n->setFptr(grow_decision_tree(dF, a1));
}
```

FIG. 25C

```
                                                      2561      2562
2563                                                  /         /
   \       node* build_decision_tree(data& d, attributes& a)
           {
                   rule r(T);

if (d.getNum() < 1) return null; ——— 2564
                   node* n = new node(r);
                   if (d.getEntropy() == 0) ——— 2565
                   {
                           n->setTptr(null);
                           n->setFptr(null);

if (d.getLabel(0) == NORMAL)
                           {
                                                                        2560
                                   n->setTlabel(NORMAL);
                                   n->setFlabel(ABNORMAL);      2566
                           }
                           else
                           {
                                   n->setTlabel(ABNORMAL);
                                   n->setFlabel(NORMAL);
                           }
                           return n;
                   }
                   n->setTptr(grow_decision_tree(d, a)); ——— 2567
                   return n;
           }
2573                       2571      2572
   \                       /         /
           label evaluate(datum* d, node* decision_tree)
           {
                   label res;
                   bool applyRes;
                   node* nxt;
                                                          2574
              applyRes = decision_tree->applyRule(d);
2575 ——       if (applyRes)
              {
                      nxt = decision_tree->getTptr();
                      if (nxt == null) return decision_tree->getTlabel();
              }                                                              2570
              else          ——— 2476                                 ——— 2577
              {
2578          {
                      nxt = decision_tree->getFptr();
                      if (nxt == null) return decision_tree->getFlabel();
              }
              return evaluate(d, nxt);
           }                           ——— 2580
```

FIG. 25D

METHODS AND SYSTEMS THAT DETECT AND CLASSIFY INCIDENTS AND ANOMALOUS BEHAVIOR USING METRIC-DATA OBSERVATIONS

TECHNICAL FIELD

The current document is directed to distributed computer systems and, in particular, to methods and subsystems that detect and classify, from enormous volumes of status, informational, and error data continuously generated, collected, and processed within a distributed computer system, the occurrences of abnormal events and operational behaviors within the distributed computer system and, more generally, detect the occurrences of specific types of events and operational behaviors.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. However, despite all of these advances, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed, and as general hardware and software technologies continue to advance, the current trend towards ever-larger and more complex distributed computing systems appears likely to continue well into the future.

In modern computing systems, individual computers, subsystems, and components generally output large volumes of status, informational, and error data. In large, distributed computing systems, terabytes of status, informational, and error data may be generated each day. The status, informational, and error data generally contain information that can be used to detect the potential for serious failures and operational deficiencies in the computer systems prior to the accumulation of a sufficient number of failures and system-degrading events to lead to subsequent data loss, component and subsystem failures, and down time. The information contained in the data may also be used to detect and ameliorate various types of security breaches and security issues, to intelligently manage and maintain distributed computing systems, and to diagnose many different classes of operational problems, hardware-design deficiencies, and software-design deficiencies. It has proved to be a challenging task for system administrators, system designers and developers, and system users to identify, within the enormous quantities of status, informational, and error data generated in distributed computing systems, specific information relevant to predicting, detecting, and diagnosing operational anomalies and relevant to identifying specific information that can be used for administering, managing, and maintaining distributed computer systems.

SUMMARY

The current document is directed to methods and systems for detecting, within the enormous volumes of status, informational, and error data continuously generated, collected, and processed within a distributed computer system, the occurrences of abnormal events and operational behaviors within the distributed computer system and, more generally, detects the occurrences of specific types events and operational behaviors. The currently described methods and systems continuously collect metric data from various metric-data sources, generate a sequence of metric-data observations, each metric-data observation comprising a set of temporally aligned metric data, and employ principle-component analysis to transform the metric-data observations to facilitate reduction of the dimensionality of the metric-data observations. The currently described methods and systems then employ clustering methods to identify outlying transformed-metric-data observations, accordingly label the transformed metric-data observations to generate a training dataset, and then apply one or more of various types of machine-learning techniques to the training dataset in order to generate an abnormal-observation detector that can be used to detect, in real time, abnormal metric-data observations as they are generated within the distributed computing system.

BRIEF DESCRIPTION OF THE DRAWINGS

In FIG. 9, three different physical data centers 902-904 are shown below planes representing the cloud-director layer of abstraction 906-908.

FIG. 11 illustrates a simple example of event-message logging and analysis.

FIG. 12 shows a small, 11-entry portion of a log file from a distributed computer system.

FIG. 17 illustrates scaling and normalization of the set of observations represented by a matrix $\tilde{X}$.

FIGS. 18 and 19 illustrate eigenvectors and eigenvalues.

FIGS. 20A-B illustrate the principal-component-analysis ("PCA") method.

FIGS. 23A-G provide a simple C++ implementation of one version of the modified K-means clustering process.

FIGS. 25A-D provides a pseudocode example for construction of a decision tree and traversal of a decision tree to determine the nature of an unlabeled observation.

DETAILED DESCRIPTION

Figure 1:
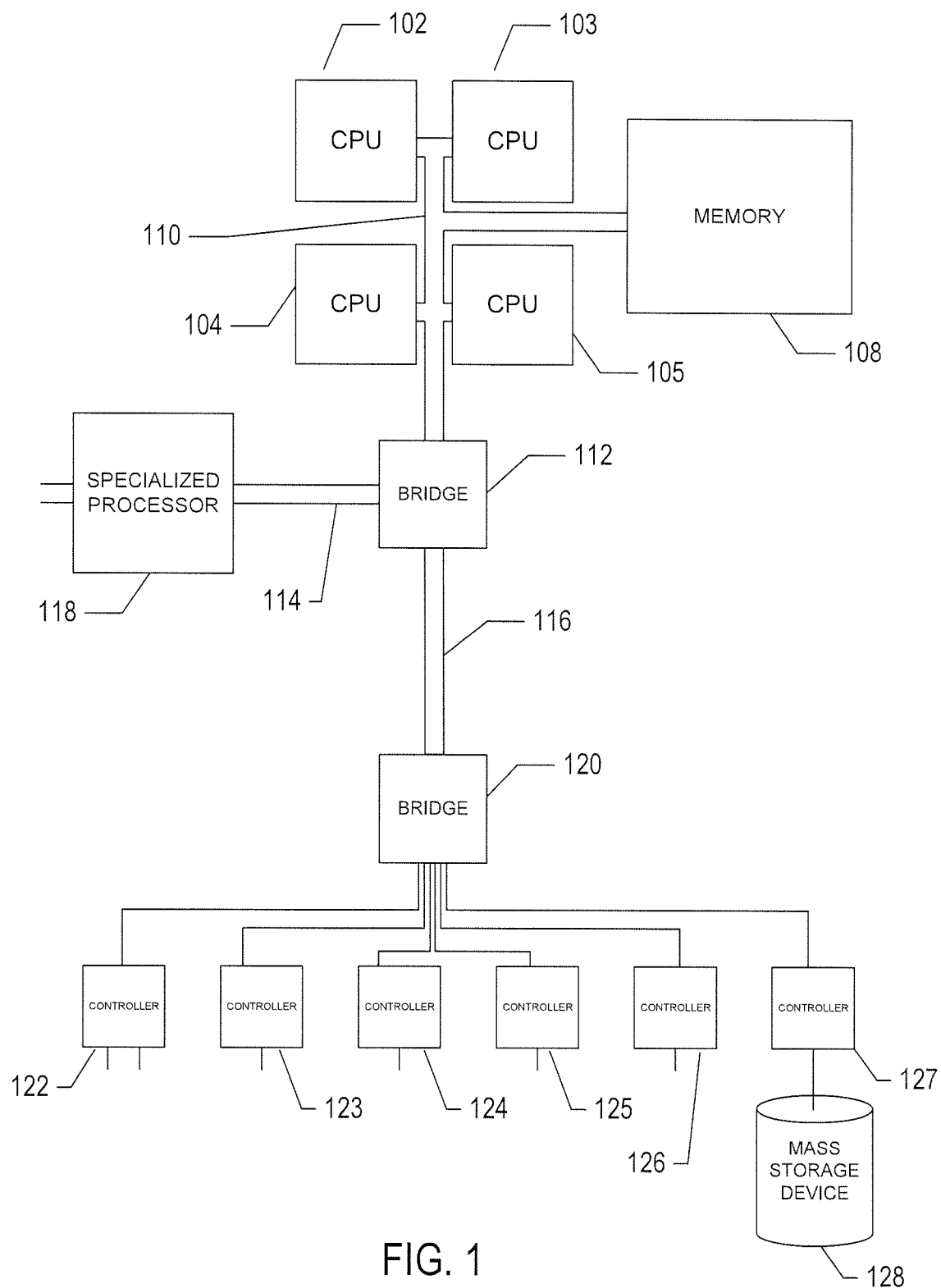
FIG. 1 provides a general architectural diagram for various types of computers.

The current document is directed to methods and systems that detect the occurrences of abnormal events and operational behaviors that occur within distributed computer systems. In a first subsection, below, a detailed description of computer hardware, complex computational systems, virtualization, and generation of status, informational, and error data is provided with reference to FIGS. 1-13. In a second subsection, implementations of the currently disclosed methods and systems are introduced and described in detail with reference to FIGS. 14A-26B.

Computer Hardware, Complex Computational Systems, Virtualization, and Generation of Status, Informational, and Error Data The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
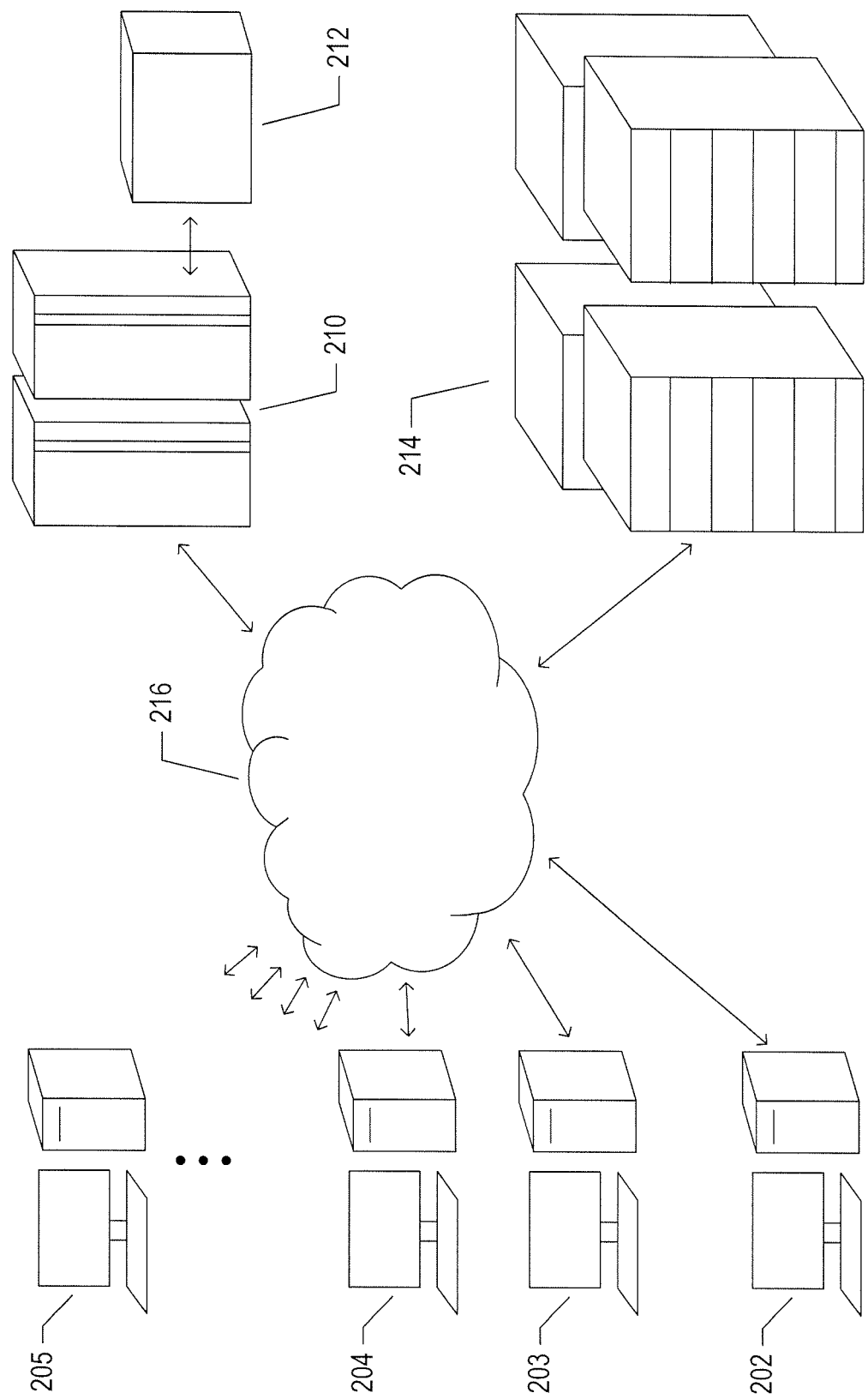
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
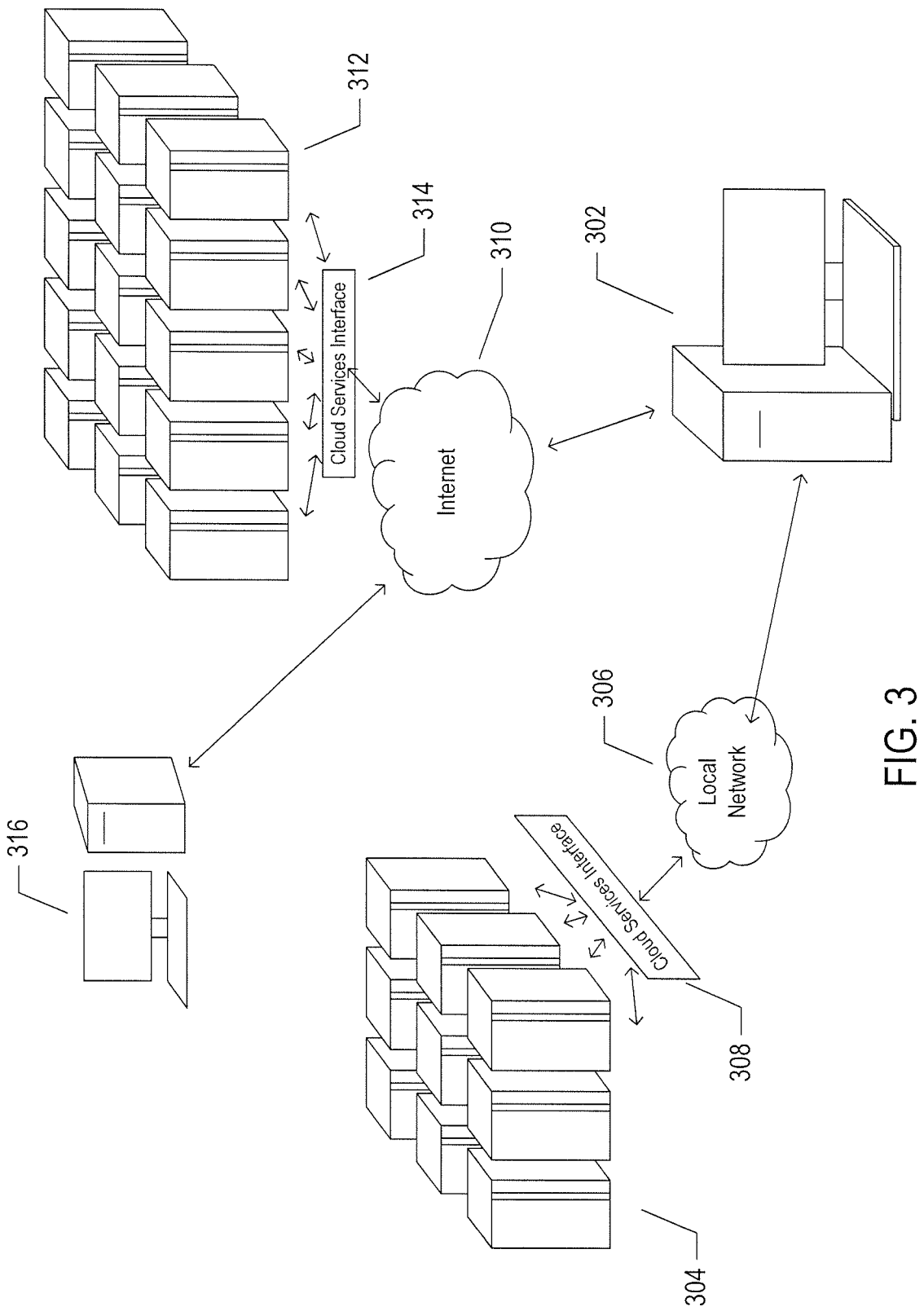
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
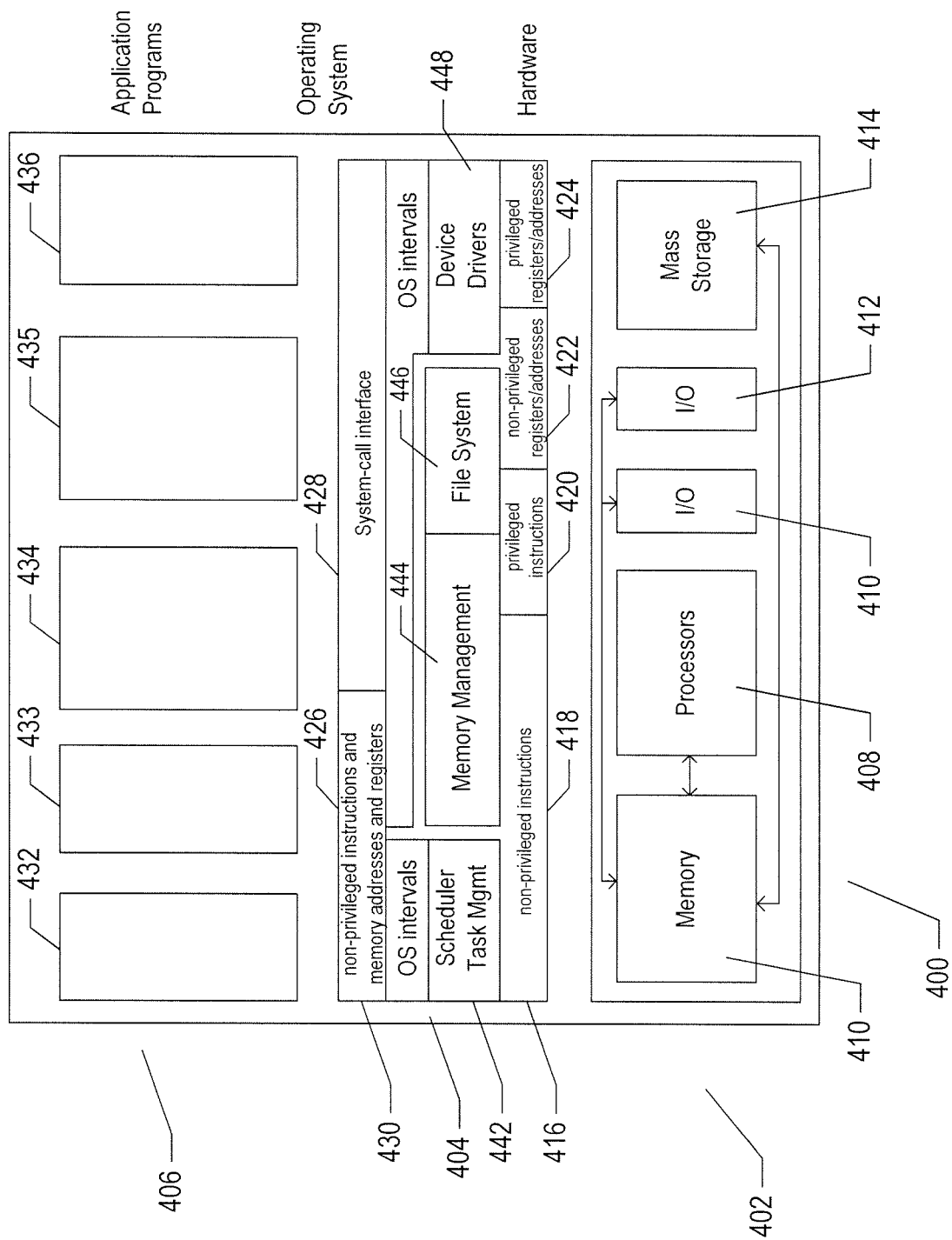
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
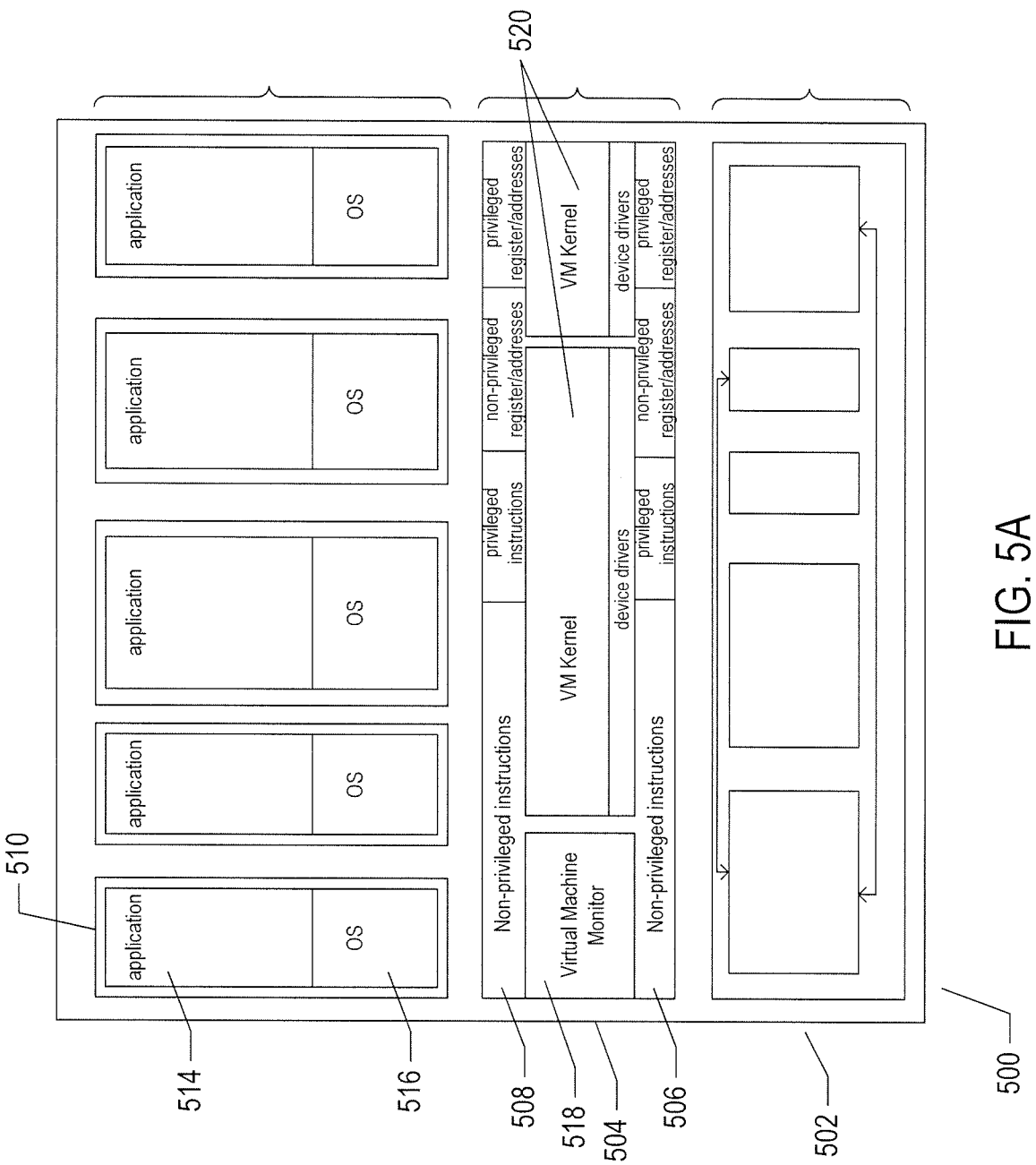
FIGS. 5A-B illustrate two types of virtual machine and virtual-machine execution environments.
Figure 5B:
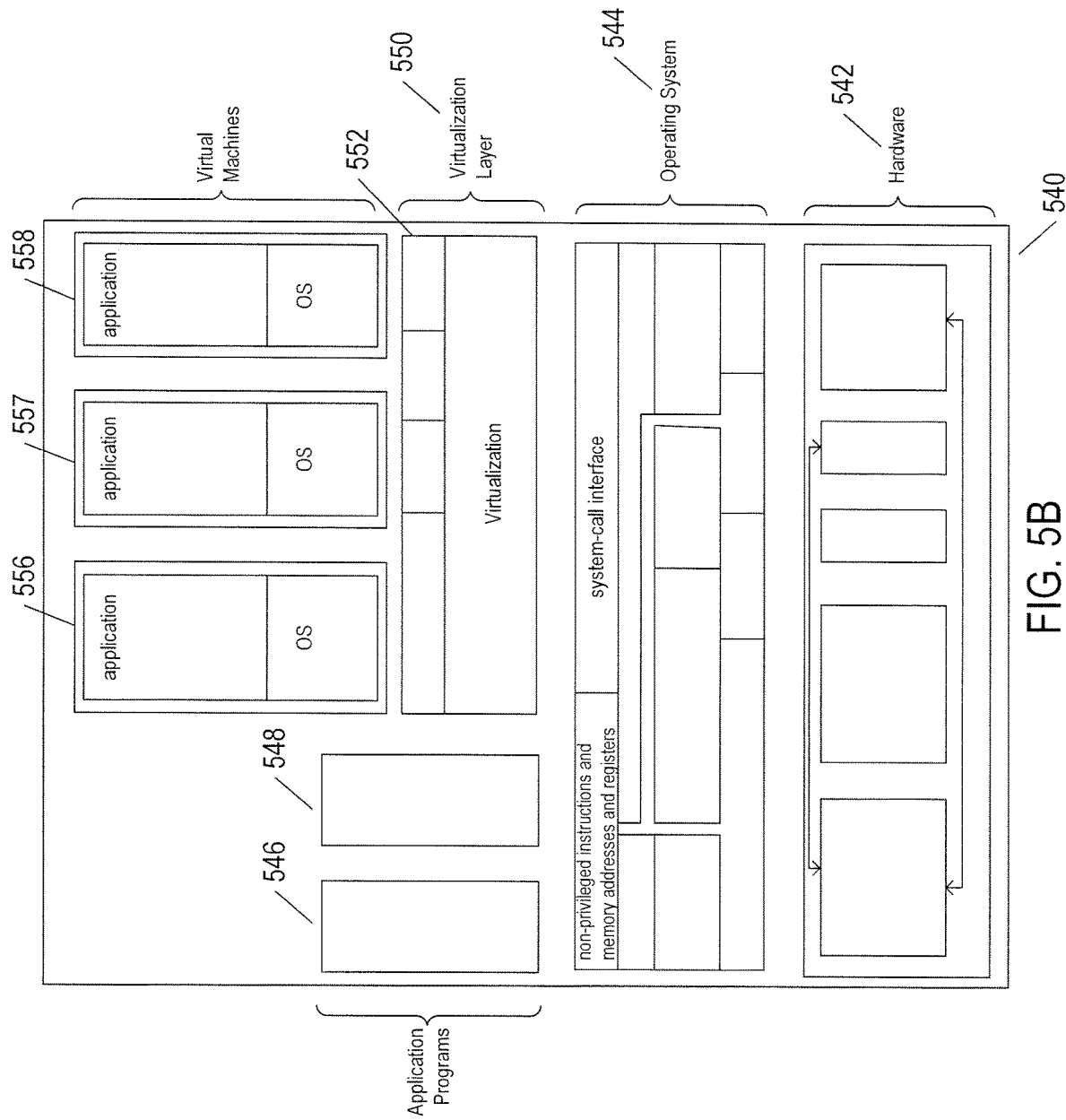

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
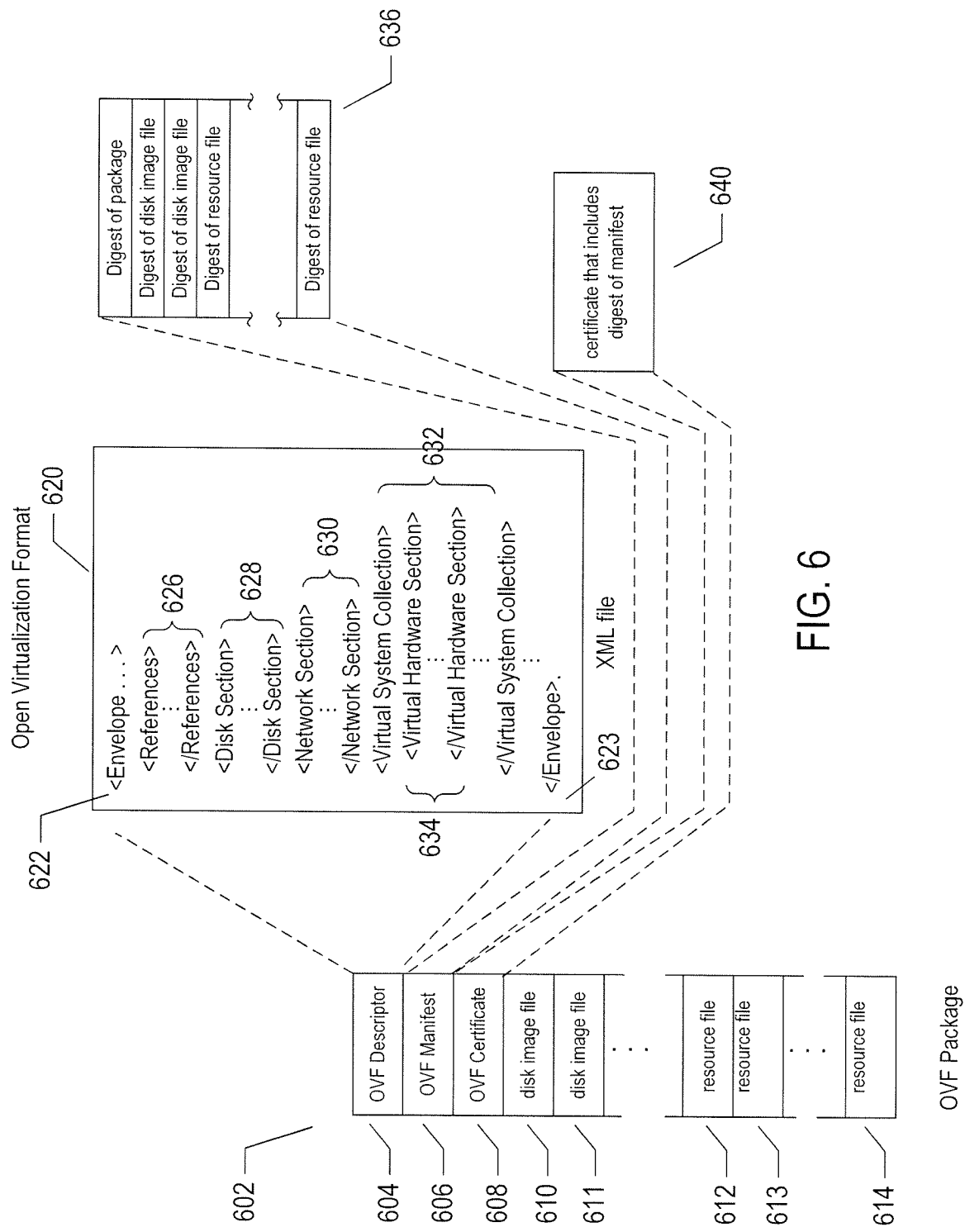
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
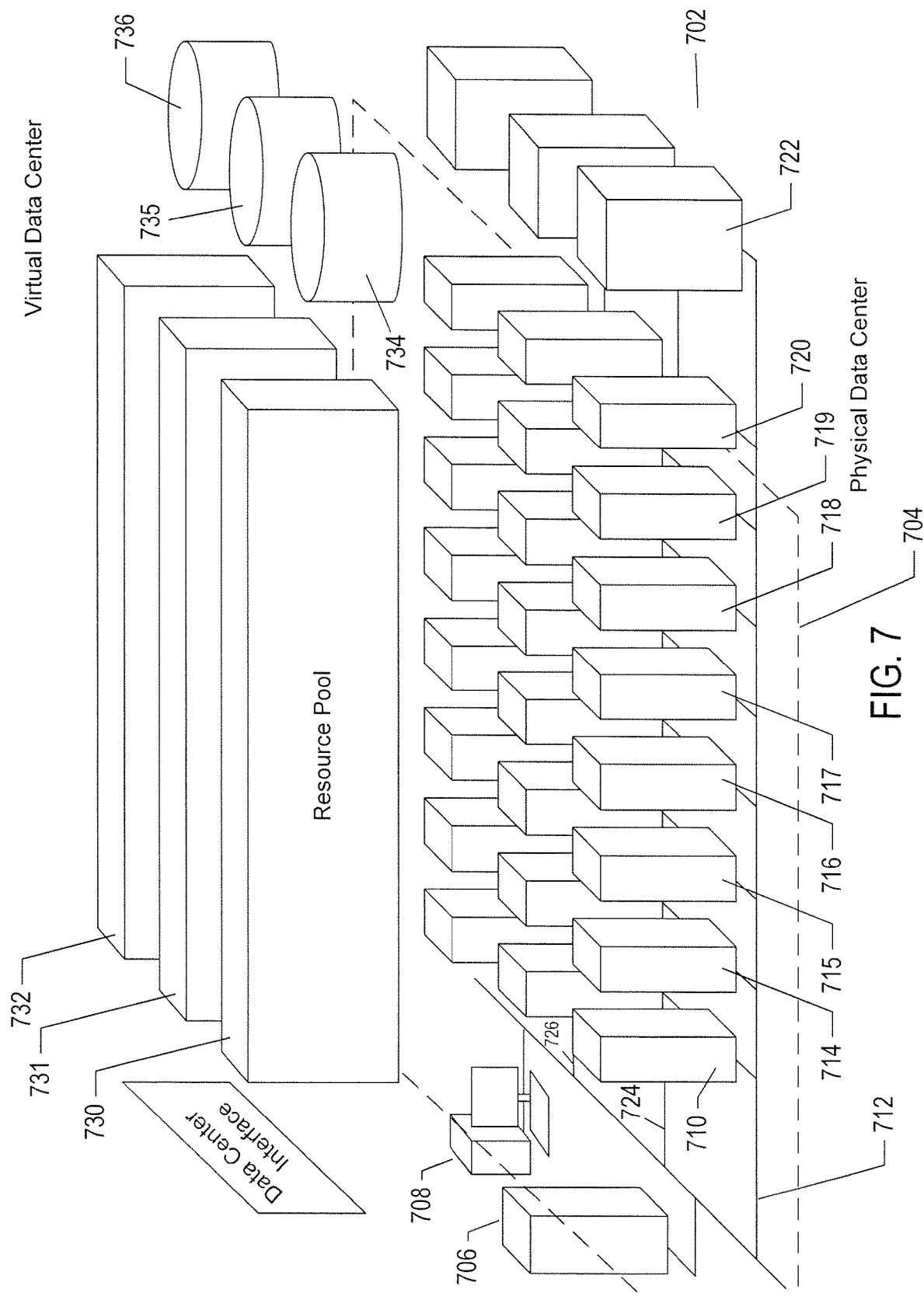
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
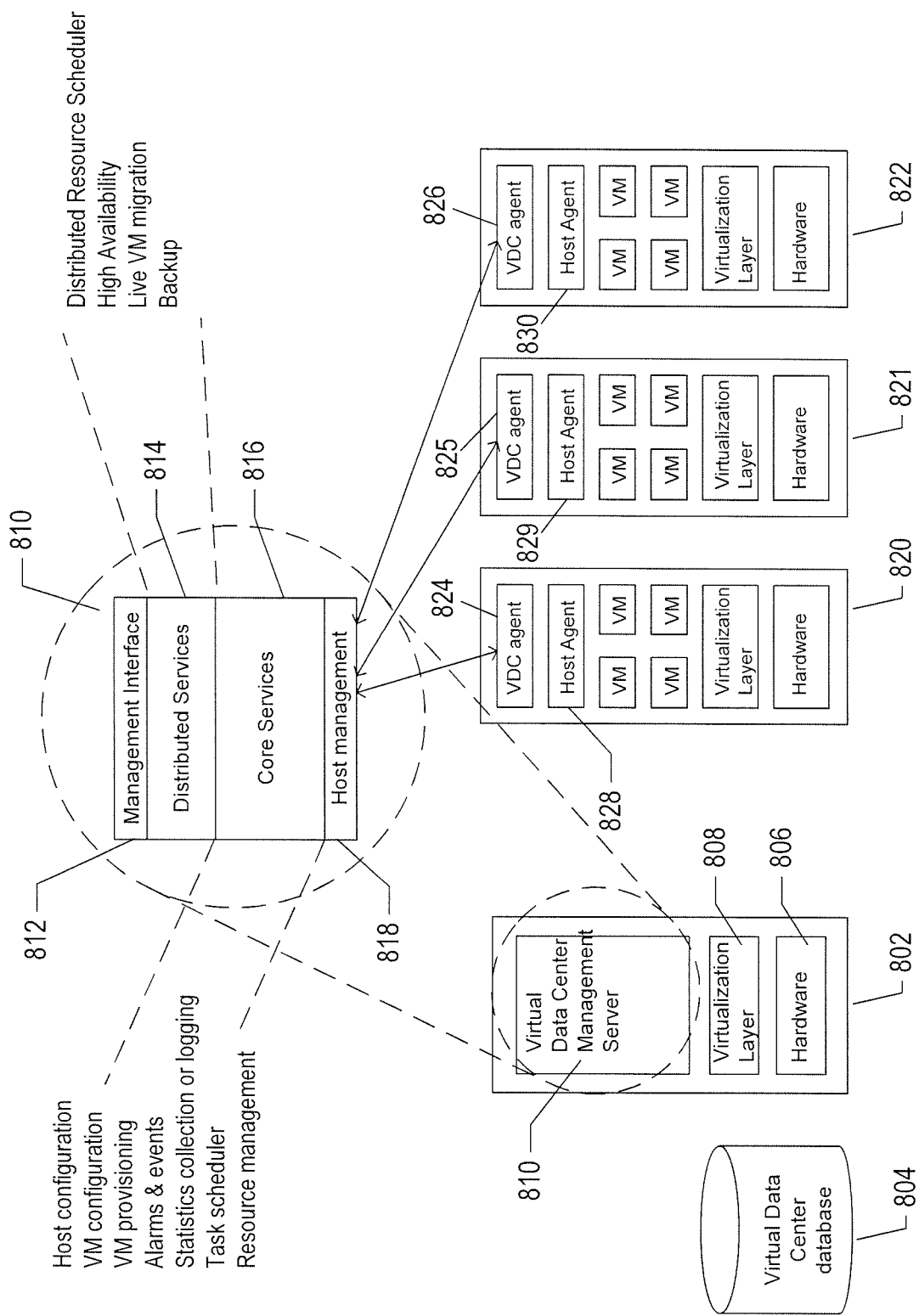
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
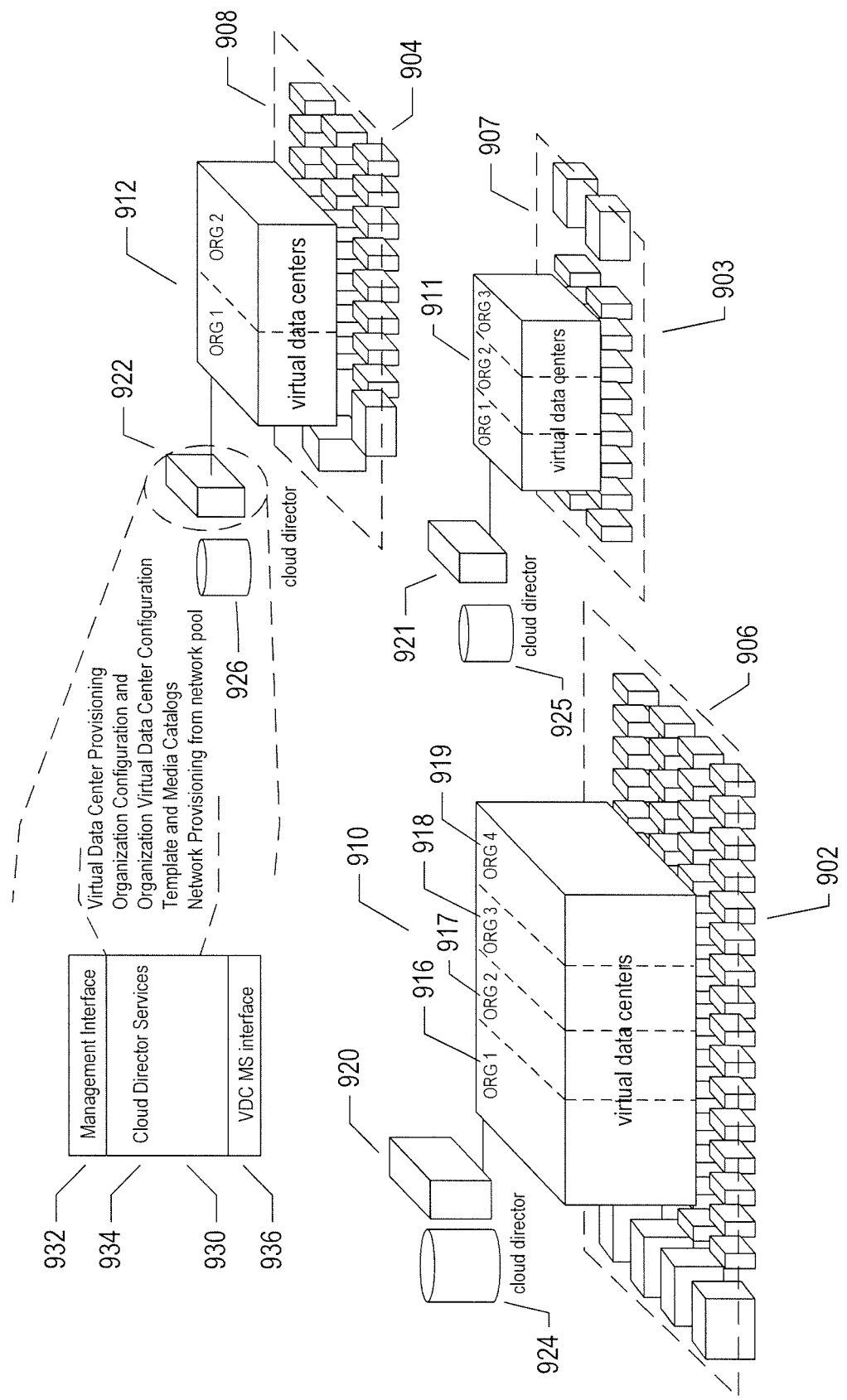
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
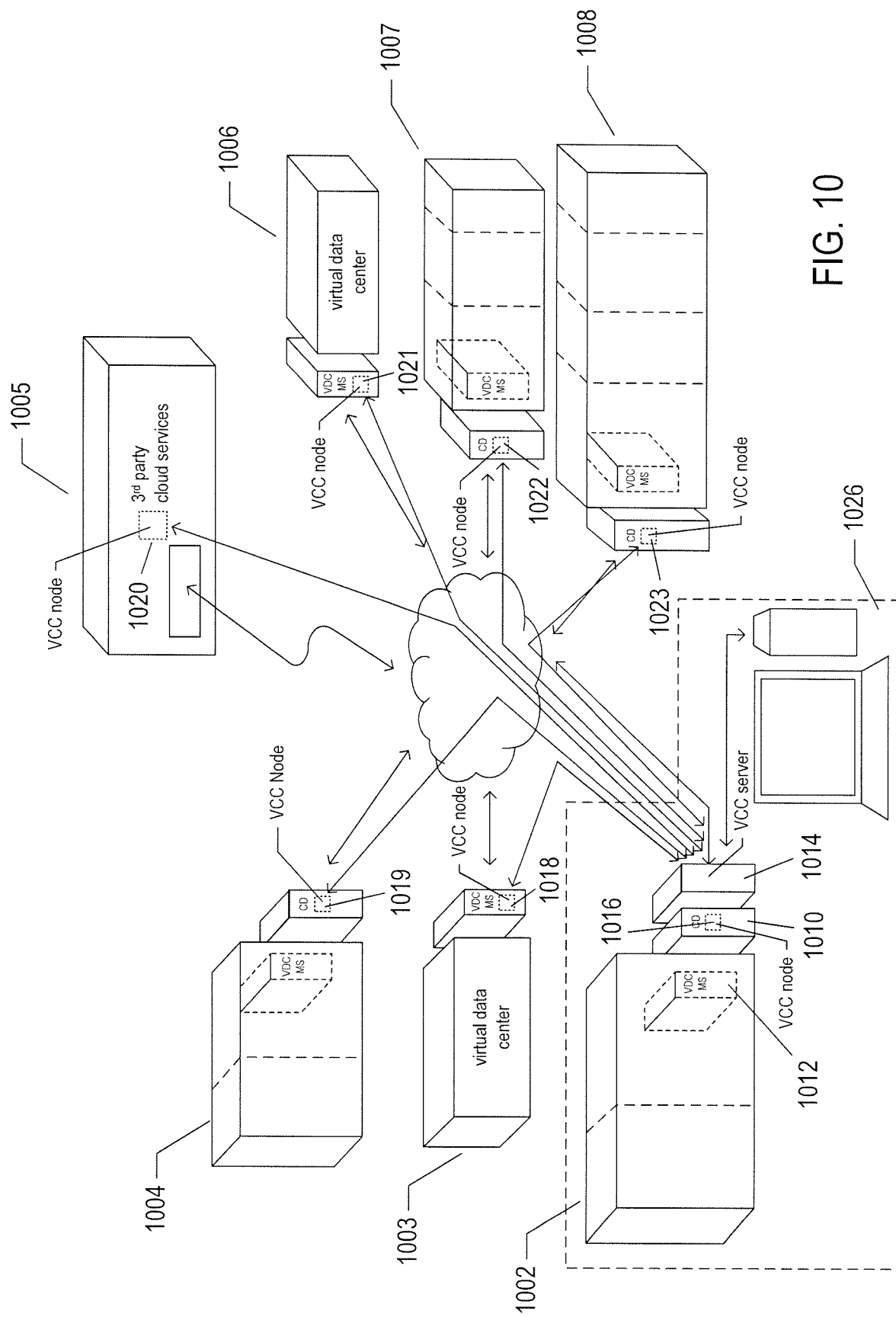
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

FIG. 11 illustrates a simple example of the generation and collection of status, informational, and error data the distributed computing system. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate various types of status, informational, and error data that is encoded within event messages which are ultimately transmitted to the administration computer 1112. Event messages are but one type of vehicle for conveying status, informational, and error data, generated by data sources within the distributed computer system, to a data sink, such as the administration computer system 1112. Data may be alternatively communicated through various types of hardware signal paths, packaged within formatted files transferred through local-area communications to the data sink, obtained by intermittent polling of data sources, or by many other means. The current example, the status, informational, and error data, however generated and collected within system subcomponents, is packaged in event messages that are transferred to the administration computer system 1112. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as large event-message log files 1120. Either through real-time analysis or through analysis of log files, the administration computer may detect operational anomalies and conditions for which the administration computer displays warnings and informational displays, such as the warning 1122 shown in FIG. 11 displayed on the administration-computer display device 1114.

FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as a numeric parameter 1212 which appears to identify a particular host computer.

There are a number of reasons why event messages, particularly when accumulated and stored by the millions in event-log files or when continuously received at very high rates during daily operations of a computer system, are difficult to automatically interpret and use. The volume of data present within log files generated within large, distributed computing systems. As mentioned above, a large, distributed computing system may generate and store terabytes of logged event messages during each day of operation. This represents an enormous amount of data to process. Event messages are generated from many different components and subsystems at many different hierarchical levels within a distributed computer system, from operating system and application-program code to control programs within disk drives, communications controllers, and other such distributed-computer-system components. Even within a given subsystem, such as an operating system, many different types and styles of event messages may be generated, due to the many thousands of different programmers who contribute code to the operating system over very long time frames. In many cases, event messages relevant to a particular operational condition, subsystem failure, or other problem represent only a tiny fraction of the total number of event messages that are received and logged. Searching for these relevant event messages within an enormous volume of event messages continuously streaming into an event-message-processing-and-logging subsystem of a distributed computer system may be a significant computational challenge. Storing and archiving event logs may itself represent a significant computational challenge. Given that many terabytes of event messages may be collected during the course of a single day of operation of a large, distributed computer system, collecting and storing the large volume of information represented by event messages may represent a significant processing-bandwidth, communications-subsystems bandwidth, and data-storage-capacity challenge, particularly when it may be necessary to reliably store event logs in ways that allow the event logs to be subsequently accessed for searching and analysis.

Figure 13:
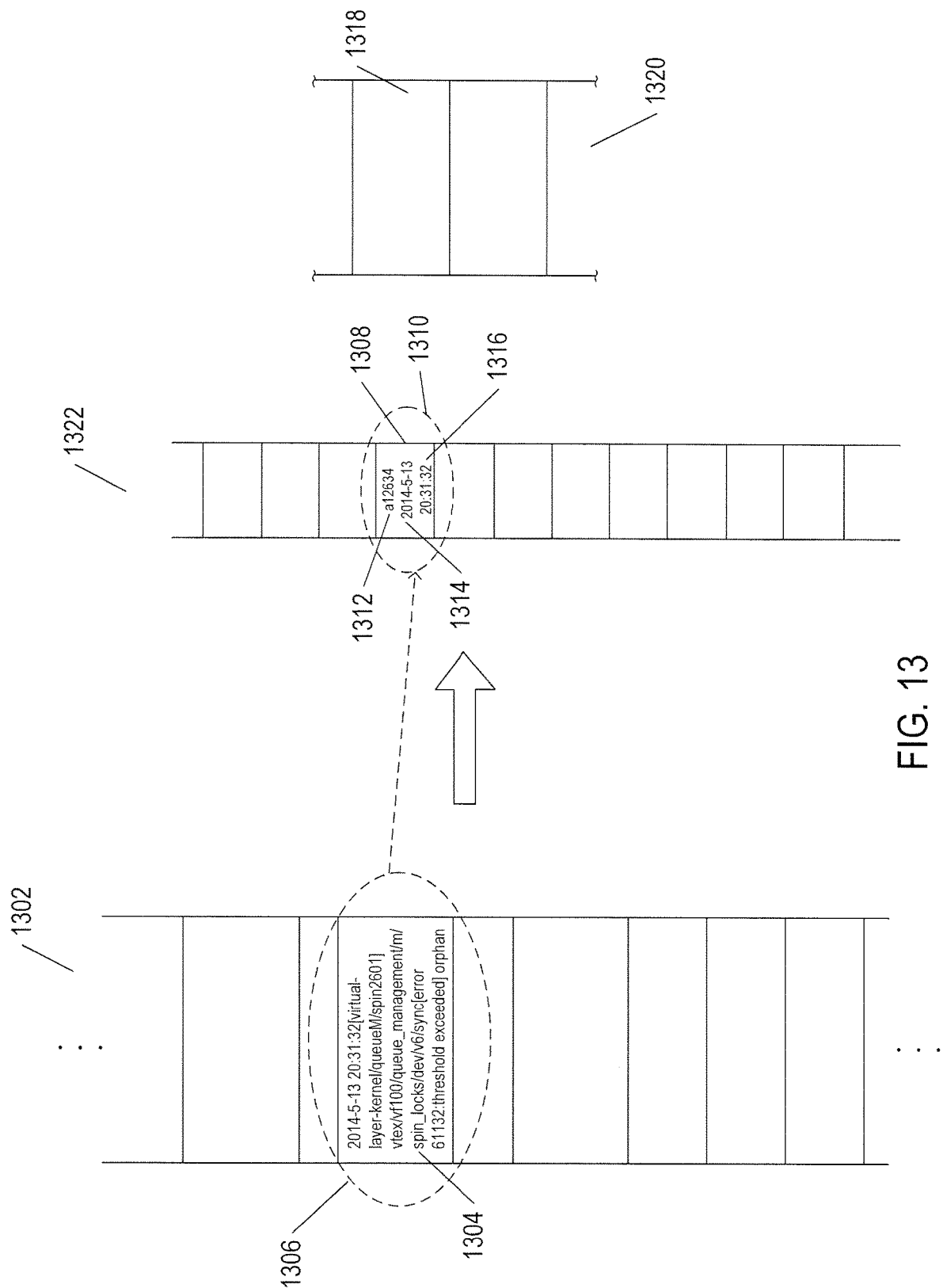
FIG. 13 illustrates the event-message-processing approach represented by the currently disclosed methods and systems.

FIG. 13 illustrates one initial event-message-processing approach. In FIG. 13, a traditional event log 1302 is shown as a column of event messages, including the event message 1304 shown within inset 1306. Automated subsystems may process event messages, as they are received, in order to transform the received event messages into event records, such as event record 1308 shown within inset 1310. The event record 1308 includes a numeric event-type identifier 1312 as well as the values of parameters included in the original event message. In the example shown in FIG. 13, a date parameter 1314 and a time parameter 1315 are included in the event record 1308. The remaining portions of the event message, referred to as the "non-parameter portion of the event message," is separately stored in an entry in a table of non-parameter portions that includes an entry for each type of event message. For example, entry 1318 in table 1320 may contain an encoding of the non-parameter portion common to all event messages of type a 12634 (1312 in FIG. 13). Thus, automated subsystems may transform traditional event logs, such as event log 1302, into stored event records, such as event-record log 1322, and a generally very small table 1320 with encoded non-parameter portions, or templates, for each different type of event message.

Currently Disclosed Methods and Systems

Despite the great amount of detailed information, including many types of status, informational, and error data collected from event messages and other types of data sources, identifying anomalous operational states and behaviors remains a challenging problem. First, the quantities of data obtained by the above-discussed event-message generation, collection, and logging is enormous. Identifying relevant data and data patterns within these large datasets is difficult, particularly in view of the continuous generation of new. Second, while certain values of value ranges observed for individual types of data, refereed to as "metrics," may be useful for detecting anomalous system states and behaviors, it is most often the case that particular data values or data-value ranges for sets of different metrics provide the most useful and specific indications of anomalous system states and behaviours. Identifying the sets of metrics, and the data values or data-value ranges for the metrics, that specifically indicate system events and states which an automated system-monitoring subsystem would desirably detect and for which the automated system-monitoring subsystem would desirable initiate ameliorative actions and/or provide alerts and warning, initiate ameliorative actions. The currently disclosed methods and systems automatically identify sets of metrics and corresponding metric values and/or value ranges that represent incidents, anomalous system states, and other operational behaviours and events from collected metric data. The automatically identified sets of metrics and corresponding metric values and/or value ranges can be subsequently detected in the continuously generated and collected metric data to detect and identify particular types incidents, anomalous system states, and other operational behaviours and events, in real time, and provide indications of the types of detected incidents, anomalous system states, or other operational behaviours or events. The identified types may be associated with various automatically generated or manually recorded notes and indications for remediation that facilitate a monitoring subsystem's response to detection of detected incidents, anomalous system states, or other operational behaviours or events.

Figure 14A:
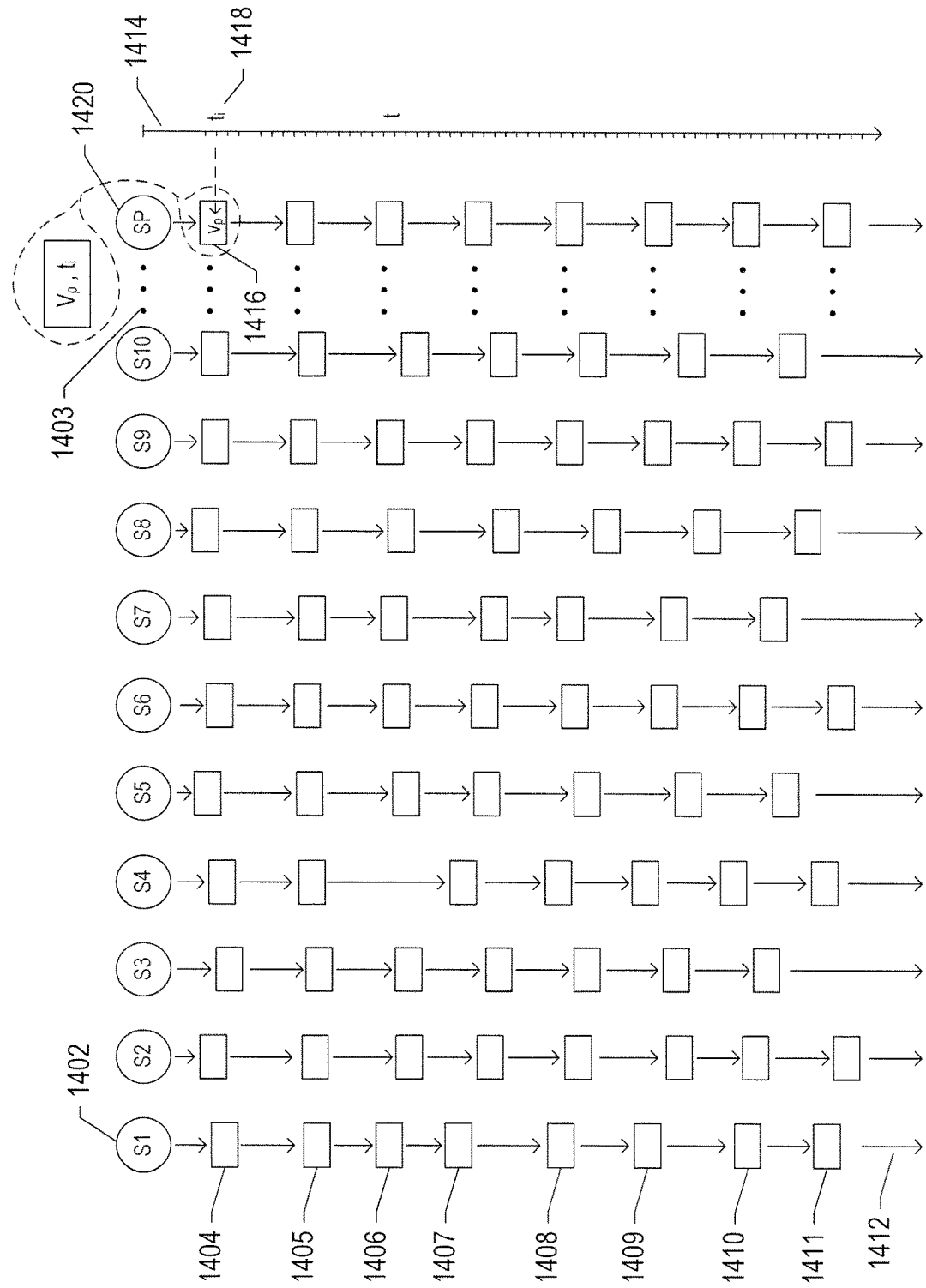
FIGS. 14A-C illustrate the generation of time sequences of metric data from a generally large set of metric-data sources.

In a given distributed computing system, many types of status, informational, and error data may be collected, processed for storage, and stored in a variety of different ways. To facilitate the following discussion, and to provide a useful level of generality, the details of the generation, transmission, collecting, and initial processing of status, informational, and error data within a distributed computing system are abstracted as the generation of time sequences of metric data from a generally large set of metric-data sources, as next discussed with reference to FIGS. 14A-C. As shown in FIG. 14A, the status, informational, and error data is generated by P different data sources, including data source S1 1402, with each data source referred to by a data-source name SX, where X is an integer. Ellipses 1402 indicate that there may be additional data sources between data source S10 and data source SP. The phrase "data source" refers to any component or subcomponent of the distributed computing system that generates at least one type of status, informational, or error data. Processor-controlled components and subcomponents may directly generate digitally encoded data that is communicated to one or more data sinks. Other types of components and subcomponents may produce various types of analog or digital electrical signals, optical signals, and/or mechanical signals that are subsequently translated into digitally-encoded data for transmission and storage. Each metric corresponds to a single type of numerical value produced by a single component or subcomponent. In the case that a physical component or subcomponent produces two or more different types of numerical values, each of the two or more different types of numerical values is considered to be a separate metric and the physical component or subcomponent is represented by two or more data sources, each associated with one of the two or more metrics. Thus, in a system that included three data-generating components that each generates three different types of numeric values, FIG. 14C would show nine data sources S1, S2, .... S9 that each produces a different metric value at various time points.

In FIG. 14A, each data source is shown to produce a sequence of data values corresponding to a metric. For example, data source S1 1402 has produced data values 1404-1411, and likely many additional data values beyond arrow 1412. As shown by the time axis 1414 on the right-hand side of FIG. 14A, the vertical position of each data value, such as the data value $V_P$ 1416, corresponds to points in time, such as the time point $t_i$ 1418 at which the data value $V_P$ 1416 was emitted by data source SP 1420. In many distributed computer systems, the various data sources may emit data values periodically, and the data-value-emission period may be similar or identical for the various different data sources. In other distributed computer systems, data sources may emit data values nonperiodically and the times at which a given data source emits data values may be synchronized with respect to the times at which another data source emits data values. In certain cases, a data-collection computational entity may poll data sources for data values at regular intervals while, in other cases, the data sources may actively transmit data values at periodic intervals or, alternatively, whenever data values become available. However, for the types of processing carried out by the currently disclosed methods and systems, it is convenient to ensure that the data values for all metrics are logically emitted in a strictly periodic fashion and that the transmission of data values is synchronized among all of the metrics.

Figure 14B:
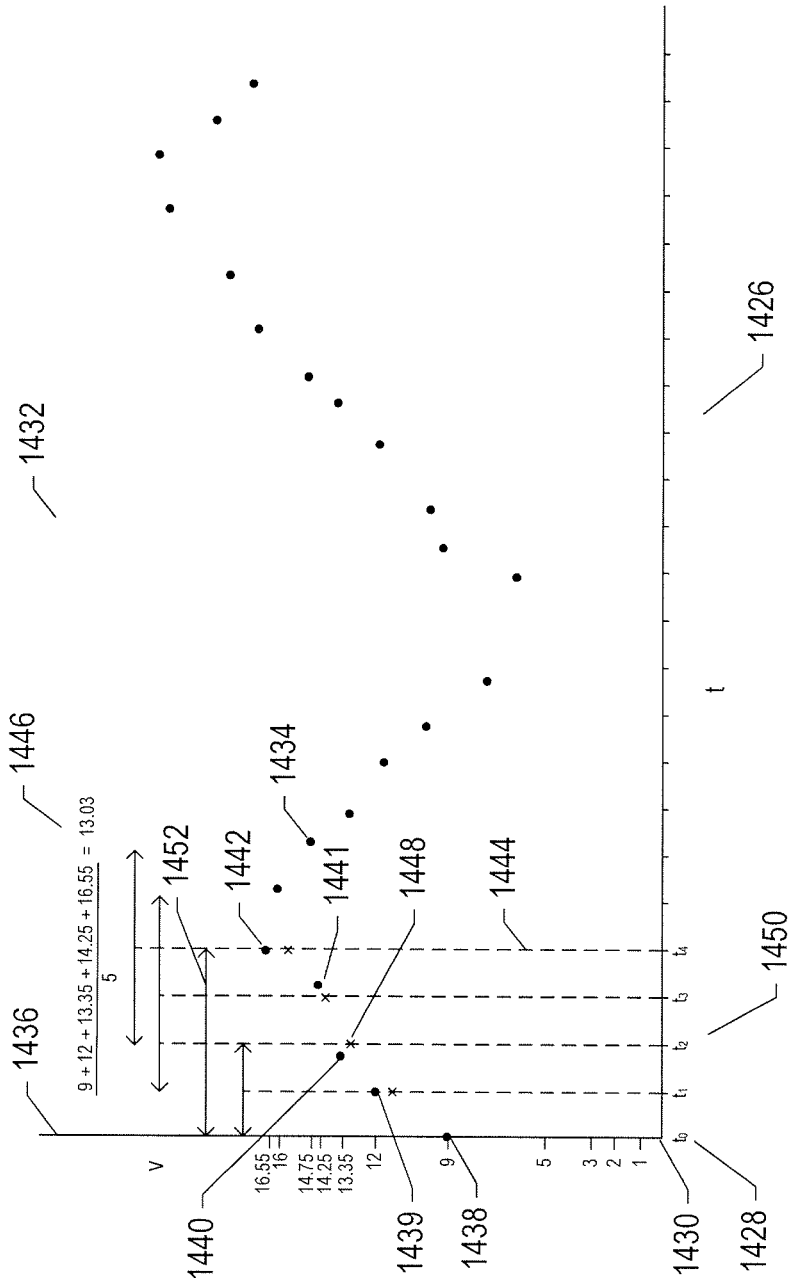

FIG. 14B illustrates one method for temporally aligning and synchronizing metric data emitted by various different data sources within a distributed computing system. First, the desired metric-data-emission interval and the corresponding time points are selected. This is shown in FIG. 14B by the horizontal time axis 1426 that is divided into uniform time intervals bracketed by a sequence of evenly spaced time points, beginning with time point $t_0$ 1428 at the origin 1430 of the plot 1432 shown in FIG. 14B. The sequence of data values emitted by a data source are shown in FIG. 14B as a time ordered sequence of data points, such as data point 1434, plotted in a two-dimensional plot 1432 in which the vertical axis 1436 represents the value or magnitude of the metric data points. As can be seen by comparing the locations of the initial plotted metric data values 1438-1442 with respect to the dashed vertical lines, such as dashed vertical line 1444, coincident with time points $t_0$-$t_4$, the metric data values are not strictly periodic in time they do not exactly fall at the selected time points. However, using a running-time-average type of calculation, a metric data value for each selected time point can be estimated. The equation 1446 in FIG. 14B illustrates computation of the estimated metric data value 1448 corresponding to time point $t_2$ 1450, which turns out to be 13.03. The running-time-average calculation computes the average metric data value within a time window symmetric about the time point in question. In the case of time point $t_2$ 1450, the time window is represented by the double-headed arrow 1452. The running-time-average calculation is a type of low-pass filter that tends to smooth the curve produced by linking adjacent data points. In certain cases, there may be a natural time periodicity in the majority of metric data values, and the running-time-average calculation can be used to fit those metrics that do not follow the natural time periodicity to a common temporal alignment. In other cases, a common temporal alignment may be more or less arbitrarily selected and the running-time-average calculation used to fit all of the metrics to the common temporal alignment. Many other approaches can be used to temporally aligned metric data values, including various curve-fitting techniques, linear extrapolation, and non-linear extrapolation.

Figure 14C:
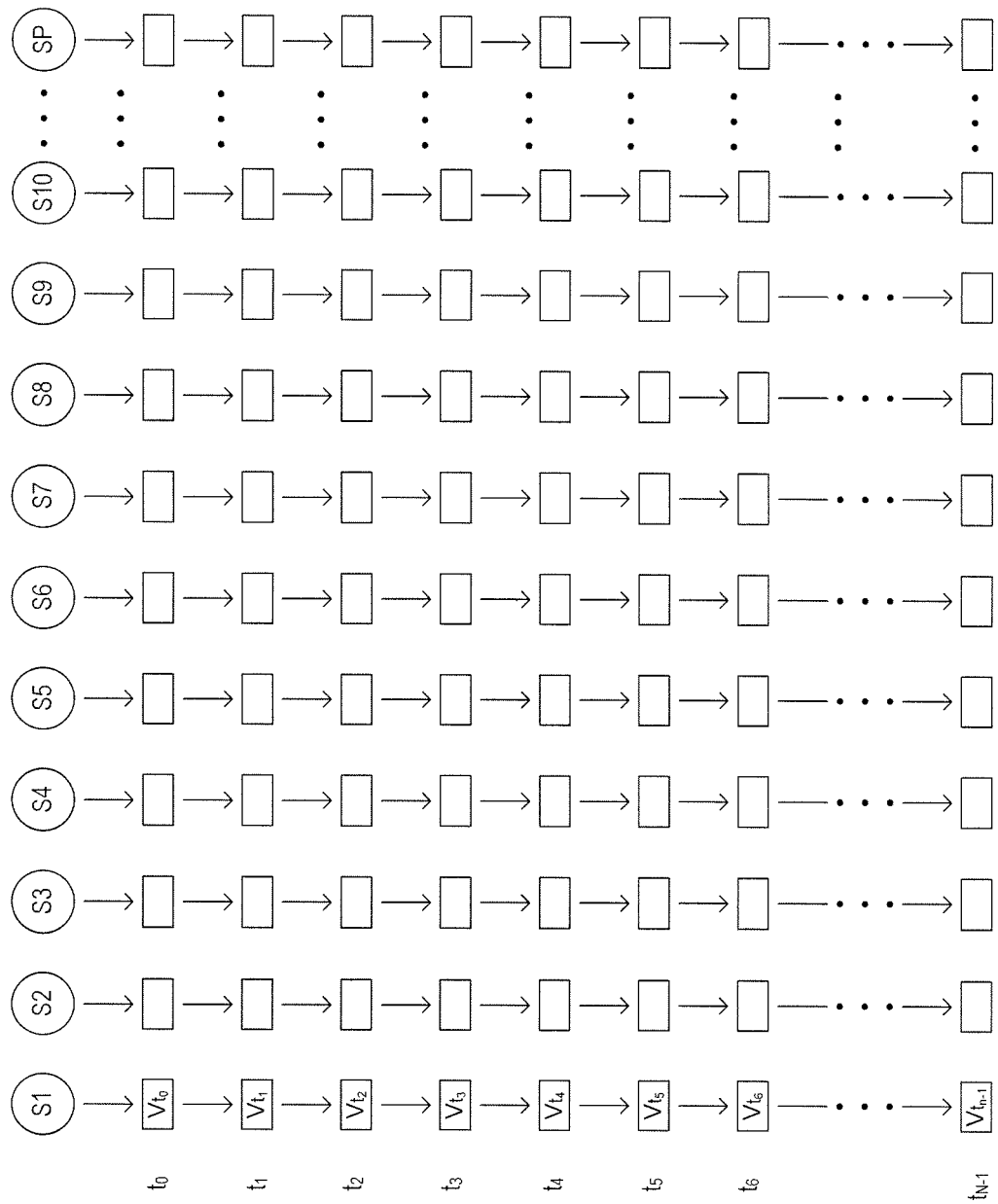

FIG. 14C illustrates the preprocessed metric data following temporal alignment. The metric data values form a regular two-dimensional grid. At each time point, there is a metric data value for each of the P data sources. The metric data values at a particular time point can be considered to be a P-dimensional observation.

Figure 15:
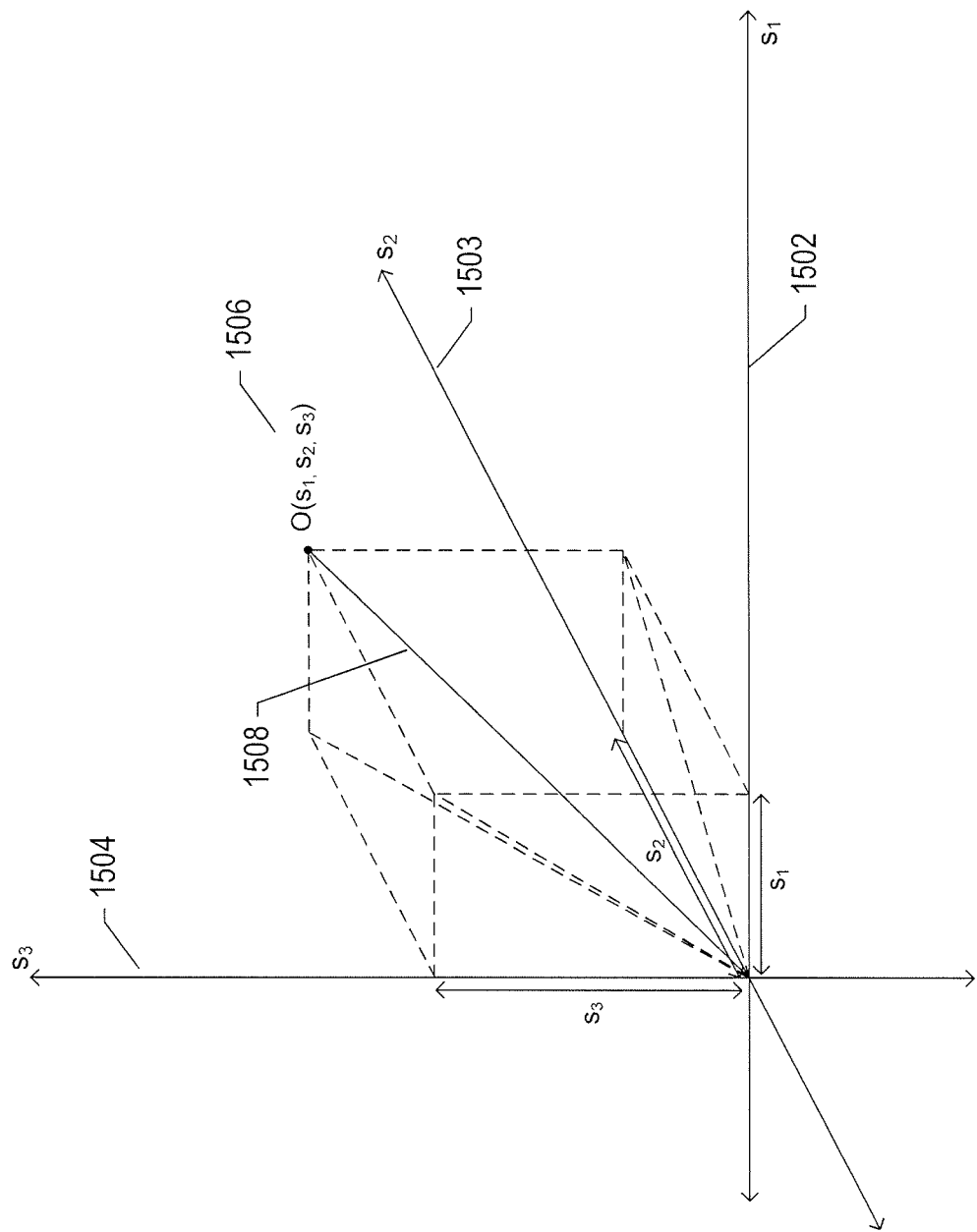
FIG. 15 illustrates the equivalence between an observation made at a particular time point and a P-dimensional vector in a P-dimensional space.

FIG. 15 illustrates the equivalence between an observation made at a particular time point and a P-dimensional vector in a P-dimensional space. In the example shown in FIG. 15, there are only three metrics S1, S2, and S3, and thus P=3. Each metric is considered to be a dimension, and so the three Cartesian axes 1502, 1503, and 1504 are each assigned to one of the metrics. Each observation is a tuple of 3 metric data values 1506 which, when used as components of a vector, describes a vector 1508 in the P-dimensional metric space.

Figure 16:
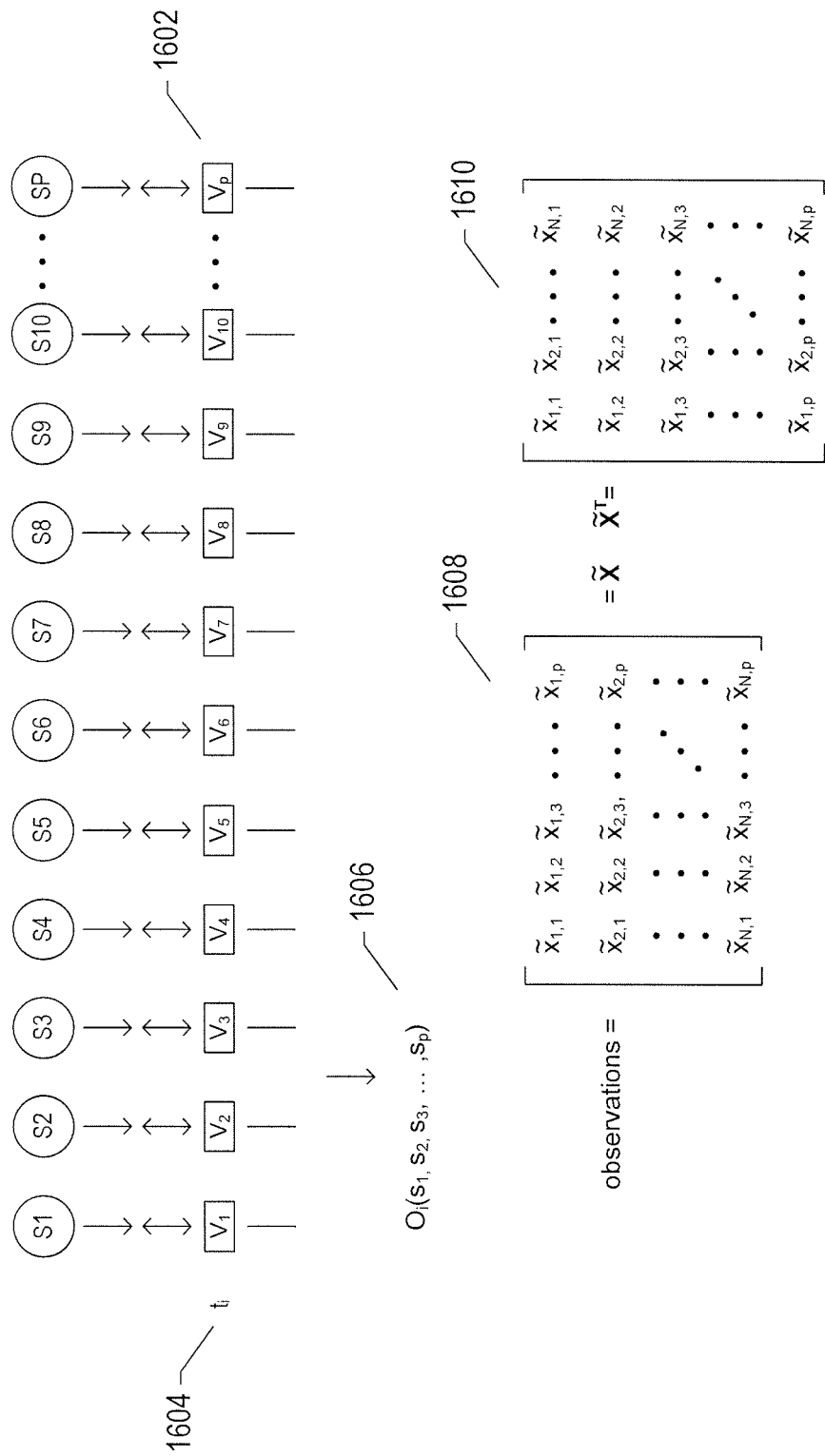
FIG. 16 illustrates representation of observations, each consisting of a set of metric data values for each data source obtained at, or calculated for, a particular time point, as a matrix.

FIG. 16 illustrates representation of observations, each consisting of a set of metric data values for each data source obtained at, or calculated for, a particular time point, as a matrix. As discussed above, each row of metric data values, such as row 1602, for a particular time point, such as time point $t_i$ 1604, may be considered to be a P-dimensional vector 1606, referred to as an "observation." A sequence of N observations can be organized as an N×P matrix $\tilde{X}^r$ 1608 in which each row represents an observation and in which each column represents a time sequence of data values for a particular metric. Again, the time point corresponding to an observation is inferred from the row index of the observation since the observations represent a time sequence with a uniform time interval between successive observations. Alternatively, the transpose of matrix $\tilde{X}$, $\tilde{X}_r$ 1610, can be considered to include column vectors representing observations.

FIG. 17 illustrates scaling and normalization of the set of observations represented by the matrix $\tilde{X}$. Several statistical parameters are computed for each time sequence of metric data values for particular metrics, such as the metric data values for the second metric contained in the second column 1702 of the matrix $\tilde{X}$ 1704, including the average $\mu_1$ 1706, the variance $\sigma_1^2$ 1708, and the standard deviation $\sigma_1$ 1710. Then, for each column j, each metric data value in the column can be scaled and normalized by subtracting the average metric data value from the metric data value and dividing by the standard deviation 1712. When this is done for every element in the matrix, a scaled and normalized matrix X 1714 is produced.

FIGS. 18 and 19 illustrate eigenvectors and eigenvalues. A 3×3 matrix A 1802 and a column vector u 1804 are shown at the top of FIG. 18. When u is an eigenvector of the matrix A, then equation 1806 expresses the relationship of the eigenvector u and its corresponding eigenvalue λ, which is a constant or scaler. This equation is expanded in matrix form as matrix equation 1808. Using a set of simple matrix-algebra manipulations 1810 and 1812 of equation 1806, it can be shown that either the eigenvector u can be generated by multiplying the inverse of the matrix A−λI, where I is the identity matrix, by the column vector 0 1814 or that the inverse of the matrix A−λI does not exist, as expressed by the fact that the determinant of this matrix is 0 1816. Only the latter proposition is reasonable, which indicates that, by solving the polynomial equation 1904 shown in FIG. 19, obtained from the expression 1816 via expansion 1902 of expression 1816, the eigenvalues for the matrix A can be found. Because the polynomial equation 1904 is of order 3, the dimension of u, there are generally 3 eigenvalues, although one or more of the roots of equation 1904 may be degenerate. The matrix equation 1906 expresses the relationship between the matrix A, a matrix U in which each column is one of the eigenvectors of the matrix A, and the matrix A, which is a diagonal matrix in which the elements along the diagonal are the eigenvalues of the matrix A in the order of the corresponding eigenvectors in the matrix U. Multiplying each side of equation 1906 from the right by the inverse of matrix U, $U^{-1}$, produces equation 1908. When the matrix A is the product of a matrix X and its transpose $X^T$, as shown in expression 1910, the eigenvalues of matrix are positive real numbers 1911, the eigenvectors of matrix are orthogonal 1912 when their corresponding eigenvalues are not equal, and the inverse of matrix U, $U^{-1}$, is equal to the transpose of matrix U, $U^T$ 1913. Thus, when matrix A is the product of a matrix X and its transpose $X^T$, matrix A is equal to the matrix A multiplied from the left by the matrix U and multiplied from the right by the transpose of matrix U, $U^T$. While a 3×3 matrix example is used in FIGS. 18-19, the above-described characteristics of eigenvectors and eigenvalues apply to matrices of arbitrary dimension.

Figure 20B:
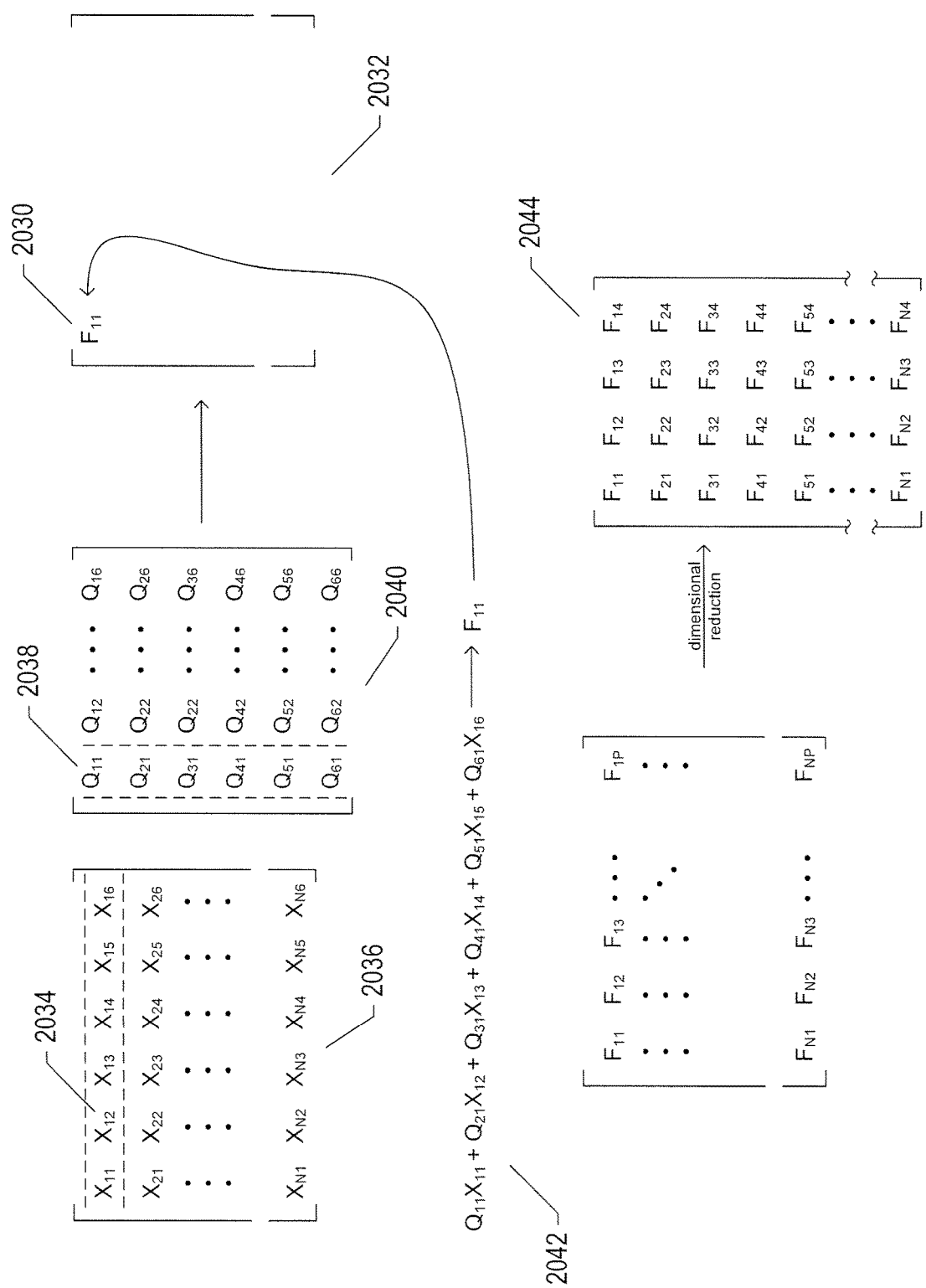

The principal-component-analysis ("PCA") method, next discussed with reference to FIGS. 20A-B, represents a change of basis vectors for the scaled and normalized observations organized into the matrix X 1714, discussed above with reference to FIG. 17. As shown in the 3-dimensional plot 2002 in FIG. 20A, the distribution of observations, or observation data points, corresponding to the rows of the matrix X or columns of the matrix $X^T$, in the case of a 3-dimensional metric space, such as that shown in FIG. 15, may fall within an ellipsoidal volume 2004 within the 3-dimensional metric space. As shown in plot 2002 of FIG. 20A, the ellipsoidal volume has major and minor axes that are not coincident with the axes corresponding to metrics S1 2006, S2 2007, and S3 2008. A basis-vector change, equivalent to a set of coordinate changes, may be desired so that a set of new coordinate axes, corresponding to what is referred to as "principal components," ("PCs"), can be found. The new coordinate axes are aligned with the major and minor axes of the ellipsoidal volume representing the distribution of observations in 3-dimensional space. Moreover, principal component PC1 2010 is aligned with the major axis of the ellipsoidal volume, principal component PC2 is aligned with the longer of the 2 minor axes 2011 of the ellipsoidal volume, and principal component PC3 2012 is aligned with the shorter of the 2 minor axes of the ellipsoidal volume. The basis vectors corresponding to the principal components of the new coordinate axes are contained as columns in a matrix Q 2016. The principal components correspond to the directions of greatest variability within the ellipsoidal volume in decreasing order of variability and the basis vectors corresponding to the principal components are orthogonal. In general, the bulk of the variability within a distribution of observations can be largely explained in terms of, or expressed as a function of, an initial subset of the principal components. For example, in the distribution shown in FIG. 20A, were the ellipsoidal volume projected onto a plane normal to the third principal component 2012, the majority of the variability in the distribution of observations would be apparent in the resulting two-dimensional ellipsoid with major axis corresponding to the first principal component 2010 and minor axis corresponding to the second principal component 2011. In essence, the principal components can be viewed as a new set of metrics each derived from the original metrics as a linear combination of the original metrics. The data values corresponding to the new set of metrics, contained in a factor score matrix F, which is defined to be generated from the original metric data values stored in the matrix X by multiplying the matrix X from the right by the matrix Q, which contains the principal components as column vectors 2018, under the constraints that the matrix $F^TF=Q^TX^TXQ$ is a diagonal matrix 2020 and that the matrix Q is orthogonal 2022. By using the technique of Lagrangian multipliers, it can be shown that $X^TX=QAQ^T$ 2024, where A is a diagonal matrix of Lagrangian multipliers, which leads to expression 2026. Thus, determining the principal components, which is equivalent to determining the matrix Q, reduces to a problem of determining the eigenvectors and eigenvalues of the matrix $X^TX$. With the matrix Q in hand, the coordinate transformation that takes the original scaled and normalized metric data values in the matrix X to the data values for a new set of metrics referred to as principal components, stored in the matrix F, is carried out by multiplying the matrix X from the right by the matrix Q, as expressed in expression 2018.

FIG. 20B illustrates computation of principal-component-metric data values and dimensional reduction. In the top portion of FIG. 20B, the computation of a first principal-component-metric data value for the first principal component, $F_{11}$ 2030 in the factor-score matrix F 2032, by computing the dot product of the first row 2034 in the matrix X 2036 and the first column 2038 in the matrix Q 2040, is shown in expression 2042. Thus, each new principal-component metric data value for an observation is a linear combination of all of the original metric data values for the observation.

The currently disclosed methods and systems use the principal-component-analysis technique, discussed above with reference to FIGS. 20A-B, in order to reduce the dimensionality of a set of observations, each including a metric data value for each of the metrics generated within a distributed computer system. In addition to the eigenvectors/eigenvalue decomposition method discussed above, there are other methods for obtaining the factor-score matrix F and the matrix Q, including the singular-value-decomposition method and the Graham-Schmidt orthogonalization method. As discussed above with reference to FIG. 20A, the principal components are ordered in descending order with respect to the variability of the principal-component metric data values in the P-dimensional principal-component metric space. By retaining only an initial subset of the principal components in a truncated factor-score matrix F' 2044, a large fraction of the variability in the dataset is retained in a projection of the P-dimensional principal-component metric space to a P'-dimensional principal-component metric space. In the example shown in FIG. 20B, P'=4. Dimensional reduction facilitates subsequent dataset processing. The computational complexity of the subsequent data-set processing generally increases exponentially with respect to the number of dimensions, so by decreasing the dimensionality using principal-component analysis, the computational complexity of the subsequent data-processing steps is greatly reduced without losing much of the information in the dataset related to the distribution of observations in the P-dimensional principal-component metric space.

Once the dimensionality the dataset has been reduced, using the principal-component-analysis technique, certain of the currently disclosed methods and systems employ a modified K-means clustering technique or another clustering technique in order to identify outlier observations within the dataset that likely correspond to abnormal states. This allows for automatically labeling observations as either normal or abnormal. Once the observations are so labeled, various types of machine-learning techniques can be applied to the labeled dataset to train a monitoring subsystem to automatically recognize abnormal system states and operational incidents from continuously collected and processed metric data.

FIGS. 21A-I and FIGS. 22A-B illustrate data-set clustering using a modified K-means clustering process. The two examples used in these two sets of figures are two-dimensional, for ease of illustration. As discussed further, below, both modified K-means clustering process the other processes, techniques, and computational steps used by the currently disclosed systems and methods are straightforwardly extended to higher-dimensional datasets. Indeed, a simple C++ implementation of one example of a modified K-means clustering process, provided below, carries out clustering in a metric-data space of arbitrary dimension.

Figure 21A:
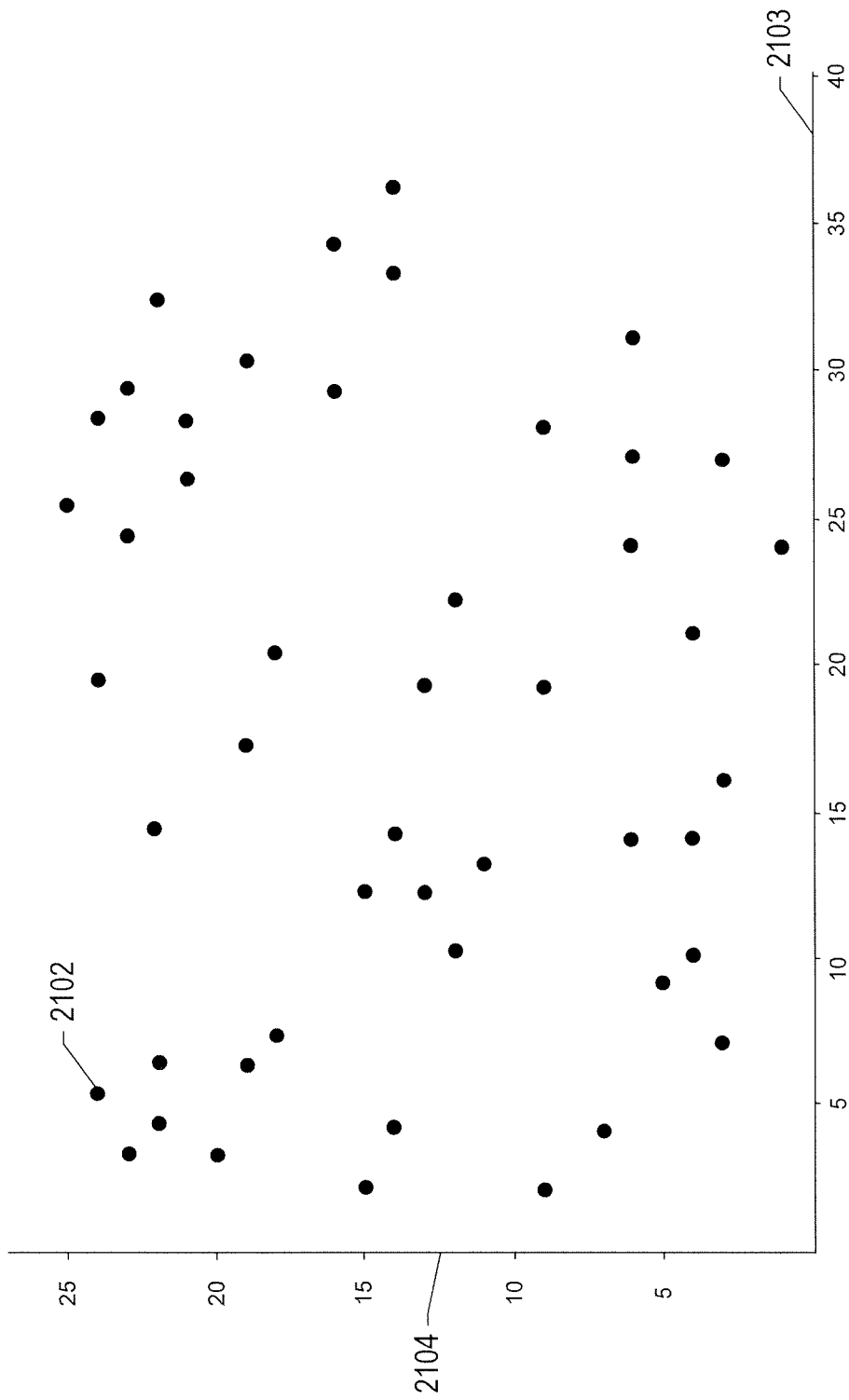
FIGS. 21A-I and FIGS. 22A-B illustrate data-set clustering using a modified K-means clustering process.

FIG. 21A illustrates a first example two-dimensional dataset. Each data point, such as data point 2102, represents an observation that includes data values for 2 metrics. The first metric is represented by the horizontal axis 2103 and the second metric is represented by the vertical axis 2104. Each data point is thus the head of a two-dimensional vector.

The modified K-means clustering process receives, as input: (1) K, an integer specifying the desired number of clusters; (2) L, an integer specifying the desired number of outlier data points; (3) P, an integer specifying of the number of dimensions, or metrics; (4) a distance function that computes the distance between any two locations in a P-dimensional metric space; and (5) a dataset that includes N P-dimensional observations. The modified K-means clustering process than identifies locations of each of K clusters of data points and identifies L outlier data points, with each data point in the P-dimensional dataset either belonging to one of the K clusters or identified as one of the L outliers. The modified K-means clustering process does not necessarily find an optimal clustering, where the optimal clustering would have a minimum sum of squared distances of the data points belonging to the K clusters to their cluster centers. However, the modified K-means clustering process is guaranteed to converge on a locally optimal clustering.

Figure 21B:
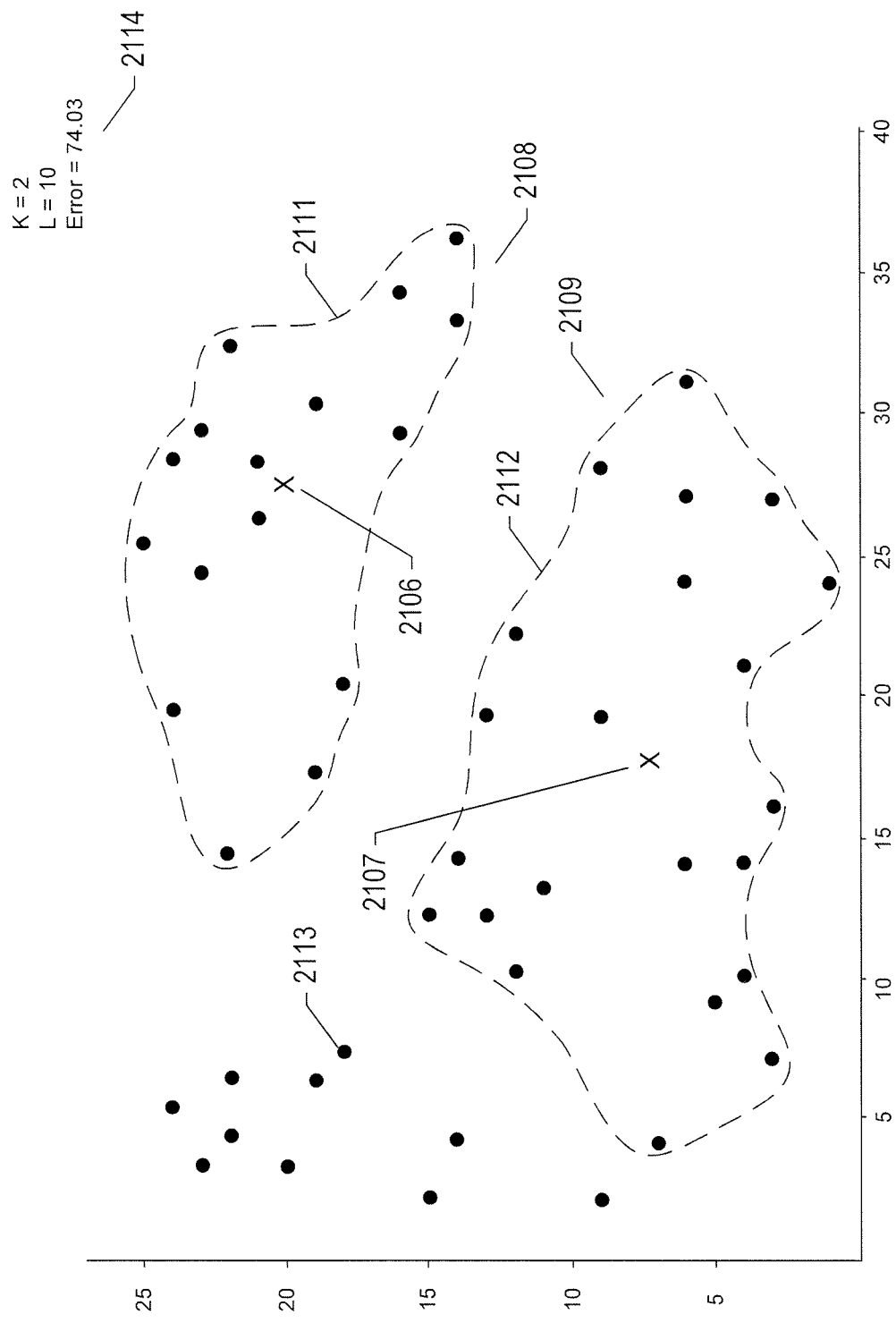

Prior to discussing the modified K-means clustering process, a number of examples of clustering and outlier identification produced by the modified K-means clustering process are first discussed. FIG. 21B shows a clustering obtained for the dataset illustrated in FIG. 21A when K=2, L=10, and P=2 is input to the modified K-means clustering process. In FIG. 21B, as in subsequently discussed figures, the identified centers of the clusters are marked with x-like symbols 2106 and 2107. The two clusters 2108 and 2109 are each indicated by a dashed boundary 2111 and 2112, as are the clusters in subsequently discussed figures. Those data points which do not lie within the boundary of the cluster, such as data point 2113, are outlier data points. For many of the clusterings shown in the figures, an error is reported, such as the error 2114 reported for the clustering shown in FIG. 21B. This is the square root of the sum of the squares of the distances of each data point within a cluster to that cluster's center. Were the input value K equal to the number of observations N and the input value L equal to 0, the modified K-means clustering process would return K clusters, each with a center equal to an observation and with an error of 0. Were the input value K equal to 1 and the input value L equal to 0, the modified K-means clustering process would return a single cluster with a center equal to the centroid of the distribution of data points. It would appear that the set of outlier data points in FIG. 21B could just as easily have been identified as a cluster. In fact, as shown in subsequently discussed figures, the clustering shown in FIG. 21B represents a decidedly non-optimal clustering that represents a local minimum within the hyper-dimensional surface of all possible clusterings.

Figure 21C:
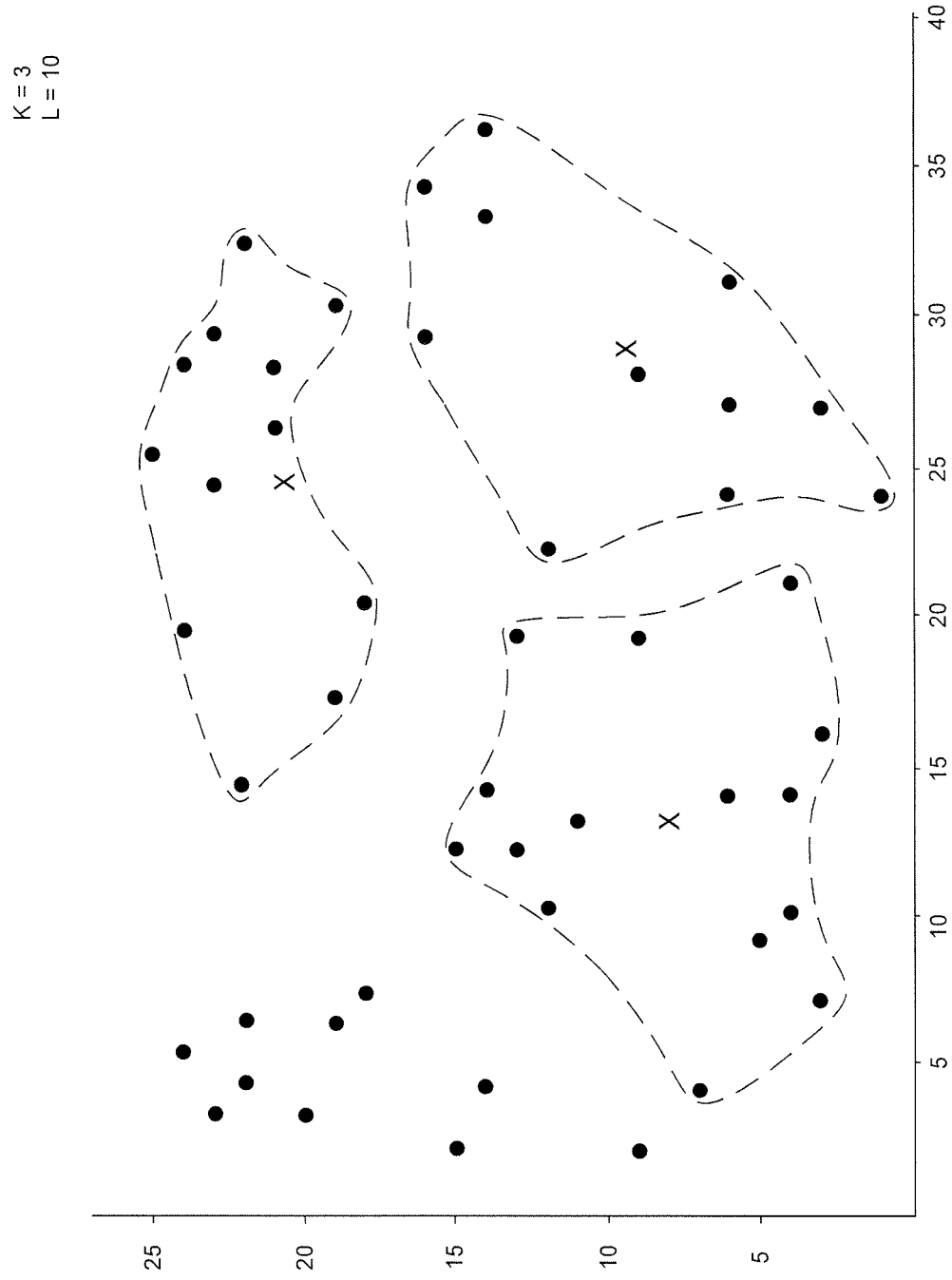
Figure 21D:
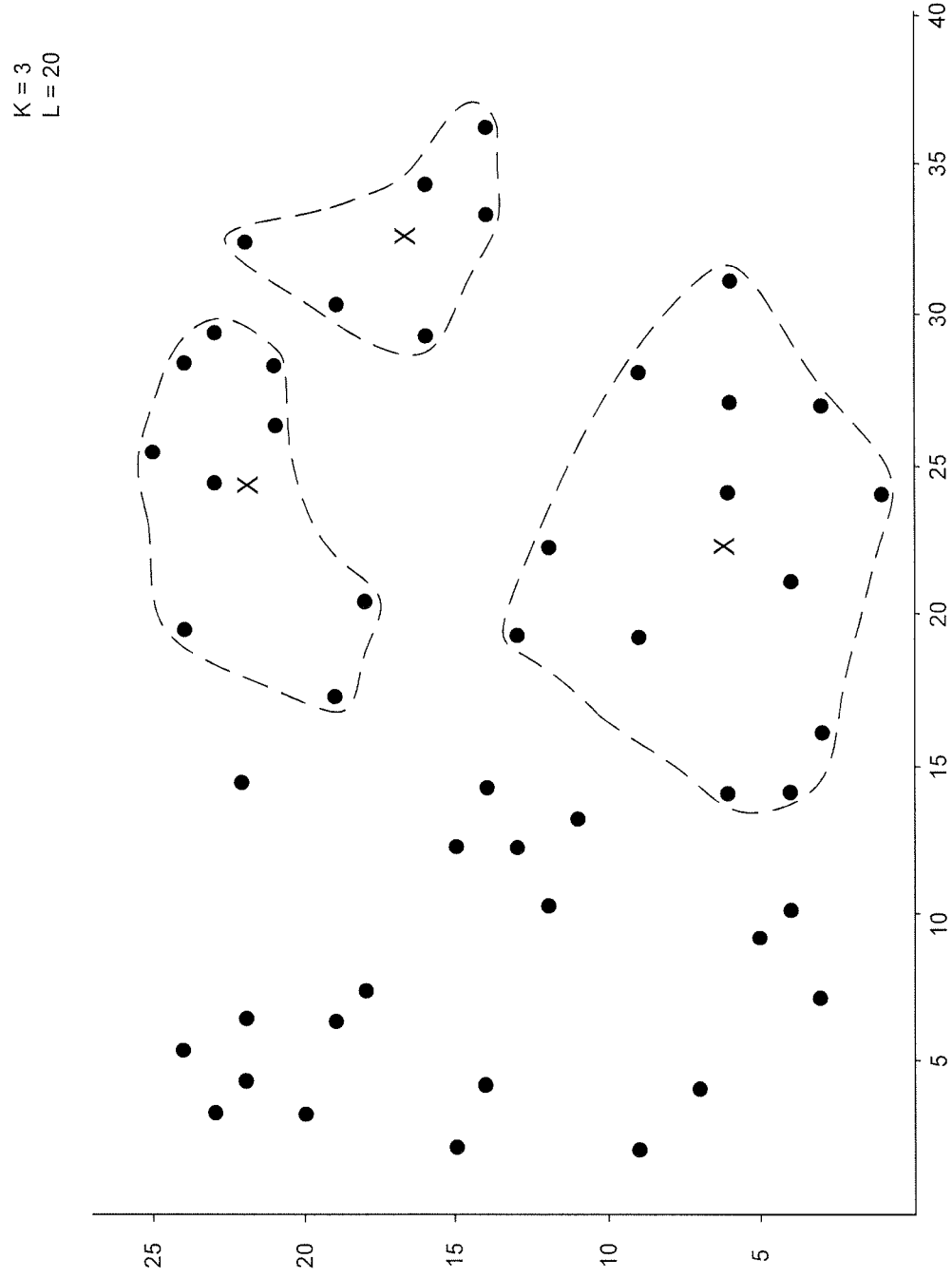

FIG. 21C shows a clustering obtained for the dataset illustrated in FIG. 21A when K=3, L=10, and P=2 is input to the modified K-means clustering process. The same points identified as outliers in the clustering shown in FIG. 21B are again identified as outliers in the clustering process illustrated in FIG. 21C. This is, in part, because at least two of the starting cluster centers are the same as in the clustering process that produced the results shown in FIG. 21B. FIG. 21D shows a clustering obtained for the dataset illustrated in FIG. 21A when K=3, L=2 among all 0, and P=2 is input to the modified K-means clustering process. In this case, because the number of desired outliers doubled, the 3 clusters contain fewer data points.

Figure 21E:
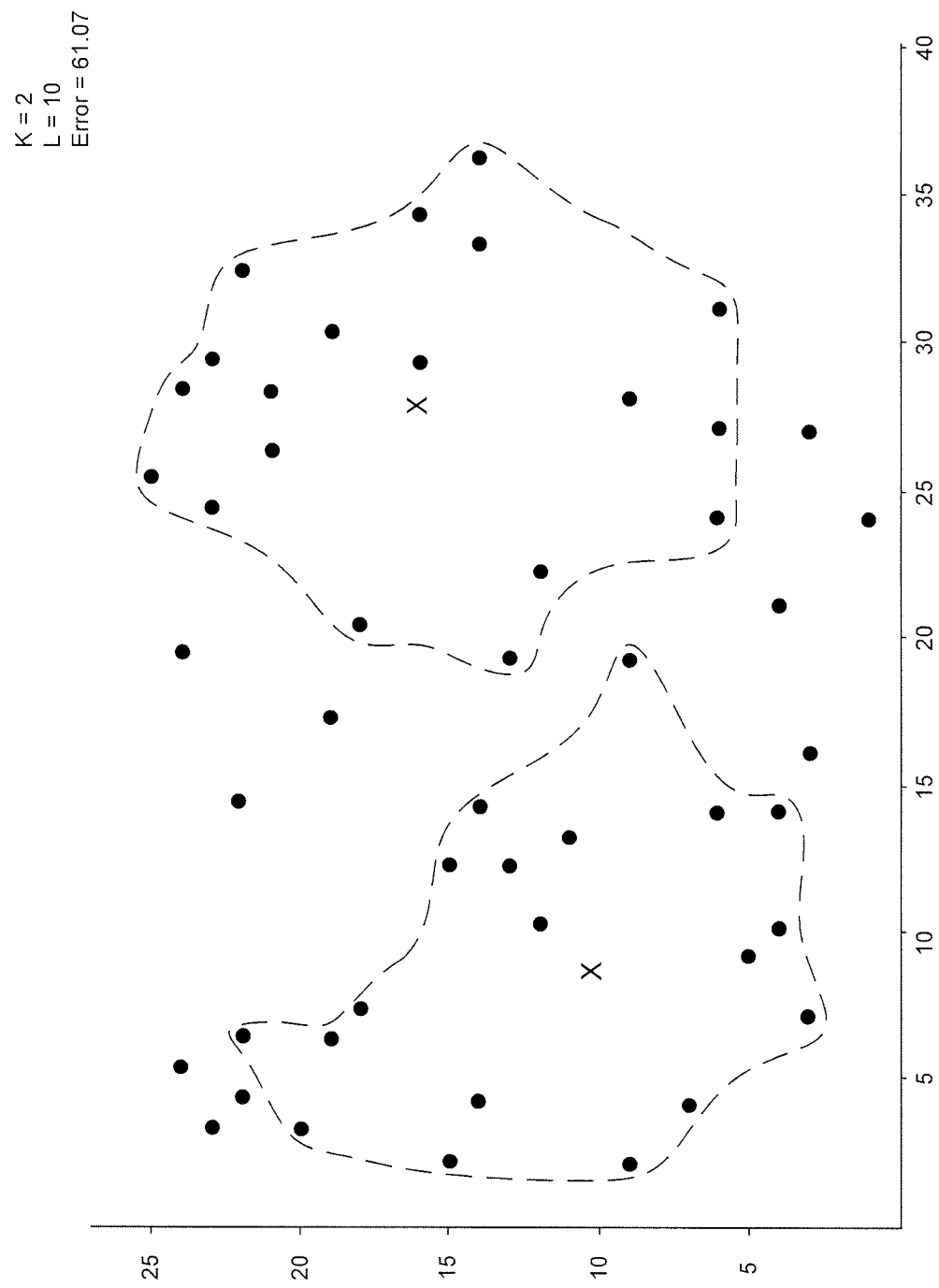
Figure 21F:
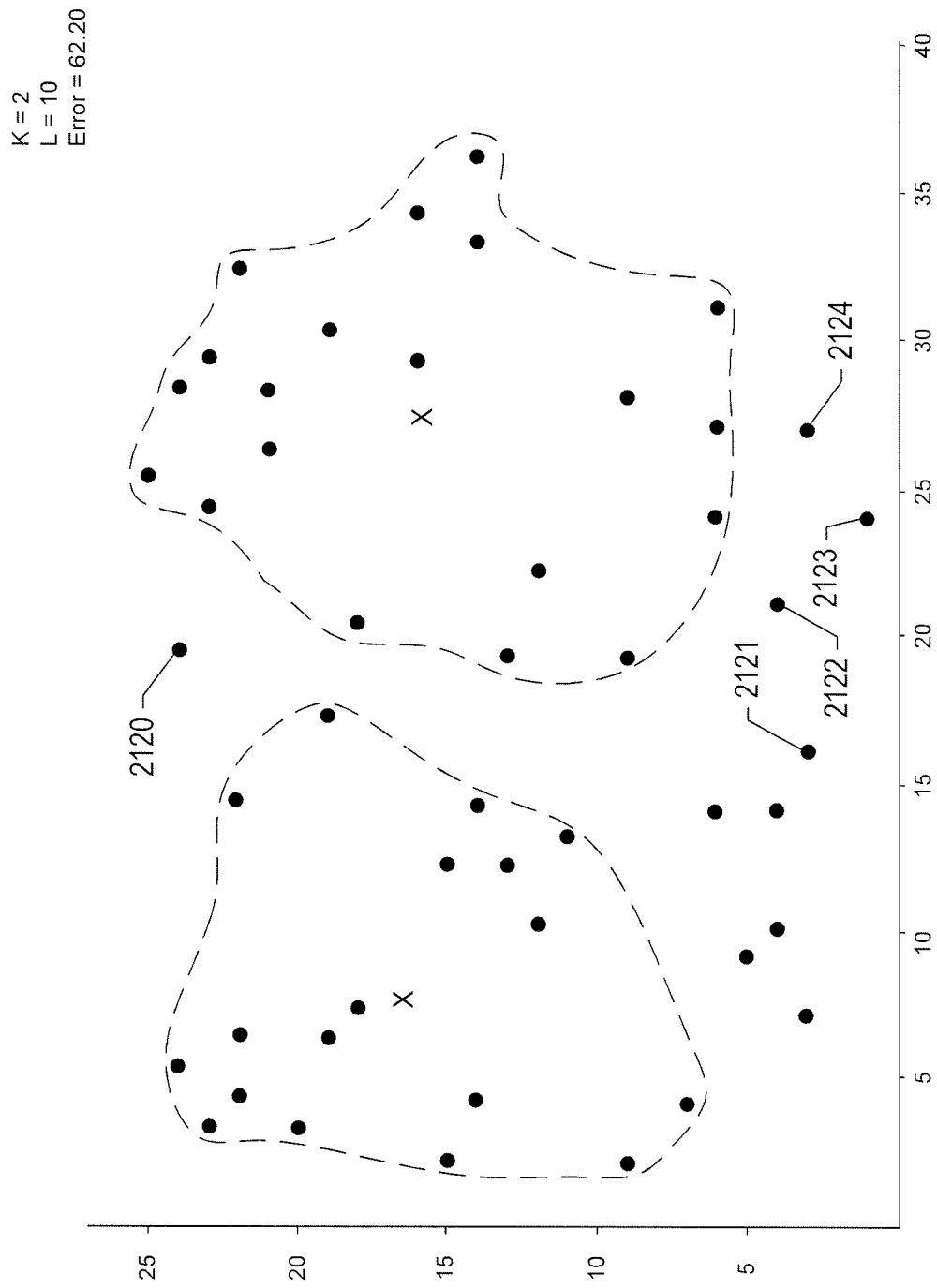

FIGS. 21E-F show clustering obtained for the dataset illustrated in FIG. 21A when K=2, L=10, and P=2 are input to the modified K-means clustering process, but when different starting points for the process are used. In fact, 10 different sets of starting points were used to produced 10 additional clusterings, and the clustering shown in FIGS. 21E-F were associated with the smallest errors. 5 of the 10 outliers identified in the two clusterings shown in FIGS. 2 E-F, labeled 2120-2124 in FIG. 21F, are identical, illustrating the fact that, by carrying out multiple clusterings with different starting points and choosing clusterings with the lowest associated errors, it may be possible to converge on a global minimum or at least a local minimum with a relatively low error, in which case outlier identification may become increasingly accurate.

Figure 21G:
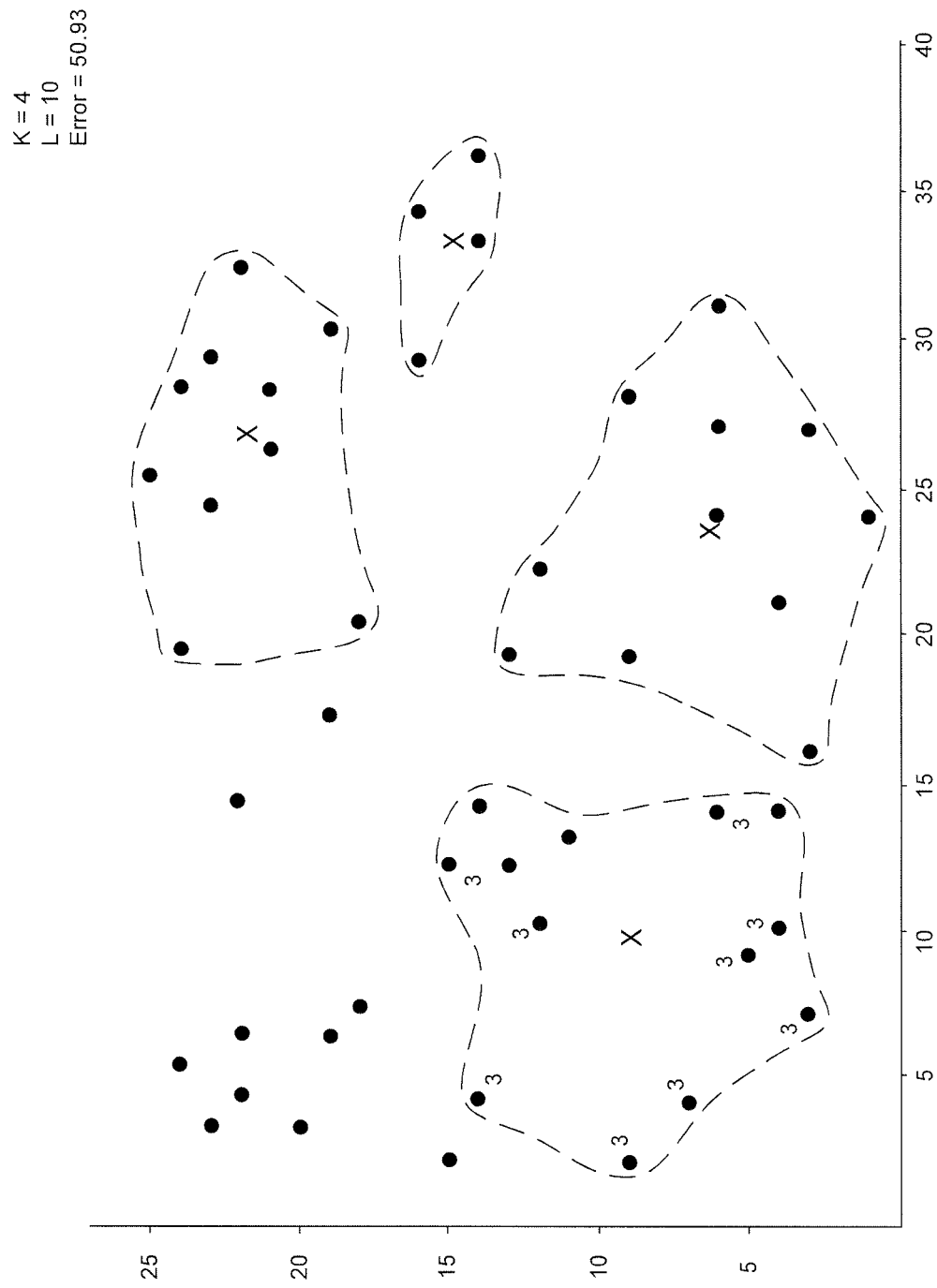
Figure 21H:
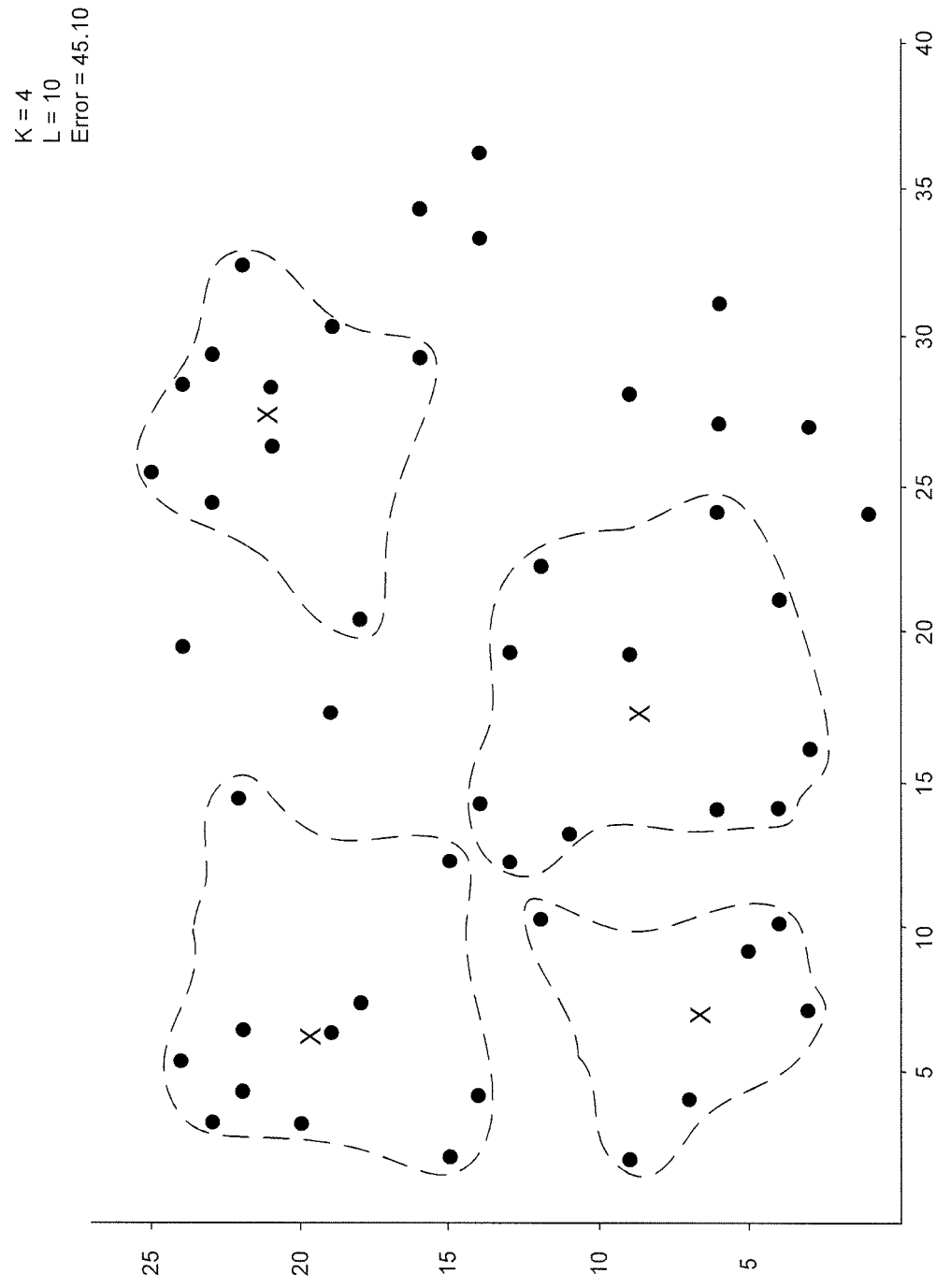
Figure 21I:
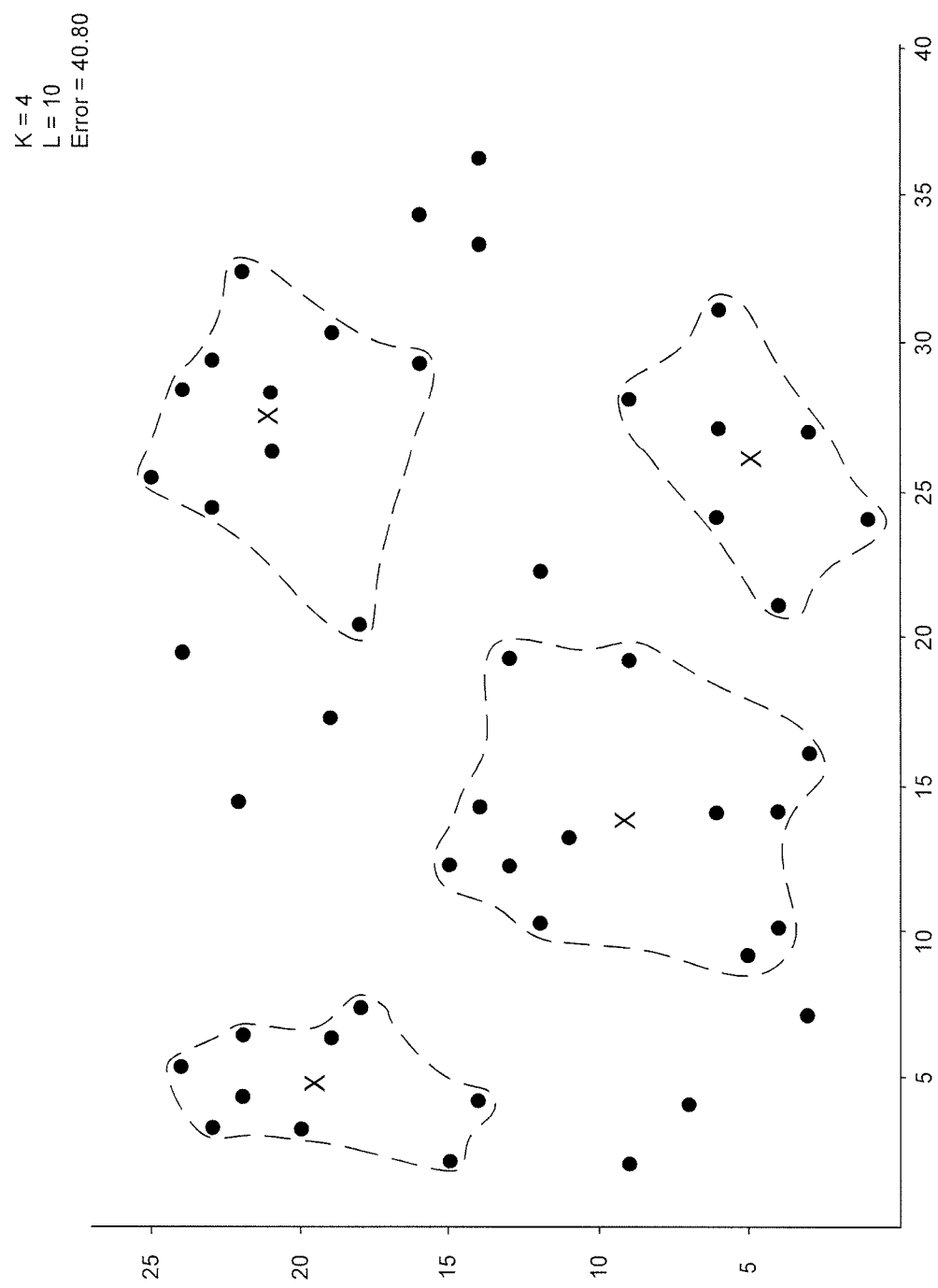

FIGS. 21G-I show three clusterings obtained for the dataset illustrated in FIG. 21A when K=4, L=10, and P=2 is input to the modified K-means clustering process and when a different set of starting cluster centers are used for each cluster. The three clusterings shown in FIGS. 21G-I are the three clusterings out of ten clusterings with the lowest errors. In this case, it does appear that selecting clusterings with the lowest errors from a series of repeated clusterings with different initial cluster centers may represent an approach to identifying either a globally optimal clustering or a locally near-optimal clustering.

Figure 22A:
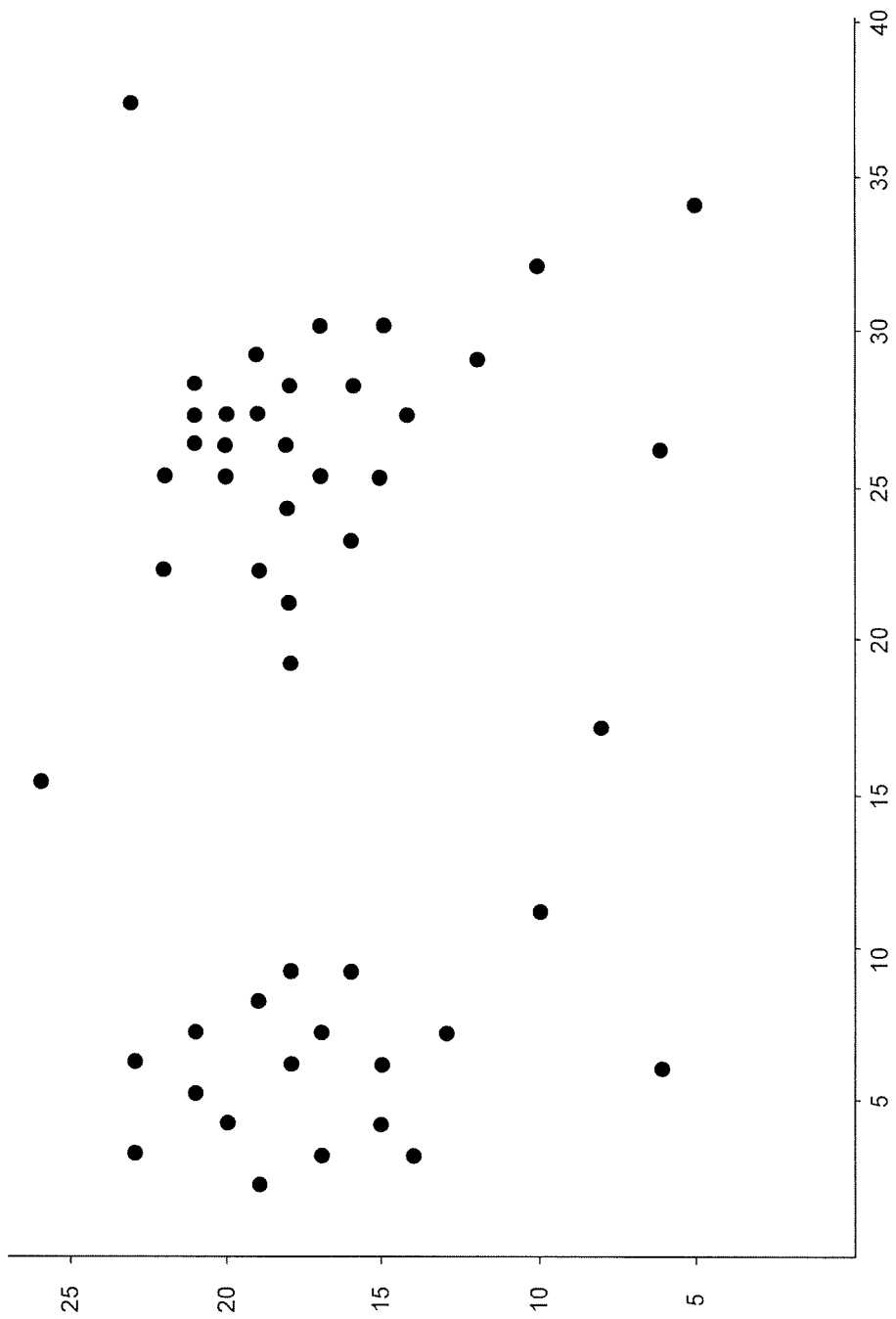
Figure 22B:
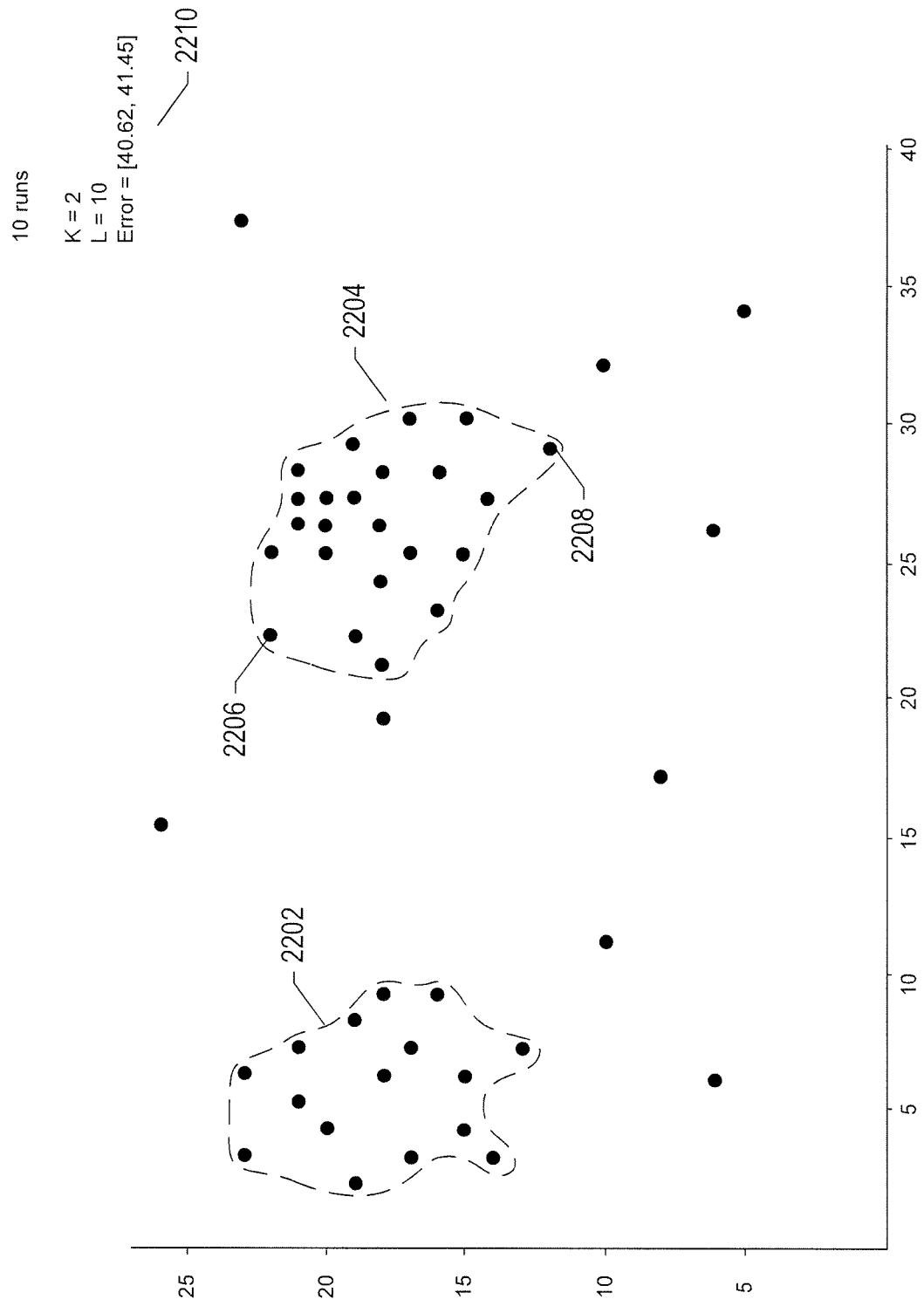

In the example of FIGS. 21A-I, the distribution of data points, or observations, do not exhibit much in the way of easily identifiable clustering. FIG. 22A shows a second example two-dimensional dataset, using the same illustration conventions as used in FIG. 21A, which exhibits an obviously nonuniform distribution of observations that includes two apparent initial clusters of data points. Ten different clusterings with K=2, L=10, and P=2, using different initial cluster centers, all produced nearly identical clusterings with a very tight range of errors. This is illustrated in FIG. 22B. A first cluster 2202 was identically identified in all ten clusterings. A second cluster 2204 was nearly identical in all ten clusterings. In one of the ten clusterings, data point 2206 was included in cluster 2204 while data point 2208 was identified as an outlier, while in nine of the ten clusterings, data point 2208 was included in cluster 2204 while data point 2206 was identified as an outlier. The remaining eight outliers were identically identified in all clusterings. As shown in FIG. 22B, the error range 2210 over the ten clusterings was quite narrow. Thus, when the distribution of observations within a metric space is inherently clustered, the modified K-means clustering process quickly and accurately converges on a very good near-optimal clustering or optimal clustering. Because the currently disclosed methods and systems employ the modified K-means clustering method to identify outlier observations, the K value input to the clustering process does not necessarily need to reflect the number of inherent clusters within the observation distribution, but only needs to be sufficiently low to avoid artifacts and meaningless clusterings with low error values.

FIGS. 23A-G provide a simple C++ implementation of one version of the modified K-means clustering process. A first set of constants 2302 in FIG. 23A specify the maximum expected values for arguments to the clustering methods, including the maximum expected number of dimensions, number of desired clusters, number of desired outliers, and number of observations in the dataset. The constant "Threshold" 2303 is the minimum shift in a cluster center between iterations of the clustering process that provokes a next iteration. It is this parameter that controls when a clustering is determined to have converged. The type definition "Point" 2304 defines a data type that contains the coordinates for a data point. The type definition "DistIndex" 2305 defines a data type that contains the distance between a data point and its cluster center as well as an index or identifier of the data point. The type definition "Dist" 2306 defines a pointer to a distance function that is applied by the clustering methods for calculating distances between data points and other locations in the transformed-metric space.

FIG. 23B includes the declaration of a class "clusteredData." This class includes the data members: (1) dataPoints 2307, a pointer to a dataset; (2) numDataPoints 2308, the number of data points in the dataset: (3) dist 2309, a pointer to the distance function used to compute distances between data points; (4) k 2310, the number of desired clusters; (5) 12311, the number of desired outliers; (6) numD 2312, the number of dimensions of the dataset; (7) clusters 2313, a pointer to a current set of cluster centers; (8) newClusters 2314, a pointer to a next set of cluster centers; (9) split 2315, the number of data points in a sorted list of data points having the same distance to their cluster center following a data point identified as the first non-outlier data point; (10) clusters1 2316, an array of cluster centers; (11) clusters2 2317, an array of cluster centers; (12) minOutlierDistance 2318, the minimum distance of an outlier data point from a cluster center; (13) already 2319, an array of Boolean values indicating whether or not corresponding data points have been selected for initial cluster centers; (14) distances 2320, an array that includes the distances of data points from the cluster centers along with an index for each data point; (15) indexedDistances 2321, an array of distances of data points from their cluster centers; and (16) clustersAssignments 2322, an array that contains indications of the cluster to which each data point has been assigned.

The class "clusteredData" includes the following member functions: (1) init 2323, an initialization routine; (2) randomInitailClusters 2324, a method that randomly selects K data points as the initial cluster centers; (3) clusterDataPoints 2325, a method that assigns data points to a set of cluster centers, and thus clusters the data points; (4) recluster 2326, a method that determines new cluster centers as the centroids of a set of current clusters; (5) convergence 2327, a routine that determines whether or not the clustering process has converged; and (6) cluster 2328, the method that represents the modified K-means clustering process.

FIG. 23C shows implementations of a function "compare," used in a quicksort of data points distances and the member function "cluster." The function "compare" 2330 compares the magnitudes of two distances within two DistIndex data structures and returns 1 if the first distance is less than the second distance, returns 0 if the first distance is equal to the second distance, and returns −1 if the first distances greater than the second distance. These values allow quicksort to sort an array of DistIndex structures in descending order by distance. The member function "cluster" implements of the modified K-means clustering process discussed above with reference to FIGS. 21A-22B. The member function "cluster" receives, as input arguments, a pointer to the dataset 2332, the number of data points in the dataset 2333, the number of dimensions of the dataset 2334, a pointer to a distance function 2335, the desired number of clusters 2336, and the desired number of outlier data points 2337. In a first set of statements 2338, the input arguments are stored in local data members. The local-data-member pointer clusters is initialized to point to the array clusters1 and the local-data-member pointer newClusters is initialized to point to the array clusters2 in the next two statements 2339. The initialization routine is called in statement 2340. Then, the member function randomInitialClusters is called, in statement 2341, to select an initial set of data points, the locations of which are assigned as the centers of an initial set of K clusters. In statement 2342, the member function clusterDataPoints is called to assign all of the data points to the initial set of clusters, the centers for which were selected in the previous statement. Then, in the while-loop 2343, new cluster centers are computed via a call to the member function re-cluster, in statement 2344, and the member function convergence is called, in statement 2345, to determine whether or not clustering has converged around the current set of cluster centers. One clustering has converged, the member function cluster terminates. Otherwise, in the set of statements 2346, the cluster-center arrays pointed to by the pointers clusters and newCluster are switched, and the member function clusterDataPoints is called, in statement 2347, to recluster the data points around the new cluster centers computed by the member function recluster, in statement 2344. Thus, the modified K-means clustering process is relatively straightforward. An initial set of K cluster centers is selected, the data points are clustered with respect to the initial set of K cluster centers, and then the modified K-means clustering process iteratively computes new cluster centers and reclusters the data points about the new cluster centers until the process converges on a set of cluster centers that represent a local minimum, in most cases, but may fortuitously represent a global minimum.

FIG. 23D provides implementations of the initialization member function init and the member function randomInitialClusters. The initialization routine 2356 sets all the elements of the array already to FALSE. The member function randomInitialClusters randomly selects K data points, the locations of which become initial cluster centers, in the while-loop 2351. An index of a next data point is randomly selected, in statement 2352, and, provided that the data point is not already been used as a cluster center, as determined in statement 2353, places the coordinates of the data point into the array "clusters" as a next cluster center in the for-loop 2354.

FIG. 23E shows an implementation of the member function clusterDataPoints. In for-loop 2356, each data point is assigned to a cluster. In the for-loop, all of the cluster centers are considered in order to find the cluster center closest to the currently considered data point. The distance of a data point to its cluster center is recorded and the cluster assignment is recorded in the set of statements 2358. In statement 2359, the distances of the data points to their respective cluster centers is sorted in descending order by a quicksort routine. In statement 2360, the minimum outlier distance is determined as the Lth distance in the sorted array of distances of data points to their cluster centers. The first L distances in the sorted array of distances correspond to the identified L outlier data points, which are, by definition, the data points furthest away from a cluster center. Finally, in the set of statements 2361, the data member split is set to the number of distances in the array of sorted distances equal to the minimum outlier distance that follow the Lth distance in the array. Thus, clustering of data points is a straightforward process in which data points are assigned to the clusters with centers nearest to them and the L data points furthest away from cluster centers are identified as outliers.

FIG. 23F provides an implementation of the member function recluster. In the for-loop 2363, the two-dimensional array sum is initialized to 0 and the array kCount is initialized to 0. The two-dimensional array sum stores the sums of the coordinate components of the data points in each cluster and the array kCount stores a count of the number of data points in each cluster. In the for-loop 2364, all of the data points are considered. In a first set of statements 2365, the local variable valid is set to TRUE if the currently considered data point is not an outlier, and is otherwise set to FALSE. If the data point is not an outlier data point, each of its coordinate components is added to the sum of coordinate components for the data points in its cluster and the number of data points in the cluster is incremented, in the set of statements 2366. In a final doubly nested for-loop 2367, all of the sums of coordinate data points are divided by the number of data points in the cluster in order to compute the centroid of each cluster, and the centroid of each cluster is stored as a new cluster center in the array of cluster centers referenced by the pointer newClusters. Thus, the member function recluster computes new cluster centers for each cluster as the centroid of the data points currently assigned to the cluster.

FIG. 23G shows implementations of the member function convergence and a distance function. The member function convergence 2370 determines whether the center of any cluster has moved more than a threshold distance during the last clustering iteration and, if so, returns the Boolean value FALSE to indicate that clustering has not converged. Otherwise, the Boolean value TRUE is returned. The distance function 2371 computes the Euclidean distance in the transformed metric space between two data points or transformed-metric-space locations. The statement 2372 illustrates declaration of an instance of the class "clusteredData." Statement 2373 illustrates invocation of the modified K-means clustering process by calling the public member function cluster of an instance of the class clusteredData.

Figures 24A, 24B:
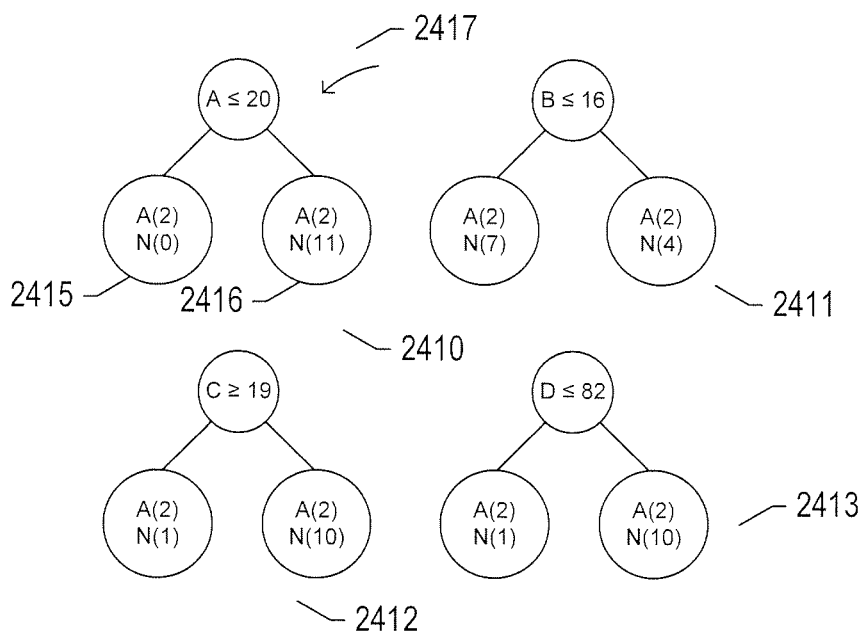
FIGS. 24A-F illustrates a machine-learning technique based on decision trees.

There are many different machine-learning techniques that can be used for developing pattern-matching systems, data-classification systems, and other types of systems that learn to make complex decisions and characterizations by being trained with labeled training data. FIGS. 24A-F illustrates a machine-learning technique based on decision trees. FIG. 24A shows a labeled training dataset based on a PCA-transformed and dimensionally reduced set of metric-data-based observations. Table 2402 contains 15 rows, including a first row 2404, each of which represents an observation. Table 2402 includes four columns, including a first column 2406, that each represents a principal component, or transformed metric. These principle components may be referred to as "attributes." There are four principal components designated A, B, C, and D. A fifth column 2408 includes a label for each observation. The label N indicates a normal observation and the label A indicates an abnormal observation. These labels may be obtained from the above-discussed modified K-means clustering technique, with the abnormal observations corresponding to outliers. Of course, in a real-world metric-data-processing system, a training dataset may contain tens of thousands, hundreds of thousands, millions, or more observations.

One type of decision-tree-based machine-learning technique builds a decision tree from a labeled training dataset by successively partitioning the dataset based with respect to different, selected. This technique generates a decision tree which can then be used to evaluate an unlabeled observation to determine whether or not the unlabeled observation is normal or abnormal. The process of constructing a decision tree is illustrated in FIGS. 24B-F. In a first step, a decision is made as to which attribute to first use to partition the dataset. In FIG. 24B, four different trees 2410-2413 represent the dataset partitionings that can be carried out with respect to each of the four different attributes A, B, C. and D. The root node of each tree includes a rule, based on one of the attributes, that can be applied to the observations in the dataset. For example, in tree 2410, the root node contains the rule "A≤20." When this rule is applied to the 15 observations shown in table 2402, the 15 observations are partitioned into two groups represented by tree nodes 2415-2416. There are two abnormal observations, observations 2 and 8, that include a value for attribute A less than or equal to 20 and there are no normal observations that include a value for attribute A less than or equal to 20, as indicated in the interior labeling of node 2415. There are two abnormal observations and 11 normal observations, as indicated by labeling in node 2416, that include a value for attribute A greater than 20. Trees 2411-2413 illustrates the partitionings that can be carried out with respect to attributes B, C, and D. Of the four different dataset partitionings represented by trees 2410-2413, the partitioning represented by tree 2410 is best, and is therefore selected as the first partitioning, as indicated by the arrow 2417 that points to tree 2410. In general, the best partitioning most effectively separates the abnormal observations from the normal observations.

Figure 24C:
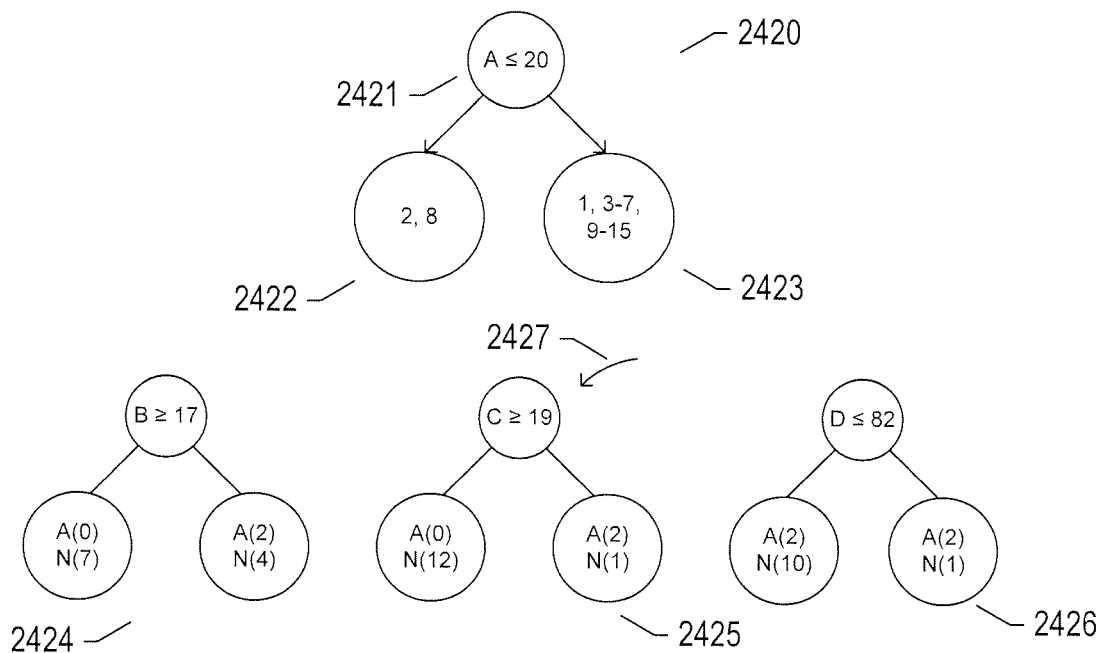

The partitioning represented by tree 2410 generates a partition, represented by node 2415, that contains only abnormal observations. None of the other partitionings so cleanly partition abnormal from normal observations. As shown in FIG. 24C, tree 2410 is selected as the initial set of connected nodes for the decision tree 2420. The root node 2421 contains the rule, the left-hand node 2422 represents those observations for which the value of attribute A is less than or equal to 20, and right-hand node 2423 represents those observations for which the value of attribute A is greater than 20. Because node 2422 contains only abnormal observations, the data represented by this node requires no further partitioning. However, node 2423 represents a set of observations that include both abnormal and normal observations, and this set of observations thus needs to be further partitioned in order to separate abnormal from normal observations. Trees 2424-2426 represent three partitionings of the dataset represented by node 2423 based on the remaining three attributes B, C, and D. As indicated by arrow 2427, the tree containing a rule based on attribute C provides a more effective partitioning than that represented by tree 2424 and is equally effective to the partitioning represented by tree 2426. This tree is arbitrarily selected from among trees 2425 and 2426 for the next level of partitioning to be included in the decision tree.

Figure 24D:
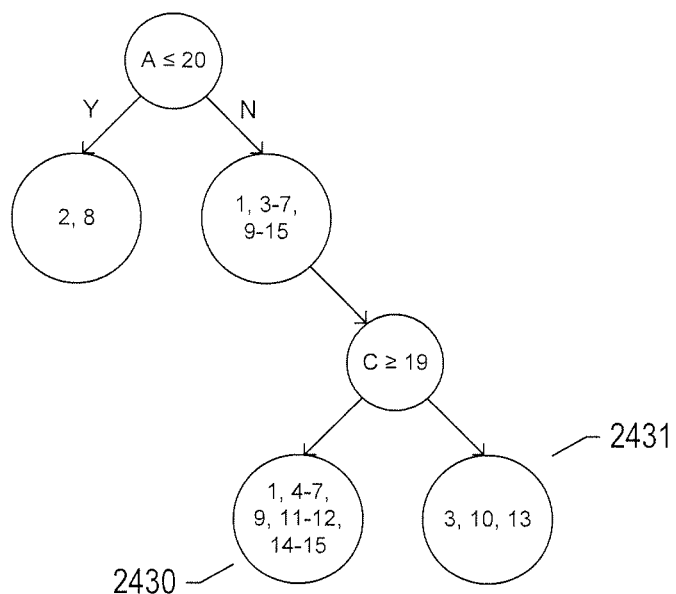
Figure 24E:
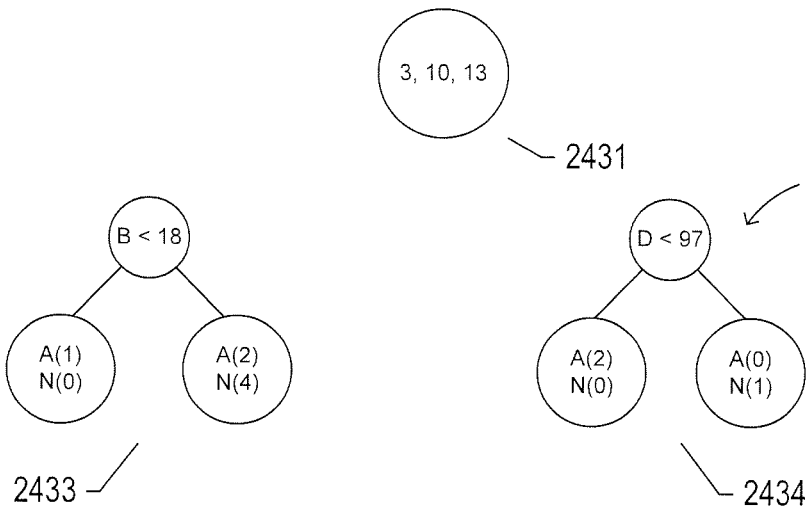

The resulting decision tree is shown in FIG. 24D. Node 2430 includes only normal observations and therefore does not require further partitioning. However, node 2431 includes a single normal observation and two abnormal observations, as indicated by the labeling in FIG. 24C, and therefore needs to be further partitioned. In FIG. 24E, node 2431 is again shown, along with the two possible partitionings of the node represented by trees 2433 and 2434. In this case, the partitioning represented by tree 2434 is most effective, and thus this final partitioning is included as a final subtree within the decision tree.

Figure 24F:
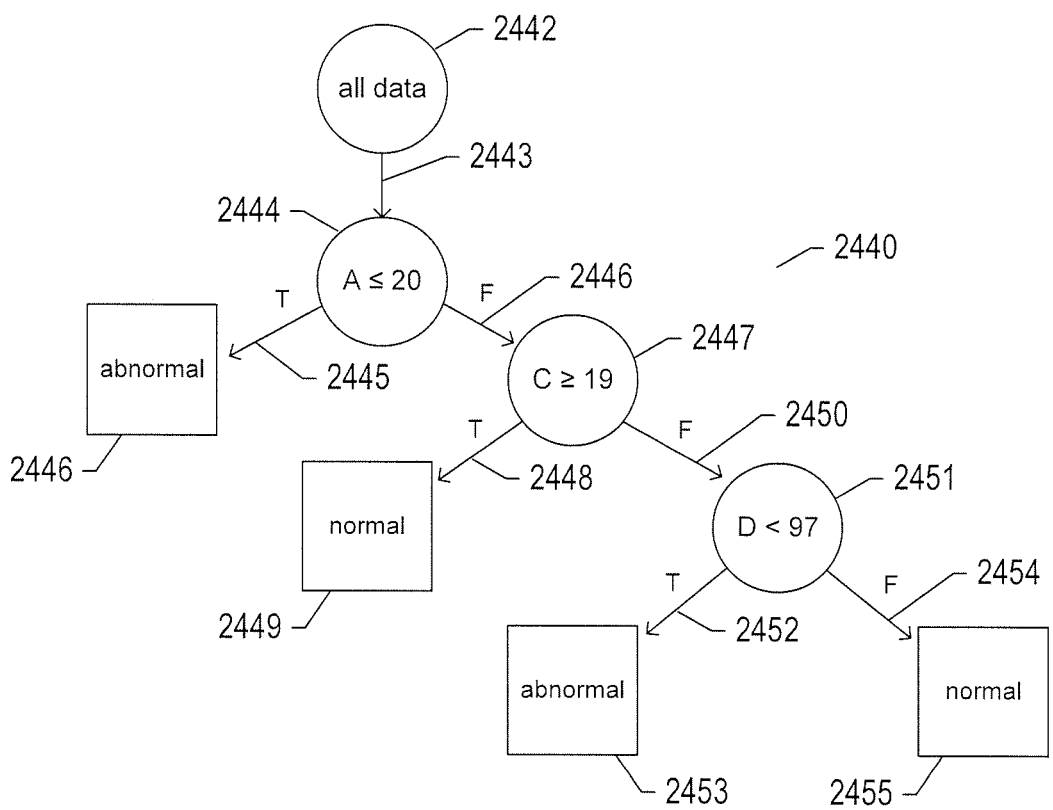

FIG. 24F shows the final decision tree 2440. This decision tree can be used to classify an unlabeled observation as normal or abnormal. The classification process is essentially a traversal of the decision tree beginning with the top node. The top node, or root node 2442, represents all data. Any observation satisfies the rule represented by this node. There is a single link, or path, 2443 emanating from this node that path is followed to arrive at rule node 2444. The rule associated with this node is applied to the observation. If application of the rule to the observation returns a value TRUE, then link 2445 is followed to the leaf node 2446 which indicates that the observation is abnormal. Otherwise, when the rule returns a value FALSE, then link 2446 is followed to rule node 2447. The rule on node 2447 is then applied to the data observation. When application of the rule represented by node 2447 returns a value TRUE, link 2448 is followed to leaf node 2449, which indicates that the observation is normal. When the rule returns a value FALSE, then link 2450 is followed to rule node 2451. The rule represented by node 2451 is then applied to the observation. When application of the rule represented by node 2451 returns the value TRUE, then link 2452 is followed to leaf node 2453, which indicates that the observation is abnormal. Otherwise, path 2454 is followed to leaf node 2455, which indicates that the observation is normal. In certain cases, there may not be sufficient attributes in a dimensionally-reduced dataset to determine whether any particular observation is abnormal or normal. In such cases, traversal of the decision tree may arrive at a leaf node containing an indication that it cannot be ascertained whether the observation is normal or abnormal. In the following pseudocode example, the label "unknown" is used to indicate an inability to determine whether an observation is abnormal or normal.

FIGS. 25A-D provides a pseudocode example for construction of a decision tree and traversal of a decision tree to determine the nature of an unlabeled observation. The pseudocode is not a complete implementation, because a wide variety of different types of rules, rule-determination, and data-storage techniques can be used, and these various different types of implementations are beyond the scope of the current discussion. As shown in FIG. 25A, the pseudocode includes a declaration of two fundamental rules TRUE and FALSE 2502. In the pseudocode, rules are represented by character strings. The constant MAX_RULE represents the maximum allowed size, in characters, of a rule 2504. The enumeration label 2506 represents three types of leaf-node labels: NORMAL. ABNORMAL, and UNKNOWN. A null node pointer is also declared 2507. A partial declaration for a class rule, each instance of which represents a rule that may be included within a node of a decision tree, is next provided 2508. The first type of member function applyRule 2509 applies the rule represented by an instance of the class rule to an input dataset and partitions the input dataset into two data subsets T and F, which include the observations for which the rule generates TRUE and FALSE values, respectively. A second type of member function applyRule 2510 applies the rule represented by an instance of the class rule to an observation and returns the Boolean result. The class rule also includes an assignment operator 2511. Next, a class attributes is declared 2512. An instance of the class attributes represents a map between a set or subset of attributes and the attributes associated with each observation. The member function getDataIndex 2513 returns an index of an attribute, indexed by an input index, with respect to the full set of attributes associated with each observation. Next, a class datum is declared 2514. Each instance of the class datum represents an observation.

Continuing with FIG. 25B, a class data is next declared 2516. Each instance of the class data represents a dataset, or set of observations. The member function getDatum 2517 returns an observation within the dataset corresponding to an input index. The member function getLabel 2518 returns the label associated with the observation corresponding to an input index. The member function getEntropy 2519 returns the entropy for the dataset. The entropy and a related value, referred to as "gain." are used for determining which of multiple possible partitionings to next use in constructing a decision tree. These concepts are next explained with reference to expressions 2520. D represents a set of observations 2521. N represents the subset of D containing those observations of D that are labeled normal 2522. A 2523 represents the set of abnormal observations in D. The entropy of the set of observations D, H(D), is given by expression 2524. When all of the observations are either normal or abnormal, the entropy is 0. When half the observations are normal and the other half of the observations are abnormal, the entry is 1. The entropy has fractional values in the range [0, 1] for other ratios of abnormal-to-normal observations and a plot of the entropy is nonlinear and symmetrical about a vertical line through the point 0.5 of a horizontal axis representing the ratio of normal or abnormal observations to the total number of observations. The set T 2525 includes two subsets of the set of observations D and represents a partitioning of the set of observations D into two subsets. The gain 2526 for a partitioning is given by expression 2527 and represents the decrease in entropy resulting from the partitioning. Thus, partitionings that result in a first subset of only normal observations and a second subset of only abnormal observations would have the greatest possible gain for any particular set of observations D. The gain can thus be used as a criterion for selecting a next partitioning from among the possible partitionings at each step in the construction of the decision tree.

At the bottom of FIG. 25B, a class node is declared 2530. Each instance of the class node represents a node within a decision tree. The class node includes the following data members: (1) Tptr 2531, a pointer to a child node to which a traversal is made when application of the rule associated with the node returns a Boolean value TRUE; (2) Fptr 2532, a pointer to a child node to which a traversal is made when application of the rule associated with the node returns a Boolean value FALSE; (3) Tlabel 2533, the label represented a return value from a leaf node or partial leaf node when application of the rule associated with the node returns a Boolean value TRUE; (4) Flabel 2534, the label representing a return value from a leaf node or partial leaf node when application of the rule associated with the node returns a Boolean value FALSE; and (5) r 2536 5, the rule associated with the node. The member functions of the class node include numerous member functions 2536 for setting and retrieving the values of data members, two versions of applyRule 2537 and 2538 which mirror the member functions with the same name in the class rule, and a constructor 2539.

Turning to FIG. 25C, a function copyRule 2540 is declared without an implementation, as is a function determine_rule 2541. The function copyRule copies a rule pointed to by a first argument to a character array pointed to by a second argument. The function determine_rule generates a rule, referenced by the argument r, for a particular attribute specified by the argument a index with respect to an input dataset d, and returns the gain, discussed above with reference to FIG. 25B, for partitioning the input dataset into two data subsets by application of the generated role. An implementation is not provided for this function since the implementation is highly dependent on the types of rules and datasets employed. For the example shown in FIGS. 25 A-F, rule generation involves determining a numerical threshold that provides a partitioning of the dataset that generates the best possible gain. In this case, the rule may not be unique, since many different thresholds might provide the same maximum possible gain. In the lower portion of FIG. 25C, a function grow_decision_tree is shown 2542. This function generates a new node for a decision tree and returns a reference to that node. Input arguments include a reference to a dataset d 2543 and a reference to a set of remaining attributes a 2544. The new node is created using the operator new 2545. When the number of remaining attributes is greater than 0 2546, the function determine_rule is called for each remaining attribute, in the for-loop 2547, to determine the attribute which provides the greatest possible gain when used for a next partitioning of the dataset. When the number of remaining attributes is 0 or the maximum gain is less than or equal to 0 2548, the node is configured as a leaf node that returns the label "unknown" 2549. Otherwise, the rule for the best attribute is placed into the node 2550 and the rule is applied to create two data subsets representing a partitioning of the input dataset 2552. A new set of attributes is created from which the attribute with respect to which the rule configured in the node was established removed 2553 and the function grow_decision_tree is recursively called to produce the two branches for the node 2554.

FIG. 25D shows an implementation of the function build decision tree 2560. This function receives a reference to an input dataset d 2561 and reference to an input set of principal components, or attributes, a 2562 and returns a pointer to a decision tree for the dataset 2563. When the number of observations in the dataset is 0, the function returns a null pointer 2564. If the dataset has an entropy of 0 2565 the function returns a single terminal mode 2566, since there is no basis for partitioning the dataset into subsets. Otherwise, the function calls the function grow_decision_tree 2567 to create the decision tree for the dataset and attributes, as discussed above with reference to FIGS. 24A-F. Finally, an implementation for the function evaluate is shown 2570. This function receives an observation d 2571 and a pointer to a decision tree 2572 and returns a label 2573 that characterizes the received observation d. The function calls the member function applyRule 2574 for the root node of the decision tree, where the input decision tree may be the subtree of a larger decision tree, which returns a Boolean value applyRes 2575. When the returned Boolean value is TRUE, the function calls the member function of the root node of the decision tree getTptr to obtain the left-hand, or TRUE, pointer for the root node of the decision tree. When the returned pointer is null 2576, the function returns the label associated with the Boolean value TRUE stored in the root node 2577. Similar logic 2578 is carried out when the returned Boolean value is FALSE. Finally, the function evaluate recursively calls itself in the case that the relevant child pointer is not null 2580.

Figure 26A:
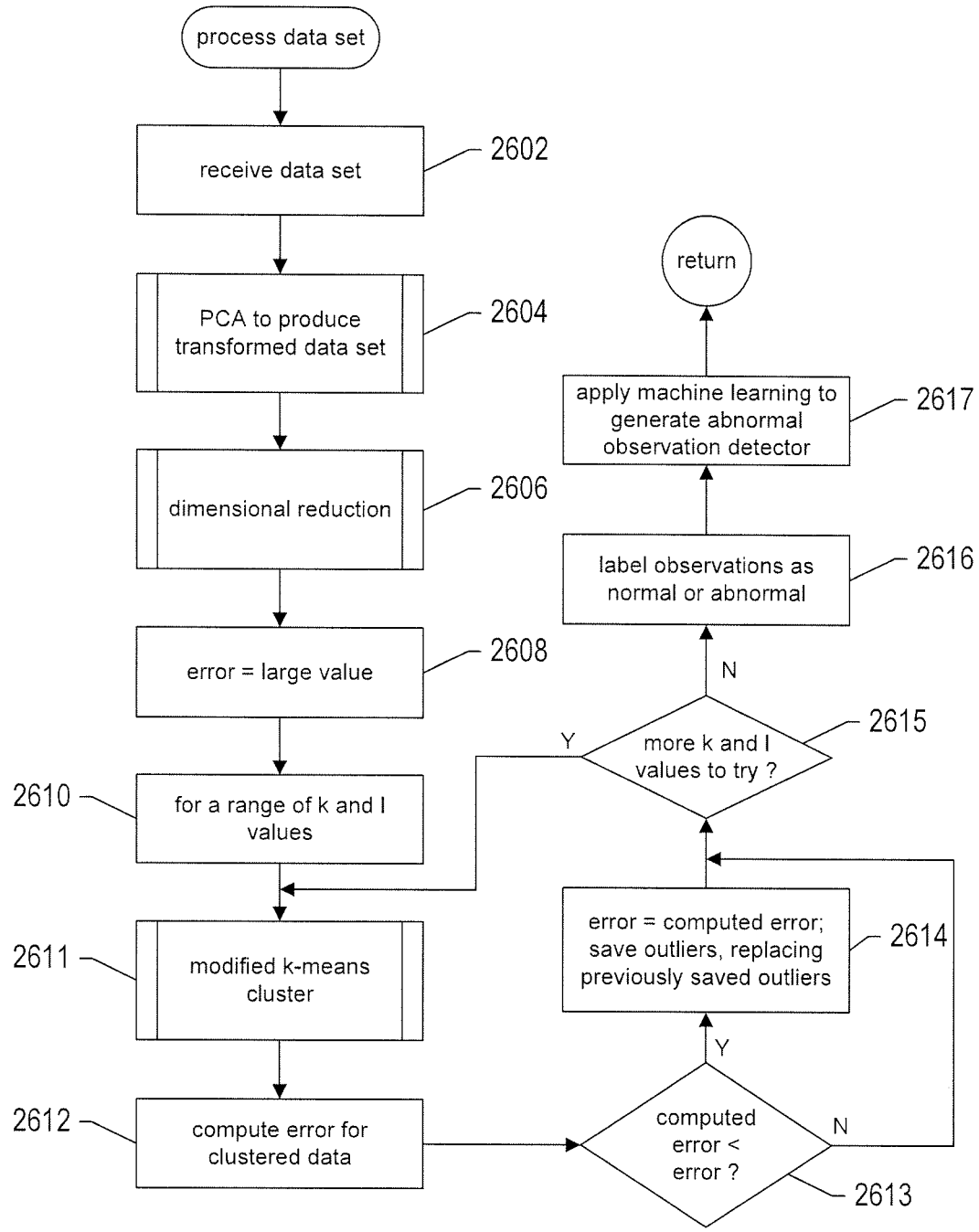
FIGS. 26A-B provide control-flow diagrams that illustrate the currently disclosed method and system for discovering root causes.
Figure 26B:
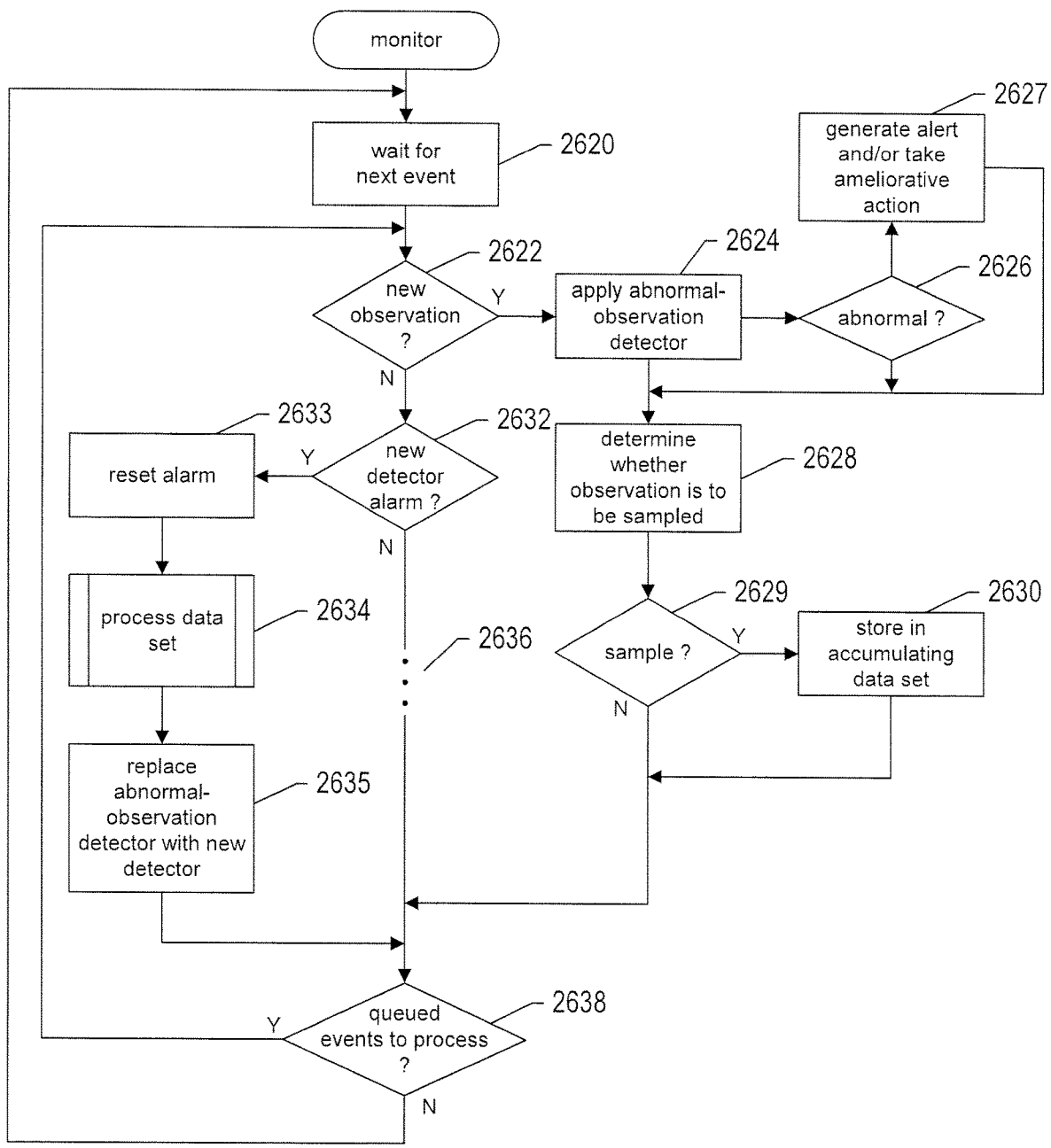

FIGS. 26A-B provide control-flow diagrams that illustrate the currently disclosed method and system for generating a decision tree, or abnormal-observation detector. The currently disclosed methods and systems are employed within a distributed computing system that continuously receives event messages and other types of metric data and uses the received metric data to monitor the state of the distributed computer system. As discussed above, the metric data is scaled and aligned to produce a set of timestamped observations, each including values for two or more metrics. The currently disclosed methods and systems are fully automated, in certain implementations. They are fully automated despite the fact that they may employ supervised-learning-based machine-learning techniques and subsystems. In general, supervised-learning-based techniques require some level of human input and interaction during development of training datasets that are used to train the machine-learning subsystems to recognize patterns, features, and characteristics in data and other inputs subsequently provided to the subsystems. For example, in the above-described decision-tree-based methods, it would be common for an initial set of observations to be manually labeled by a human administrator who recognizes or infers which of the observations are associated with abnormal system states. The currently disclosed methods and systems, as further discussed below, employee various unsupervised-learning methodologies, including K-means clustering, to generate labels for observations in a data set and, by doing so, automatically producing a training data set from which they decision-tree-based abnormal-observation detector can be automatically generated. Thus, one significant feature of the currently disclosed methods and systems is the ability to employ supervised-learning technologies in a fully automated system. It should also be noted that, although the examples provided in this document concern automated recognition of abnormal observations and inference of potentially problematic distributed-computing-system operational states, the currently disclosed methods and systems can be straightforwardly extended to many other problem domains and applications. As one example, more complex decision trees may be able to distinguish a variety of different types of abnormal states, such as abnormal states associated with different levels of severity or priority. As another example, the currently disclosed methods and systems can be alternatively used to recognize various types of distributed-computing-system operational states with favorable characteristics, that would allow for automated exploitation or advantageous reconfiguration. As yet another example, the currently disclosed methods and systems may be used to discover the need for additional hardware or software components in a distributed computing system by recognizing operational states associated with system-configuration deficiencies.

FIG. 26A shows a control-flow diagram for a routine "process dataset." This routine processes a set of observations in order to generate a decision tree or other machine-learning-generated entity that allows for automated characterization of subsequently received observations as being normal or abnormal. In step 2602, the set of observations is received. In step 2604, the above-discussed principal-component-analysis technique is used to transform the dataset into a form in which each observation includes values for a set of principal components generally different from the original values for the original metrics. In step 2606, a subset of the principal components is selected in order to reduce the dimensionality of the observations, as discussed above. In step 2608, a local variable error is set to a large value. Then, in the for-loop of steps 2610-2615, the above-discussed modified K-means clustering technique is iteratively called, with different K and L parameter values, in order to generate a clustering of the dataset that produces a low error value. In step 2616, the outlier observations are labeled as abnormal and the clustered observations are labeled as normal for the best cluster obtained in the for-loop of steps 2610-2615. Finally, in step 2617, a machine-learning technique is applied to the labeled dataset to generate an abnormal-observation detector. One machine-learning technique that may be used is the above-discussed decision-tree-based technique, which generates a decision tree based on the labeled training set. The decision tree can be traversed for a subsequent observation, as discussed above, in order to determine whether or not the subsequent observation is abnormal or not.

FIG. 26B shows a control-flow diagram that illustrates the structure of a distributed-computing-system-state monitor that employs the currently disclosed methods and systems for generating an abnormal-observation detector. The monitor is implemented as an event loop. In step 2620, the monitor waits for a next event to occur. When the next event is the reception of a new observation, as determined in step 2622, the abnormal-observation detector, generated in step 2617 of FIG. 26A is applied to the new observation in step 2624. When the observation is determined by the detector to be abnormal, in step 2626, the monitor may generate an alert and/or take other ameliorative actions in step 2627. In step 2628, the monitor determines whether or not the received observation should be a sample point for a next training dataset. If so, as determined in step 2629, the observation is stored in an accumulating dataset in step 2630. When the next received event is expiration of a new-detector timer or reception of an alarm generated by accumulation of a sufficient number of sample observations to generate a new training dataset, as determined in step 2632, the alarm or timer is reset, in step 2633, the above-described routine "process dataset" is called, in step 2634, and the current abnormal-observation detector is replaced with a new detector generated in the call to the routine "process dataset," in step 2635. Ellipses 2636 indicate that the monitor may receive and handle many additional types of events. When there are additional queued events to process, as determined in step 2638, control returns to step 2622. Otherwise, control returns to step 2620.

Note that the abnormal-observation detector can employ the information encoded in one or more decision trees to classify the detected abnormal observation. For example, each leaf node in the decision tree corresponding to an abnormal observation represents a particular set of metrics and corresponding metric values or value ranges. Each leaf node may potentially represent a different type of anomalous system state, incident, or other event or behaviour. Thus, the leaf nodes may additionally contain or reference indications of the type of anomalous system state, incident, or other event or behaviour represented by the leaf node as well as indications of the actions that should be taken, in step 2627, to handle the occurrence of the anomalous system state, incident, or other event or behaviour. In many cases, the detected anomalous system states, incidents, or other events or behaviours may be early precursors of more serious results that might result in a failure to timely address them, in which case the actions that should be taken may be prophylactic in nature.

Although the present invention has been described in terms of particular embodiments, it is not intended that the invention be limited to these embodiments. Modification within the spirit of the invention will be apparent to those skilled in the art. For example, any of a variety of different implementations of the currently disclosed root-cause-identifying methods and systems can be obtained by varying any of many different design and implementation parameters, including modular organization, programming language, underlying operating system, control structures, data structures, and other such design and implementation parameters. As discussed above, it is a variety of different methods can be used for principal-component analysis. As also discussed above, any of many different types of clustering methods may be employed to identify clusters and outliers in a dataset. As discussed above, many different techniques can be used to temporally align data points the dataset to produce a time sequence of observations. Finally, a variety of different machine-learning techniques can be employed to generate abnormal-observation detectors, including support-vector machines, various types of classification methods, various types of tree-based learning, and other techniques.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated monitor subsystem within a distributed computer system comprising:
   one or more processors;
   one or more memories; and
   computer instructions, stored in one or more of the one or more memories that, when executed by one or more of the one or more processors, control the monitor subsystem to
      receive metric data from multiple metric-data sources,
      temporally align the received metric data to generate timestamped observations, and
      apply an abnormal-state detector to the timestamped observations to detect abnormal distributed computer-system operational states and initiate reporting and/or ameliorative operations within the distributed computer system, the abnormal-state detector automatically generated from previously generated timestamped observations by
         transforming the previously generated timestamped observations to a coordinate system aligned with directions of greatest variability in the metric-data space,
         projecting the transformed timestamped observations onto a lower-dimensional transformed-observation space,
         identifying outlying timestamped observations to produce a labeled training dataset, and
         using the labeled training dataset to automatically generate the abnormal-state detector.

2. The automated monitor subsystem of claim 1 wherein the received metric data comprises timestamp/value pairs, each timestamp/value pair received from a metric-data source.

3. The automated monitor subsystem of claim 2 wherein the automated monitor subsystem temporally aligns the received metric data to generate timestamped observations by
using one or more of averaging over finite time windows, curve-fitting, and linear extrapolation to generate an observed or estimated value for periodic timepoints; and
collecting the generated values for each metric-data source for each timepoint into a set of time-ordered observations, each observation comprising a value for each metric-data source and a timestamp.

4. The automated monitor subsystem of claim 3 wherein the abnormal-state detector comprises:
stored data produced by a machine-learning system; and
a classification logic that employs the stored data to classify a timestamped observation as normal or abnormal.

5. The automated monitor subsystem of claim 4
wherein the stored data represents a decision tree; and
wherein the classification logic uses a timestamped observation to traverse the decision tree from a decision-tree root node to a decision-tree leaf node or partial leaf node that contains a label that is assigned to the timestamped observation.

6. The automated monitor subsystem of claim 3 wherein the automated monitor subsystem transforms the previously generated timestamped observations to a coordinate system aligned with directions of greatest variability in the metric-data space by applying principle-component analysis to determine principle-component basis vectors for the metric-data space of timestamped observations and, for each observation, to generate principle-component values that are linear combinations of the values of the observation that replace the values of the observation to produce a transformed observation.

7. The automated monitor subsystem of claim 6 wherein the automated monitor subsystem projects the transformed timestamped observations onto a lower-dimensional transformed-observation space by removing a fixed number of principle-component values corresponding to the principle-component basis vectors associated with the least variability in the metric-data space.

8. The automated monitor subsystem of claim 3 wherein the automated monitor subsystem identifies outlying timestamped observations to produce a labeled training dataset by clustering the transformed timestamped observations within the lower-dimensional transformed-observation space and selecting, as outlying timestamped observations, those transformed timestamped observations furthest away from cluster centers.

9. The automated monitor subsystem of claim 8 wherein the automated monitor subsystem uses a modified K-means clustering method to cluster the transformed timestamped observations within the lower-dimensional transformed-observation space.

10. The automated monitor subsystem of claim 9 wherein the automated monitor subsystem iteratively clusters the transformed timestamped observations with different K-means-clustering parameter values and selects the clustering with a least associated clustering error.

11. The automated monitor subsystem of claim of claim 8 wherein the automated monitor subsystem produces a labeled training dataset by labeling the outlying transformed observations as abnormal and labeling the cluster-resident transformed observations as normal.

12. The automated monitor subsystem of claim of claim 3 wherein the automated monitor subsystem uses the labeled training dataset to automatically generate the abnormal-state detector by generating a decision tree from the labeled training dataset.

13. An automated method that within a distributed computer system, the method comprising:
receiving metric data from multiple metric-data sources;
temporally aligning the received metric data to generate timestamped observations;
transforming the timestamped observations to a coordinate system aligned with directions of greatest variability in the metric-data space;
projecting the transformed timestamped observations onto a lower-dimensional transformed-observation space;
identifying outlying timestamped observations to produce a labeled training dataset; and
using the labeled training dataset to automatically generate an abnormal-state detector.

14. The method of claim 13
wherein the received metric data comprises timestamp/value pairs, each timestamp/value pair received from a metric-data source; and
wherein aligning the received metric data to generate timestamped observations further comprises
using one or more of averaging over finite time windows, curve-fitting, and linear extrapolation to generate an observed or estimated value for periodic timepoints, and
collecting the generated values for each metric-data source for each timepoint into a set of time-ordered observations, each observation comprising a value for each metric-data source and a timestamp.

15. The method of claim 14 wherein the abnormal-state detector comprises:
stored data produced by a machine-learning system; and
a classification logic that employs the stored data to classify a timestamped observation as normal or abnormal.

16. The method of claim 15
wherein the stored data represents a decision tree; and
wherein the classification logic uses a timestamped observation to traverse the decision tree from a decision-tree root node to a decision-tree leaf node or partial leaf node that contains a label that is assigned to the timestamped observation.

17. The method of claim 14 wherein transforming the timestamped observations to a coordinate system aligned with directions of greatest variability in the metric-data space further comprises applying principle-component analysis to determine principle-component basis vectors for the metric-data space of timestamped observations and, for each observation, generating principle-component values that are linear combinations of the values of the observation that replace the values of the observation to produce a transformed observation.

18. The method claim 17 wherein projecting the transformed timestamped observations onto a lower-dimensional transformed-observation space further comprises removing a fixed number of principle-component values corresponding to the principle-component basis vectors associated with the least variability in the metric-data space.

19. The method of claim 14 wherein identifying outlying timestamped observations to produce a labeled training dataset further comprises clustering the transformed timestamped observations within the lower-dimensional transformed-observation space and selecting, as outlying timestamped observations, those transformed timestamped observations furthest away from cluster centers.

20. The method of claim 19 further comprising using a modified K-means clustering method to cluster the transformed timestamped observations within the lower-dimensional transformed-observation space.

21. The method of claim 19 wherein a labeled training dataset is produced by labeling the outlying transformed observations as abnormal and labeling the cluster-resident transformed observations as normal.

22. The method of claim of claim 14 wherein using the labeled training dataset to automatically generate the abnormal-state detector further comprises generating a decision tree from the labeled training dataset.

23. A physical device encoded with computer instructions that, when executed on one or more processors of a distributed computer system that additionally includes one or more memories, control the distributed computer system to generate an abnormal-state detector by:

receiving metric data from multiple metric-data sources;
temporally aligning the received metric data to generate timestamped observations;
transforming the timestamped observations to a coordinate system aligned with directions of greatest variability in the metric-data space;
projecting the transformed timestamped observations onto a lower-dimensional transformed-observation space;
identifying outlying timestamped observations to produce a labeled training dataset; and
using the labeled training dataset to automatically generate the abnormal-state detector.

* * * * *